(12) United States Patent
Schäfer et al.

(10) Patent No.: US 7,699,000 B2
(45) Date of Patent: Apr. 20, 2010

(54) DEVICE FOR MOUNTING A CYLINDER IN A PRINTING UNIT, AND METHOD FOR ADJUSTMENT OF A PRINT ON-POSITION

(75) Inventors: Karl Robert Schäfer, Rimpar (DE); Georg Schneider, Würzburg (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 668 days.

(21) Appl. No.: 11/547,286

(22) PCT Filed: Mar. 23, 2005

(86) PCT No.: PCT/EP2005/051359

§ 371 (c)(1),
(2), (4) Date: Oct. 3, 2006

(87) PCT Pub. No.: WO2005/097504

PCT Pub. Date: Oct. 20, 2005

(65) Prior Publication Data

US 2007/0175345 A1    Aug. 2, 2007

(30) Foreign Application Priority Data

Apr. 5, 2004 (DE) .................. 10 2004 017 287
May 5, 2004 (DE) .................. 10 2004 022 704
Aug. 5, 2004 (DE) .................. 10 2004 037 889

(51) Int. Cl.
*B41F 31/30* (2006.01)

(52) U.S. Cl. .................. 101/352.01; 101/216; 101/218; 101/247; 101/349.1

(58) Field of Classification Search ............. 101/352.01
See application file for complete search history.

(56) References Cited

U.S. PATENT DOCUMENTS

| | | | |
|---|---|---|---|
| 2,088,897 A | 8/1937 | Crafts | |
| 2,557,381 A | 6/1951 | Huebner | |
| 3,470,816 A | 10/1969 | Piecha et al. | |
| 3,679,272 A * | 7/1972 | Costa et al. | .................. 384/99 |
| 3,892,178 A | 7/1975 | Staamann | |

(Continued)

FOREIGN PATENT DOCUMENTS

AT            224 662        12/1962

(Continued)

OTHER PUBLICATIONS

Festo—Cataloge Page—In German and English No Date.

*Primary Examiner*—Jill E Culler
(74) *Attorney, Agent, or Firm*—Jones, Tullar & Cooper, P.C.

(57) ABSTRACT

A cylinder of a printing press is mounted using a bearing block. A radial bearing is movable in spaced linear bearings along an adjustment direction of the cylinder. The bearing is embodied as a modular bearing unit which may be a one piece assembly. The linear bearing is included in the modular assembly which permits movement of the bearing block along with the radial bearings.

33 Claims, 35 Drawing Sheets

U.S. PATENT DOCUMENTS

| | | | |
|---|---|---|---|
| 4,119,032 A | | 10/1978 | Hollis |
| 4,122,772 A | * | 10/1978 | Dahlgren ............... 101/218 |
| 4,796,452 A | | 1/1989 | Schiel |
| 4,821,384 A | * | 4/1989 | Arav .................. 100/162 B |
| 4,899,656 A | | 2/1990 | Thomas et al. |
| 4,986,178 A | | 1/1991 | Hafner et al. |
| 5,351,616 A | | 10/1994 | Gelinas et al. |
| 5,746,132 A | | 5/1998 | Parks et al. |
| 5,782,182 A | | 7/1998 | Ruckmann et al. |
| 5,868,071 A | * | 2/1999 | Niemiro et al. ............. 101/218 |
| 6,085,650 A | | 7/2000 | Petersen |
| 6,227,110 B1 | | 5/2001 | Zlatin |
| 6,343,551 B2 | * | 2/2002 | Kamiyama et al. ...... 101/352.03 |
| 6,408,748 B1 | | 6/2002 | Hajek et al. |
| 6,494,135 B1 | | 12/2002 | Gottling et al. |
| 6,494,138 B1 | | 12/2002 | Gottling et al. |
| 6,557,467 B1 | | 5/2003 | Dilling et al. |
| 6,668,719 B2 | | 12/2003 | Reder et al. |
| 6,684,775 B2 | | 2/2004 | Dufour et al. |
| 7,011,023 B2 | | 3/2006 | Dittenhofer et al. |
| 2001/0035104 A1 | | 11/2001 | Gottling et al. |
| 2004/0107849 A1 | | 6/2004 | Christel et al. |
| 2004/0144268 A1 | | 7/2004 | Christel et al. |
| 2004/0252928 A1 | | 12/2004 | Dittenhofer et al. |
| 2005/0034615 A1 | | 2/2005 | Holm et al. |
| 2005/0211117 A1 | | 9/2005 | Koopmann |

FOREIGN PATENT DOCUMENTS

| | | |
|---|---|---|
| DE | 674128 | 4/1939 |
| DE | 1 436 541 | 2/1969 |
| DE | 22 34 089 | 1/1975 |
| DE | 36 10 107 | 10/1987 |
| DE | 195 34 651 | 3/1997 |
| DE | 199 37 806 | 2/2001 |
| DE | 43 27 278 | 3/2001 |
| DE | 94 22 402 U1 | 7/2001 |
| DE | 100 08 216 A1 | 8/2001 |
| DE | 102 02 385 | 8/2002 |
| DE | 101 45 321 | 4/2003 |
| DE | 101 45 322 | 4/2003 |
| DE | 102 10 639 | 10/2003 |
| EP | 0 246 081 | 11/1987 |
| EP | 0 396 904 A2 | 4/1990 |
| EP | 0 499 022 | 8/1992 |
| EP | 0 564 360 | 10/1993 |
| EP | 0 699 524 | 3/1996 |
| EP | 1 264 686 | 12/2002 |
| EP | 1 310 362 A1 | 5/2003 |
| EP | 1 375 137 | 1/2004 |
| FR | 2 503 628 | 10/1982 |
| GB | 283782 | 1/1928 |
| GB | 564340 | 9/1944 |
| GB | 2 054 758 | 2/1981 |
| GB | 1 594 005 | 7/1981 |
| GB | 2 292 543 A | 2/1996 |
| WO | WO 95/24314 | 9/1995 |
| WO | WO 99/24727 | 5/1999 |
| WO | WO 01/49491 | 7/2001 |
| WO | WO 02/081218 A2 | 10/2002 |
| WO | WO 02/081218 A3 | 10/2002 |
| WO | WO 03/039872 | 5/2003 |
| WO | WO 03/099567 | 12/2003 |

* cited by examiner

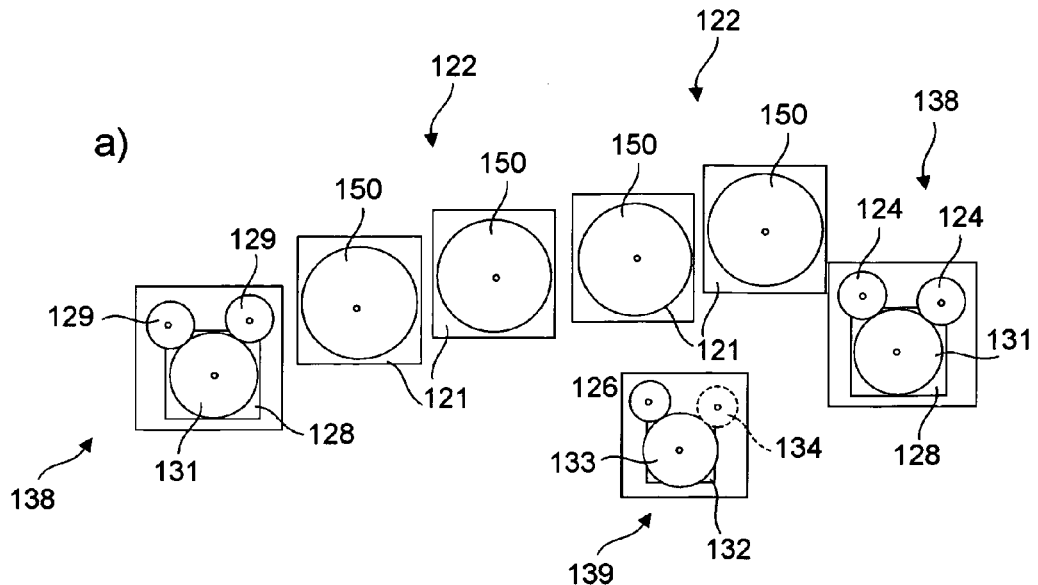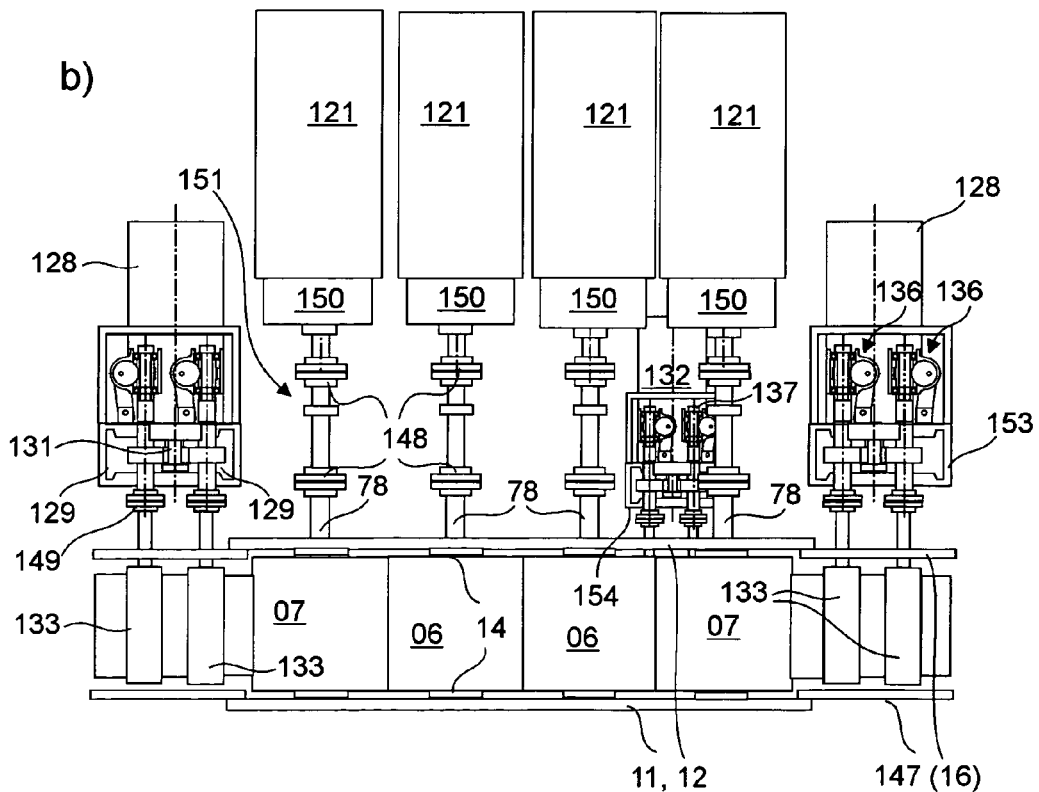
Fig. 30 a)
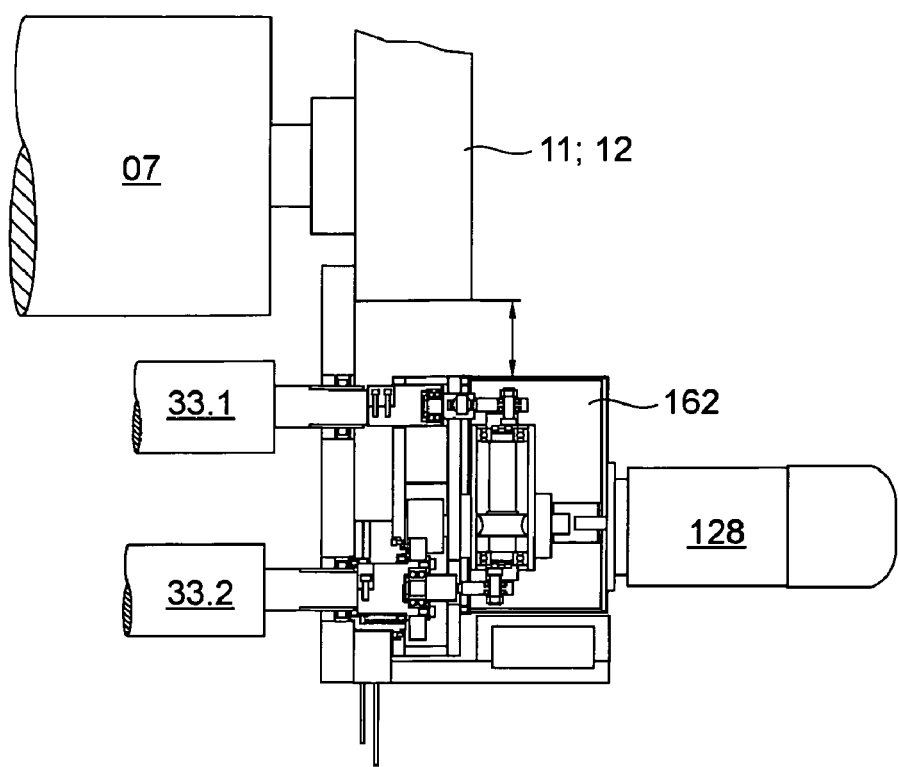
b)
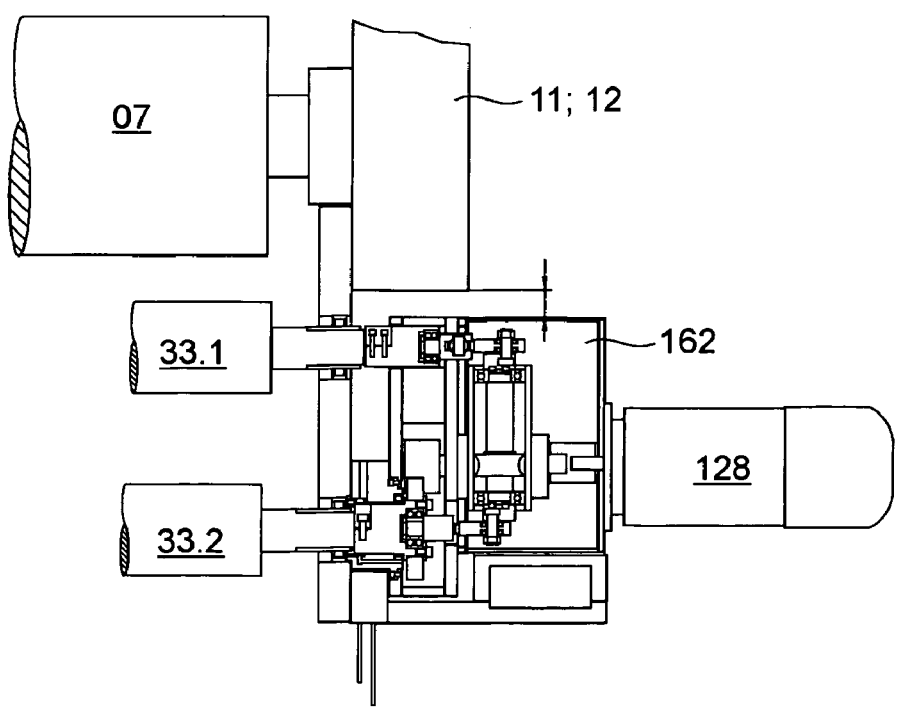
Fig. 35

DEVICE FOR MOUNTING A CYLINDER IN A PRINTING UNIT, AND METHOD FOR ADJUSTMENT OF A PRINT ON-POSITION

CROSS-REFERENCE TO RELATED APPLICATIONS

This patent application is the U.S. national phase, under 35 USC 371 of PCT/EP2005/051359, filed Mar. 23, 2005; published as WO 2005/097504 A2 and A3 on Oct. 20, 2005; and claiming priority to DE 10 2004 017 287.0, filed Apr. 5, 2004; to DE 10 2004 022 704.7, filed May 5, 2004 and to DE 10 2004 037 889.4, filed Aug. 5, 2004, the disclosures of which are incorporated herein by reference.

FIELD OF THE INVENTION

The present invention is directed to devices for mounting a cylinder, or a printing unit, and to methods for adjusting a print-on position of a cylinder. The cylinder is supported in a bearing block which is movable in linear bearings in an adjustment direction. The bearing block includes radial bearings which support the cylinder journal.

BACKGROUND OF THE INVENTION

A printing unit of this general type is known from WO 95/24314 A1. Four blanket-to-blanket printing units are arranged vertically, one above another, and can be moved horizontally, relative to one another, in the area of their blanket-to-blanket printing positions. To accomplish this movement, the printing units situated on the same side of the web are each mounted within a common frame. At least one of the frames can be moved horizontally.

EP 12 64 686 A1 discloses a printing unit with blanket-to-blanket printing units arranged vertically one above another. The printing group cylinders are mounted in a center frame section, and two inking units are each mounted in outer frame sections. These outer frame sections can be moved horizontally, relative to the center frame section, in order to introduce plate-handling devices into the space between them, as needed.

From DE 22 34 089 C3, a web-fed offset rotary printing press is known. A panel section, having multiple printing groups, can be moved relative to a panel section having the corresponding impression cylinders. The printing group cylinders and their allocated inking units are mounted together as units in this panel section in such a manner that they can be moved or can be removed.

In DE 43 27 278 C2, a printing unit having a structural configuration of a side frame is disclosed. Transfer cylinders and forme cylinders, of a specific circumferential format, are rotatably mounted in the side frame, and specific modular inking units from various types of inking units can be used, as required.

U.S. Pat. No. 2,557,381 A shows a printing unit that can be flexibly equipped for various printing processes and in various numbers of printing positions. In each case, the inking units and the printing group cylinders are arranged, one above another, in the form of a tower, and as such can be moved toward one another and/or away from one another. Different types and different numbers of printing units and inking units or inking systems can be selectively used in a standard frame.

From EP 02 46 081 A2 there is shown a printing unit having multiple modular units, each such unit containing the printing cylinders of a printing group, and containing units configured as inking units. The inking units are horizontally adjustable, relative to the printing cylinders, for the purpose of their activation and deactivation, and can be placed vertically in contact with different printing groups, such as, for example, with different printing groups of different print lengths. The modular units that contain the printing cylinders can be interchanged, as needed, with modular units of other printing lengths.

DE 102 02 385 A1 shows a drive train between the cylinders of a printing group with variable printing lengths. Two intermediate gears are arranged between cylindrical spur gears that do not mesh with one another.

In EP 06 99 524 B1, drive trains for printing units are disclosed. In one embodiment, a paired drive for the printing group cylinders is accomplished with a single motor via enmeshed spur gears.

In WO 03/039872 A1, printing group cylinders are disclosed. In one embodiment, the cylinders are actuated in pairs by a drive motor, and the transmission that couples the two cylinders in each pair is enclosed in its own housing.

DE 195 34 651 A1 discloses a printing unit with cylinders that lie in a single plane. Three of four cylinders are mounted such that they are movable in a linear fashion along the cylinder plane for print-on or print-off adjustment. The mounting is accomplished using guide elements which are arranged on the inner panel of the frame. The cylinders are seated in supports on the shared guide elements, and can be engaged against one another or disengaged from one another by working cylinders which are actuated with pressure medium.

In WO 02/081218 A2, individual linear bearings for two transfer cylinders, each mounted in sliding frames, are known. An actuator for the sliding frames can be configured as a cylinder that can be acted upon by pressure medium. In order to define an end position, for the adjusting movement extending crosswise to the cylinder plane, an adjustable stop is provided.

SUMMARY OF THE INVENTION

The object of the present invention is to provide a mounting for printing group cylinders that is easy to produce and to operate, to provide a printing unit that includes this mount, and to provide methods for adjusting the printing group cylinders.

The object of the present invention is attained, according to the invention, with the provision of a bearing block that supports the journals of a cylinder in a radial bearing. The bearing block is supported by linear guides, and is movable along those linear guides in a cylinder adjustment direction. The bearing assembly, which includes the bearing block and the linear guides, is structured as a complete structural unit.

The benefits to be achieved with the present invention consist in particular, that a printing unit that is easily produced and/or easy to operate is provided, which printing unit simultaneously offers high printing quality.

With side frames, which in one embodiment of the present invention can be partitioned, good accessibility, a contribution to a potential modular construction, and a low overall height are achieved.

By using linear guides for the printing group cylinders an ideal assembly position for the cylinders, with respect to possible cylinder oscillation, is achieved. In addition, by seating the cylinder in linear guides, small adjustment distances are realized, and thus no synchronizing spindle is necessary. The costly incorporation of triple-ring bearings is eliminated.

The cylinder bearings, which are arranged in the interior of the press, on the side frames, but which do not penetrate through the side frames, enable side frame mounting without specific bearing bores. The frames can be configured to be independent of printing format. A cylinder unit can be installed in the frame panels, along with its preadjusted bearing, on-site without further preparation. With the module size that comprises only one cylinder, or cylinder plus bearing units, cylinder formats of different sizes can be used and can optionally be combined.

With one or more preconditions established for modularity, a substantial potential for savings is present, as the number of parts in individual component groups is increased, in terms of both structural configuration and production.

Because the drives for the printing group cylinders and/or for the individual inking units are structured with separate motors or as complete transmission modules, a lubricant is used, for example, only in the functional modules which are already preassembled.

The mounting of the cylinder assemblies on the interior of the side frames, in addition to allowing simple installation, also allows the cylinder journals to be shortened. This has the effect of reducing vibration.

The above-mentioned embodiment, comprising the linear bearing with movable stops, enables a pressure-based adjustment of the cylinders and further allows for an automatic basic adjustment, for a new configuration, for a new printing blanket, and the like.

In one embodiment of a modular automatic handling system, a simple plate change is optionally possible for different formats.

BRIEF DESCRIPTION OF THE DRAWINGS

Preferred embodiments of the present invention are represented in the drawings and will be described in greater detail in the following.

The drawings show:

FIG. 1 a schematic representation of a printing unit; in

FIG. 2 A first operating position of a first embodiment of a printing unit; in

FIG. 3 a second operating position of a first embodiment of a printing unit; in

FIG. 4 a schematic representation of the modularity of a printing unit; in

FIG. 5 a stage of assembly of a printing unit to be configured; in

FIG. 6a)-b d), various examples of modular inking units; in

in FIG. 30 a fifth preferred embodiment of the drive for a printing group.

FIG. 33 a partial section of the inking unit drive shown in FIG. 32; in

FIG. 34 a section through a non-rotatable connection from FIG. 32; in

FIG. 35a a first position and in 35b a second position of the inking unit drive.

FIG. 38 a preferred embodiment of an actuator element; in

DESCRIPTION OF THE PREFERRED EMBODIMENTS

Figure 1:
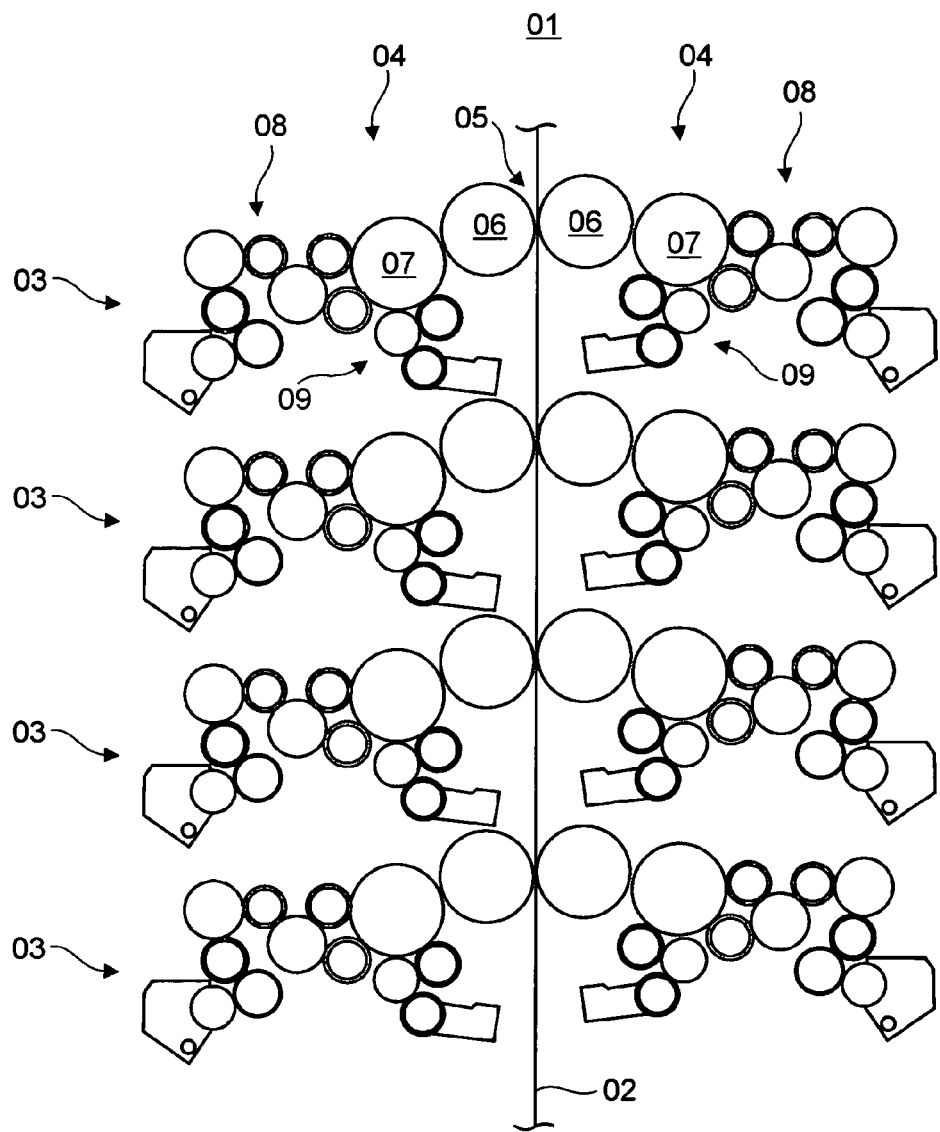

A printing machine, such as, for example, a web-fed rotary printing press, and especially a multicolor web-fed rotary printing press, has, as depicted schematically in FIG. 1, a printing unit 01, in which a web of material 02, referred to here as a web 02, can be printed on both sides in a single process or, especially can be printed successively, in a multi-step process, such as, for example, in this case a four-step process, or in which multiple webs can be printed simultaneously in a single process or in a multi-step process. The printing unit 01 has multiple, and in the depicted example, has four blanket-to-blanket printing units 03 which are arranged vertically one above another for printing on both sides in a blanket-to-blanket operation. The blanket-to-blanket printing units 03—represented in FIG. 1 in the form of arch-type printing units or n-printing units, are each formed by two printing groups 04, each of which printing groups has cylinders 06; 07, one configured as a transfer cylinder 06 and one designed as a forme cylinder 07, for example printing group cylinders 06; 07, and one inking unit 08, and in the case of wet offset printing, also a dampening unit 09. In each case, between the two transfer cylinders 06, at a position of adjustment, blanket-to-blanket printing position 05 is formed. The above-named component parts are identified only on the uppermost blanket-to-blanket printing unit 03 in FIG. 1. The several blanket-to-blanket printing units 03; 04, which are arranged one above another, are essentially identical in configuration, especially in the embodiment of the features which are relevant to the present invention. The blanket-to-blanket printing units 03, without the advantageous feature of the linear arrangement, which will be described below, can be implemented just as beneficially, in contrast to the representation in FIG. 1, as a U-shaped unit that is open toward the top.

In advantageous embodiments of the present invention, the printing unit 01 has one or more of the following features, based upon printing requirements, the type of machine, the technology used and/or the stage of expansion. The printing unit 01 or the blanket-to-blanket printing unit 03 is, or are implemented such that they can be operationally divided, for example, at the center, i.e. in the area of the blanket-to-blanket printing position, 05. The inking units 08, and optionally also the dampening units 09 are configured as modules that already contain multiple rollers and which can be installed as pre-assembled modules in the printing unit 01. Printing group cylinders 06; 07 of different diameters can also be mounted in the side frame without requiring bearing bores. The cylinder bearings can be power-controlled in linear bearings. The rotational axes of the printing group cylinders 06; 07 can be configured to lie essentially in a common plane in print-on. Additionally, or optionally as a separate embodiment the modularity of the printing unit can be advantageously supported by the special paired drive connection, coupled via two intermediate gears, of a pair of printing group cylinders, or via separate drives for the cylinders 06; 07. This also applies, in an advantageous embodiment, to the mechanical independence of the drive for the inking unit 08 and to the optional dampening unit 09 from the drives for the printing group cylinders 06; 07.

In principle, individual or ones of, or several of the aforementioned features are also to be understood as being beneficial for use in printing units that are not printing groups 03 which are configured as blanket-to-blanket printing units used in blanket-to-blanket printing, and which instead have printing groups 03 that operate only in perfecting printing. The transfer cylinder 06 of such a printing group then acts in coordination with an impression cylinder. Especially in modular construction, this can optionally be provided, wherein in place of the two cylinders 06; 07 of the second printing group 04, and of the inking and possibly dampening unit 08, only one impression cylinder is then used. For the arrangement inside the side panels, what is described below, with respect to the other cylinders 06; 07, can then also apply.

Figure 18:
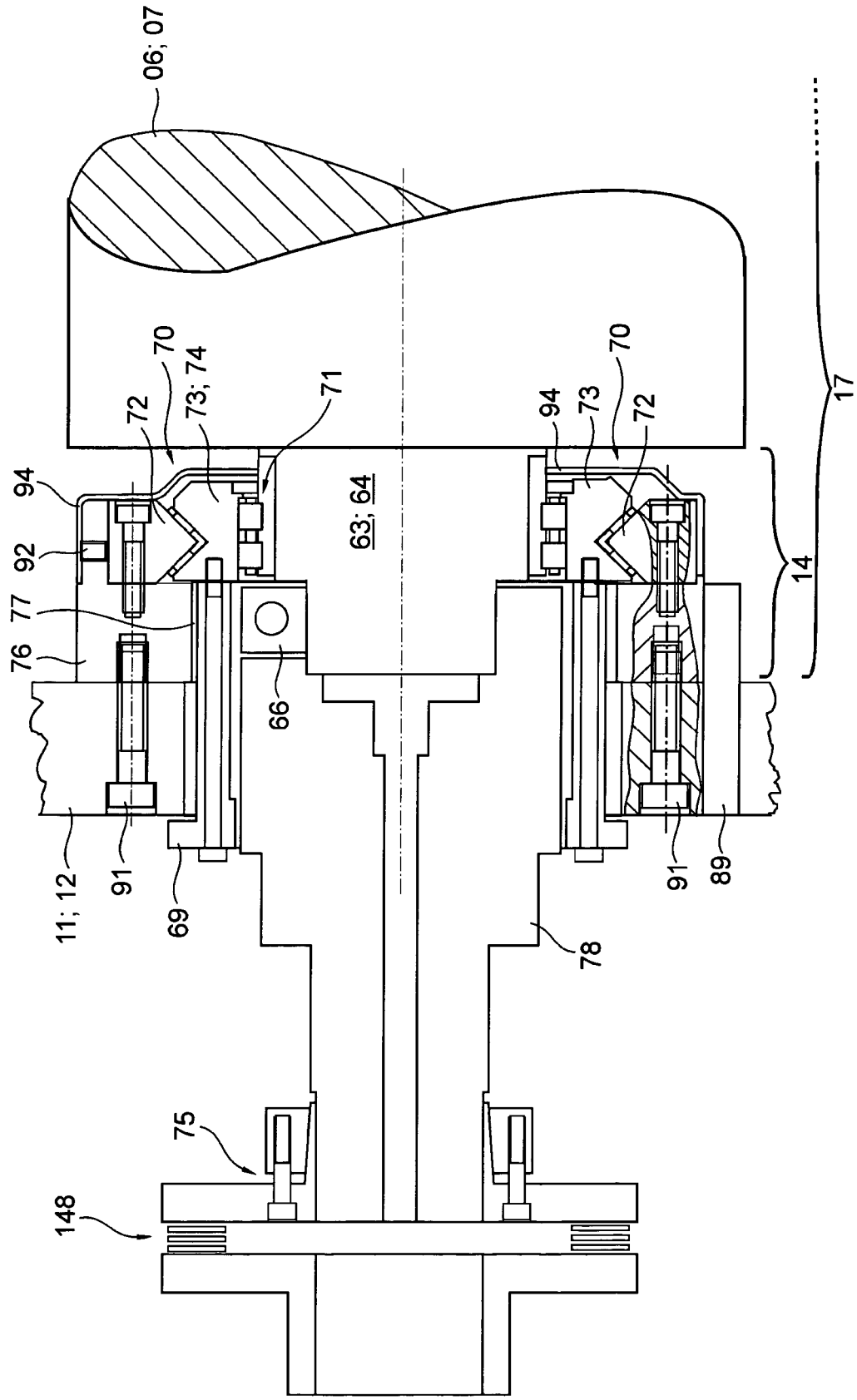
in FIG. 18 a schematic longitudinal section through a bearing unit in accordance with the present invention.

In the subsequent FIGS. 2 and 3, an advantageous embodiment of the printing unit 01 is represented, wherein this embodiment, in principle which is independent from the modular construction of the printing groups 04, also represented there and described in greater detail below, and/or the bearing units 14, indicated by way of example for only the upper blanket-to-blanket printing unit 03, as may be seen in FIG. 18 is configured such that it can be operationally divided in the area of its blanket-to-blanket printing position(s) 05, in other words for set-up and maintenance purposes, as compared with dismantling or a disassembly.

In addition, the printing group cylinders 06; 07 of each of the multiple, such as, for example, the four blanket-to-blanket printing units 03, which are arranged one above another, are rotatably mounted in or on one right frame or panel section 11 and one left frame or panel section 12, in such a manner that the two printing group cylinders 06; 07 of the same printing group 04 is allocated to the same frame or panel section 11; 12. The printing group cylinders 06; 07 of multiple, and especially of all, printing groups 04 that print the web 02 on the same web side are preferably mounted on the same frame or panel section 11; 12. In principle, the printing group cylinders 06; 07 can be mounted on only one side, i.e. overhung, on only one outside-surface frame section 11. Preferably, however, two frame sections 11; 12, which are arranged at the opposite ends of the cylinders 06; 07 are provided for each partial printing unit 01.1; 01.2. The two parts that can be separated from one another are hereinafter referred to as partial printing units 01.1 and 01.2, which comprise the respective frame sections 11; 12 and the printing groups 04, including printing group cylinders 06; 07 and inking units 08.

The two parts that can be separated from one another, including the cylinders 06; 07, the inking units 08 and, if present, the dampening units 09 are referred to in what follows as partial printing units 01.1 and 01.2.

The partial printing units 01.1; 01.2 can be moved in a direction that extend perpendicular to the rotational axis of the cylinders 06; 07, toward one another and away from one another. Preferably one of the two, in this case the partial printing unit 01.1 is mounted fixed in space, in other words, for example, is stationarily fixed on the floor 13 of the printing shop, on a support 13 that is fixed in space, such as a mounting plate 13, or on a mounting frame 13 for the printing unit 01. The other, and in this case the partial printing unit 01.2 is mounted such that it can be moved relative to the floor 13 or support 13 or mounting plate 13 or mounting frame 13, hereinafter referred to as the support 13.

For this purpose, the outer frame sections 12 are mounted in bearing elements for the frame section 12 and the support 13, which bearing elements that correspond with one another, for example together forming a linear guide 15, and which are not illustrated here. These can be configured as rollers that run on tracks, or also as linear guide elements which are mounted on slides or roller bearings and assigned to one another.

Figure 2:
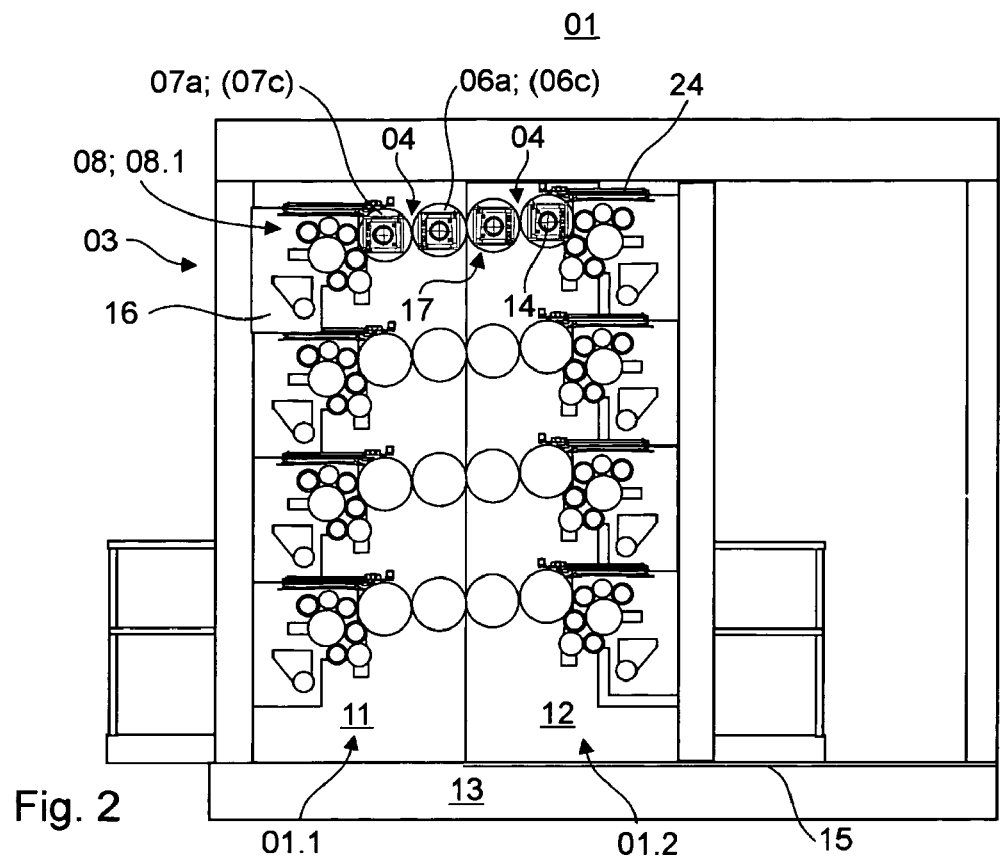

Preferably, the panel sections 11; 12 are structured such that, in their operational position A, as seen in FIG. 2, they are shaped to essentially complement one another in pairs, each on the side that faces the other. When they are pushed together, they form, at their lines of separation or lines of contact, an essentially closed side front.

Figure 3:
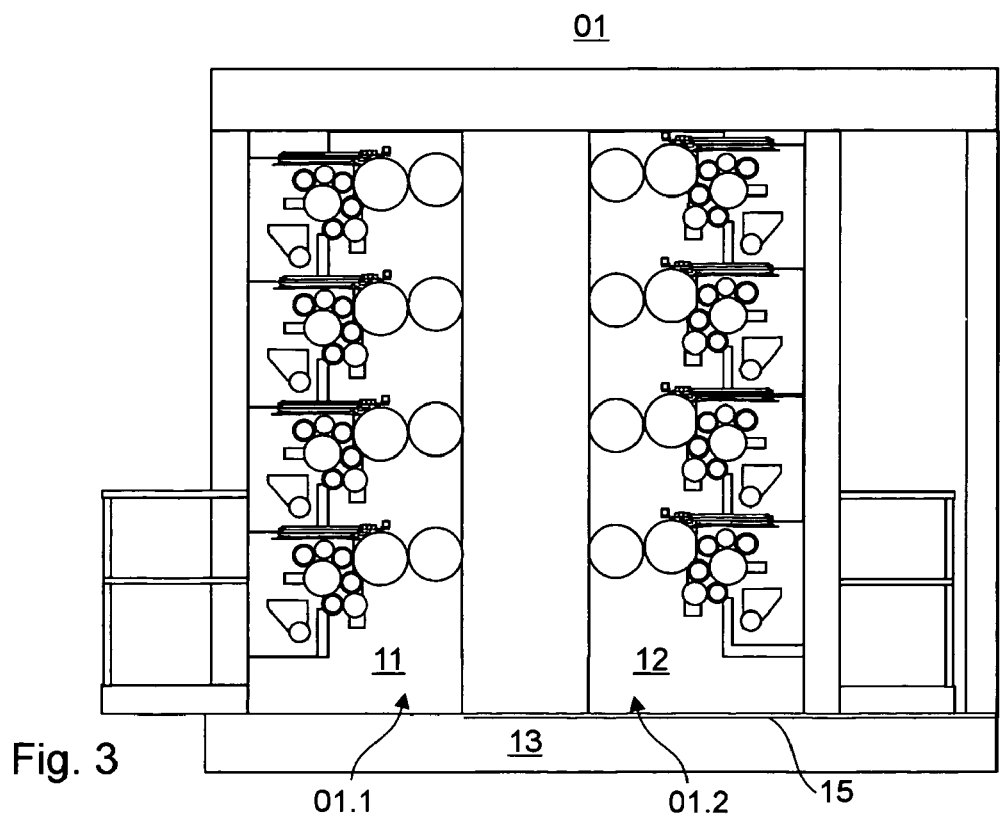

FIG. 3 shows a maintenance position B for the printing unit 01, without the bearing units 14 indicated in FIG. 2. The positioning of the partial printing units 01.1; 01.2, relative to one another, is effected by moving the frame sections 12. In principle, the relative positioning can also be achieved in another embodiment in that both partial printing units 01.1; 01.2, or their frame sections 11; 12, are each movably mounted.

In a first format embodiment, which is represented thus far in FIG. 1 through 3, the forme cylinders 07 and the transfer cylinders 06 are preferably configured to have a cylinder width of at least four, for example four or, for a particularly high rate of production, even six, vertical print pages in newspaper format, especially in broadsheet format. Thus a double-width web 02 can be printed side by side with four, or a triple-width web 02 can be printed side by side with six newspaper pages. The forme cylinders 07 are correspondingly loaded with four or with six printing formes, especially with their ends aligned with one another, and positioned axially side by side. In a first advantageous format embodiment, as represented thus far in FIG. 1 through 3, the cylinders 06; 07 each have a circumference that corresponds essentially to two print pages which are arranged in tandem in newspaper format.

In the embodiments of the printing unit 01 with forme cylinders 07 of double-sized format, with two newspaper pages in tandem in circumference, such a printing unit advantageously has two axially extending channels, offset 180° relative to one another in the circumferential direction, to accommodate the ends of the printing formes, which two channels preferably are configured to be continuous over the entire active surface length. The forme cylinder 07 can then be loaded with four or with six printing formes side by side, with every two printing formes in tandem.

In one embodiment, for example, in the double-sized format, with newspaper pages in tandem in circumference, the transfer cylinder 06 has only one channel, which is configured to accommodate one or more printing blankets arranged side by side, which channel preferably is configured to be continuous over the entire active surface length. The transfer cylinder 06 can then be loaded with one printing blanket that is continuous over the cylinder surface length and that extends over essentially the full circumference, or with two or three printing blankets, located axially side by side, with each extending over essentially the full cylinder circumference. In another embodiment of the double-sized transfer cylinder 06, that cylinder can have two or three printing blankets side by side, wherein the respective adjacent blankets are offset 180° relative to one another in the circumferential direction. These printing blankets, which are offset relative to one another can be held in two or in three channel sections, which also are offset, side by side, in the lengthwise direction of the cylinder 06, while the respective adjacent channel sections are offset 180° relative to one another in the circumferential direction.

As previously indicated in FIGS. 2 and 3, in an advantageous embodiment of the printing unit 01, in principle which is independent of its ability to be partitioned or separated, the inking units 08 or the cylinder units 17 formed from bearing units 14 and the relevant cylinder 06, or preferably both the inking units 08 and the cylinder units 17, are implemented as modules, or in other words as structural units that are considered as being preassembled in structural terms.

The inking units 08, which are implemented as modules, have, for example, a suitable frame 16 or a framework 16, in which multiple functional parts, in this case at least three, and especially all of the rollers, and an ink source or an ink supply, such as an ink chamber blade, ink fountain, application nozzles, and the like, for the inking unit 08, even without connection to the side frame 11; 12 of the printing unit 01, maintain their firmly defined positions relative to one another, and, for example, can be installed preassembled and complete into the printing unit 01. The framework 16 or the frame 16 can be implemented particularly as two side frames which are arranged at the end surfaces of the rollers, and which are connected to one another, such as, for example, via at least one cross member and/or one base that is not specifically represented. During mounting, the frame 16 that accommodates the functional components of the module is securely connected, such as with adhesive force or in a separable positive connection to the side frame 11; 12 of the printing unit 01. If the printing unit 01 is implemented in the aforementioned manner to be partitionable or separable, then the inking units 08, implemented as modules, are connected to the respective frame or panel sections 11; 12—with adhesive force, such as by welding, or in a separable positive connection, such as by screws or bolts, during mounting. The complete side frame on one side of the printing unit 01, or a complete side frame of a partial printing unit 01.1; 01.2, is then comprised of multiple parts, comprising one side frame 11; 12, that accommodates the cylinders 06; 07 and of partial side frames for the inking units 08. Separable, in this context, does not mean an operational separability, but only a dismantling in terms of a disassembly of the printing unit 01 or a removal/exchange of the inking unit 08.

Modules which are implemented as cylinder units 17, as described below in reference to FIGS. 17 and 18 have, for example, a cylinder 06; 07 with journals 63; 64 and a bearing unit 14 that is already mounted on the journals 63; 64 and which may be prestressed and/or preadjusted. Bearing unit 14 and cylinder 06; 07 are provided with their securely defined position relative to one another prior to their installation into the printing unit 01, and can be installed as a complete unit into the printing unit 01.

Figure 4:
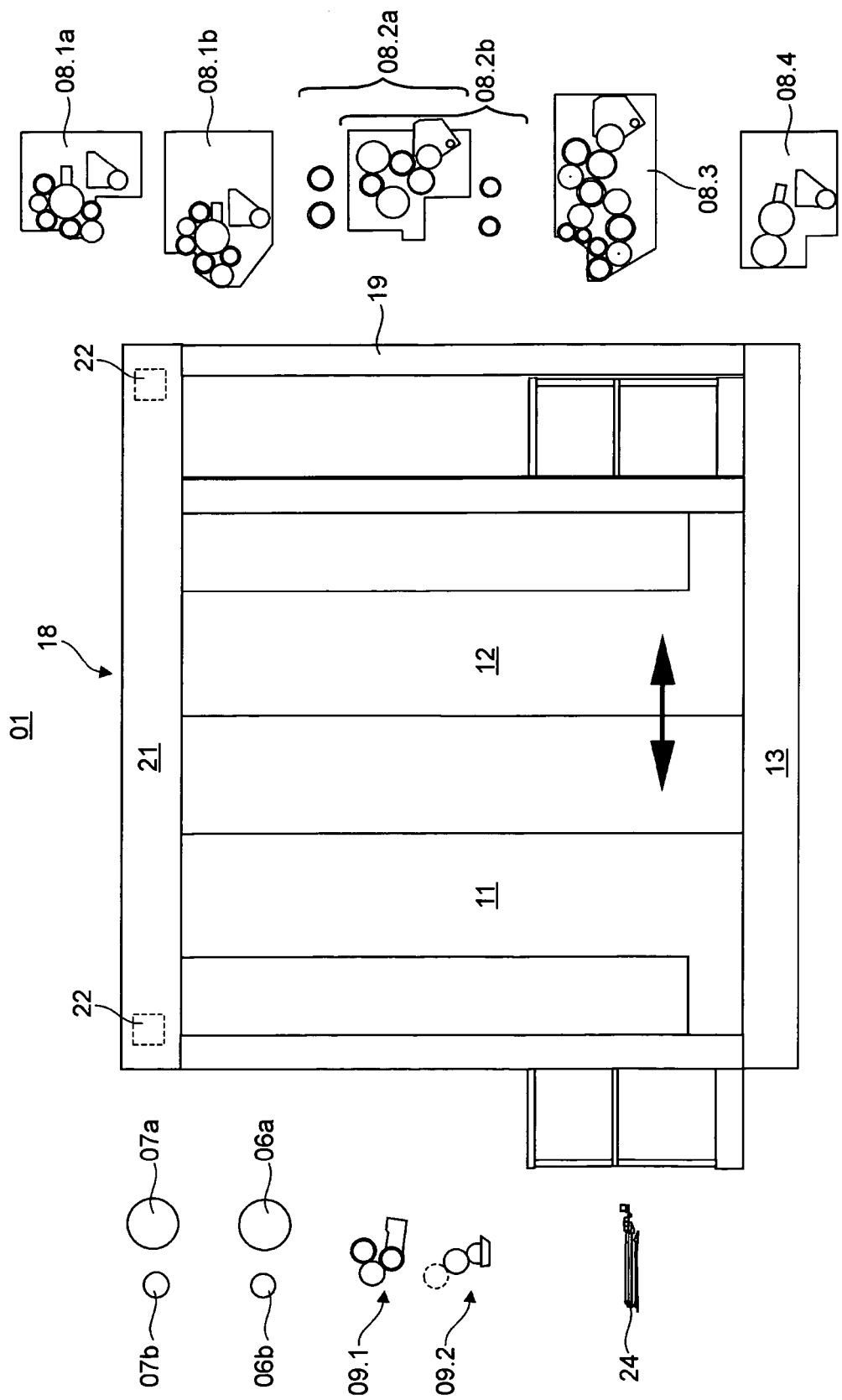

FIG. 4 illustrates a system for a printing unit 01 of modular construction, which can, in principle, be implemented to be either partitionable, as represented in FIG. 4, or as being non-partitionable. In the latter case, the side frame 11; 12 that accommodates the cylinders 06; 07 would be arranged not in two parts, but instead as a single part, and would fixed in its position in the printing shop. However the partitionable configuration, as represented in FIG. 4, is advantageous.

In the case of the non-partitionable arrangement, for example, two side frames 11; 12, which are arranged at the end surfaces of the cylinders 06; 07, together with the support 13, or mounting plate 13 or mounting frame 13, and at least one, and preferably two cross members that connects the two sides above a center height, and which are not illustrated in this case, form a basic structure 18 for the printing unit 01.

For the partitionable format, the basic structure 18 is provided, for example, by the lower supports 13, the two frame sections 11, each of which is arranged fixed in location, at least one pillar 19 for each side of the printing machine, an upper support 21 that connects the frame section 11 which, that is arranged fixed in location, to the pillars 19 on each side of the printing machine, and at least one, and preferably at least two cross members 22 that connects the two sides above a center height, represented here only by a dashed line. The frame sections 11; 12 can be implemented as essentially continuous panel sections, each as a single piece and which are flat, or, to allow a lighter construction and/or improved accessibility of the unit, these frame sections 11: 12, as represented here, can be kept thin in each case and, optionally, can additionally be connected with one or more vertically supporting pillars for each side frame, and which are not separately provided with reference symbols, for the purpose of stabilization.

This "hollow" basic structure can now be configured or equipped with printing group cylinders 06; 07 and with inking units 08 of various designs.

As is also represented in FIG. 4, a transfer cylinder 06a having the circumference of two printed pages in vertical position, and especially of two newspaper pages in broadsheet format, or double sized, or a transfer cylinder 06b having the circumference of one printed page, especially a newspaper page in broadsheet format, or single sized, can be used accordingly as the transfer cylinder 06. It is also possible to load the basic structure with forme cylinders 07a having the circumference of two printed pages in vertical position, especially newspaper pages, or having a simple circumference, such as forme cylinder 07b, with one printed page, especially one newspaper page in broadsheet format, in circumference. In principle, any combination of forme and transfer cylinders 07; 06 having a whole-number circumferential ratio of forme cylinder to transfer cylinder 07; 06, for example 1:1, 1:2, 2:1, 3:1, 1:3, 3:2, 2:3, but preferably with a forme cylinder 07 that is equal or equal to the transfer cylinder 06, can be utilized in the basic frame structure.

In the implementations of the printing unit 01 with forme cylinders 07 of single-size format, or of one newspaper page in circumference, such a unit is advantageously equipped, viewed in a circumferential direction, with a channel configured to accommodate the printing formes, which channel preferably is structured to be continuous over the entire active barrel length. The forme cylinder 07 can then be loaded with four or six printing formes placed axially side by side.

In the case of a single-size format of one newspaper page in circumference, in one embodiment, for example, the transfer cylinder 06 has only one channel, which is configured to accommodate one or more printing blankets arranged side by side, which channel is preferably structured to be continuous over the entire active barrel length. The single-circumference transfer cylinder 06 can then be loaded with one printing blanket that is continuous over the barrel length and extends over essentially the entire circumference, or with two or three printing blankets which are arranged axially side by side and extending over essentially the entire circumference.

In embodiments in which a single-sized forme cylinder 07 operates in coordination with a double-sized transfer cylinder 06, those parts that are mentioned in reference to the double-sized transfer cylinders 06 and the single-sized forme cylinders 07 can be utilized together.

The optional configuration with, for example single-sized or double-sized cylinders 06; 07 having circumferences for different printed page formats, such as, for example, for newspaper formats with circumferences that differ from one another is also possible. Thus, the circumferences of the double-sized cylinders 06a; 07a can range from 840 to 1,300 mm, and especially from 860 to 1,120 mm, and those of the single-sized cylinder 06b; 07b can correspondingly range from 420 to 650 mm, from especially 430 to 560 mm, or even from 430 to 540 mm. With the cylinder unit 17 that is described in greater detail below, this modular construction is favored to a considerable degree. In this case, it is not necessary to provide bearing bores that take into account the precise positioning and geometry of the cylinders 06; 07, for the precise accommodation of three- or four-ring bearings having, for example, eccentrics in the side frame 11; 12.

Figure 5:
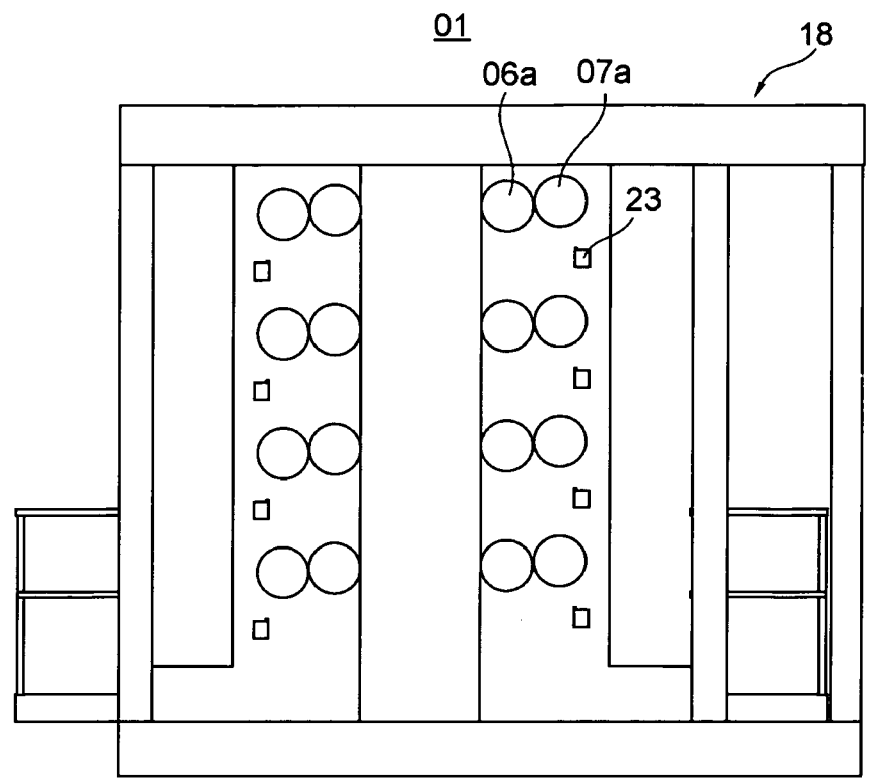

In FIG. 5 the printing unit 01 is implemented, by way of example, with cylinders 06a; 07a of double circumference. If it is equipped instead with single-sized forme cylinders 07b, these can coordinate with double-sized transfer cylinders 06a for the purpose of increasing stability, as will be discussed below with reference to FIG. 7, 9, 13, or also with single-sized transfer cylinders 06b for the purpose of conserving space.

Most advantageously, it is possible, at least in principle independently of the partitionability of the printing unit 01 and/or of the modular installation of cylinder units 17, to implement the printing unit 01 in a modular fashion with inking units 08 of various types, based upon a user's needs. The various inking unit types can include short inking units 08.1, single-train roller inking units 08.2, for example with two distribution cylinders, for example from newspaper printing, or roller inking units 08.3 with two ink trains and, for example, three distribution cylinders, for example from commercial printing.

Figure 6:
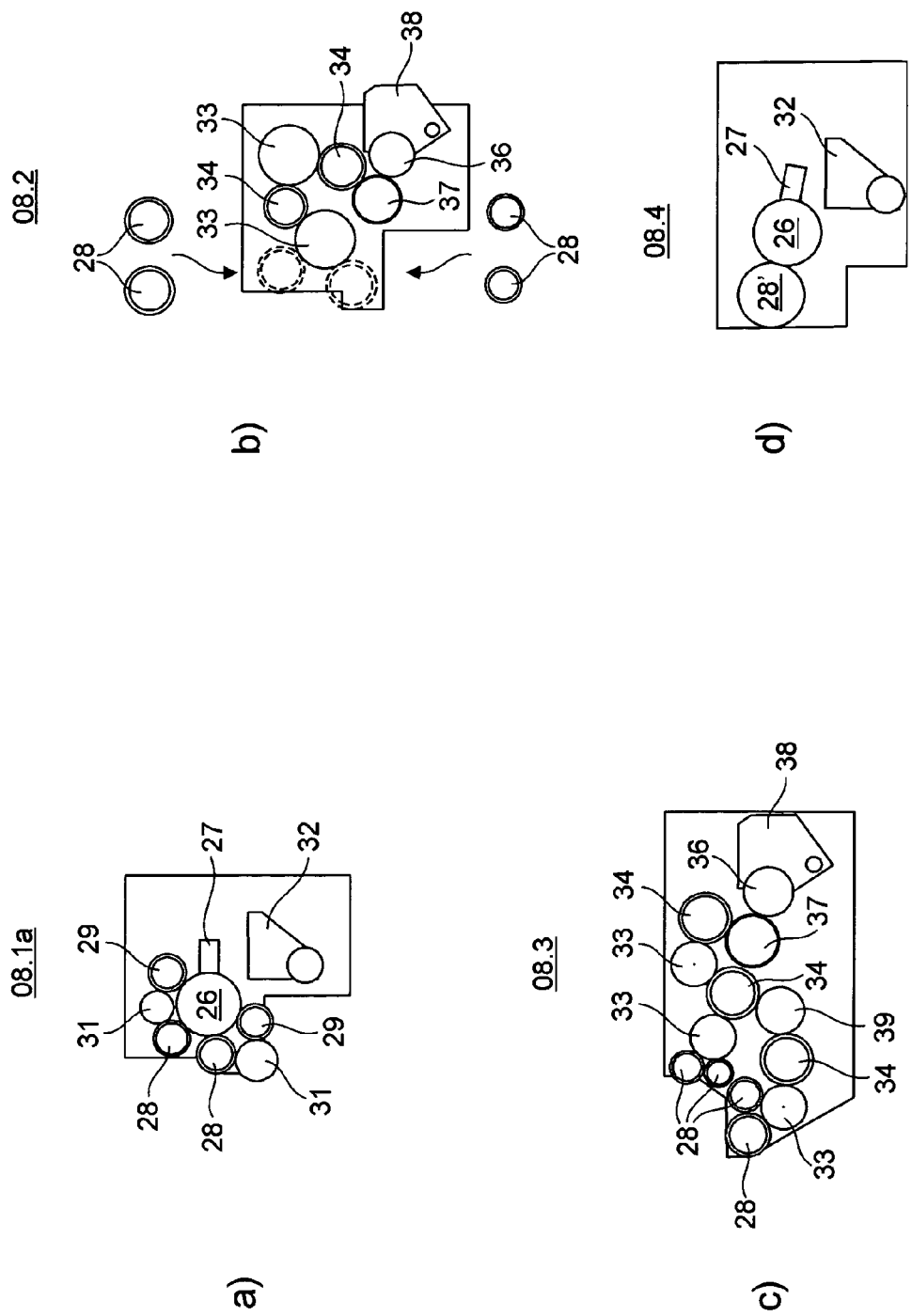

The inking unit 08, which is implemented as a short inking unit 08.1 in a first variant, as seen in FIG. 6a, has a central roller 26 with grid marks or cells, such as, for example, an anilox or screen roller 26, which receives the ink from an inking device 27, especially an ink chamber blade 27, or also from an ink fountain via a roller train that is not specifically illustrated here, and delivers the ink to the printing forme of the forme cylinder 07 via at least one, and preferably at least two rollers 28, such as, for example, two forme rollers 28, especially having a soft surface. Advantageously, the central roller 26 acts in coordination with two additional soft rollers 29, such as, for example, two inking or forme rollers 29. To even out the ink distribution, an axial roller 31, for example an oscillating distribution roller 31, preferably with a hard surface, acts in coordination with each forme roller 28 and its adjacent inking rollers 29. The ink application device 27 receives its ink, for example, from an ink reservoir 32, especially via a pump device that is not specifically illustrated here, and into which excess ink can also drip. The anilox roller 26 is preferably rotationally actuated by its own drive motor that is independent of the cylinders 06; 07. The remaining rollers 28; 29; 31 are preferably actuated by friction. In the case of an increased requirement for variation, the oscillating motion can be provided by a separate drive element, or, as in this case, can be provided, at reduced expense, by a transmission, which converts the motor's rotational motion into axial motion.

The inking unit 08 that is implemented as a single-train roller inking unit 08.2, or also as a "long inking unit", as seen in FIG. 6b, has at least two forme rollers 28 that apply the ink to the printing forme. These rollers 28 receive the ink via a roller 33 that is near the printing forme, especially an oscillating distribution roller 33 or a distribution cylinder 33, provided, for example, with a hard surface, a roller 34, especially an ink or transfer roller 34, which is provided, for example, with a soft surface, an oscillating distribution roller 33 or distribution cylinder 33, that is arranged distant from the printing group, an additional inking or transfer roller 34, for example with a soft surface, a roller 37, especially a film roller 37 and a roller 36, especially an ink fountain roller or dipping roller 36, from an ink fountain 38. Dipping rollers and film rollers 36; 37, which are characteristic of a film inking unit, can also be replaced by a different ink supply or metering system, for example by a pump system in an ink injector system, or a vibrator system in a vibrator inking unit. In one embodiment, the distribution cylinders 33, together or respectively individually, are rotationally actuated by their own drive motor that is independent from the cylinders 06; 07. The roller 36, and, in a further development also optionally the film roller 37, is also advantageously provided with its own rotational drive motor. In the case of an increased requirement for variation, the oscillating motion of the distribution cylinder 33 can be provided via a separate drive element, or, as in this case, at decreased expense, via a transmission, which converts the rotational motion of the motor into axial motion. An advantageous further embodiment of the single-train inking unit 08.2, which, for example, is also implemented in the form of a module, is presented subsequently in the framework of the description of FIG. 31 through 35.

The inking unit 08 that is implemented as a two-train roller inking unit 08.3, as seen in FIG. 6c, has at least three, and in this case has four forme rollers 28 that apply the ink to the printing forme, which rollers 28 receive the ink via a first ink train comprised of a first distribution cylinder 33, a soft inking roller 34 and a hard transfer roller 39, and via a second ink train, with a second distribution cylinder 33, from a shared soft inking roller 34, a distribution cylinder 33 that is distant from the forme cylinder, a further soft inking roller 34, a film roller 37 and an ink fountain roller 36, from an ink fountain 38. As mentioned above, the ink fountain and film rollers 36; 38 can also be replaced, in this case, by a different ink supply or metering system.

Preferably, the three distribution cylinders 33, together or each separately, can be rotationally actuated by their own drive motors, which are independent from the cylinders 06; 07. The ink fountain roller 36, and, in a further development, optionally the film roller 37, are preferably also provided with their own separate rotational drive motors. In the case of an increased requirement for variation, the oscillating motion of the distribution cylinders 33 can also be provided, together, or each individually, by a separate drive element, or, as in this case, at reduced expense, by a transmission, which converts the rotational motion of a drive motor into axial motion. Although this inking unit 08.3 can also be used in newspaper printing, it is preferably provided for the configuration of the printing unit for commercial printing.

In a second variant, as seen in FIG. 6d for a short inking unit 08.4, which is also called an "anilox inking unit", the unit has only one large forme roller 28', especially one whose size corresponds to that of the forme cylinder 07, which roller 28' receives the ink from the anilox roller 26, which is also large in one variant, and which anilox roller 26 is inked up by the ink application device 27, such as, for example, by a blade system 27, and especially the ink chamber blade 27. This inking unit 08.4, because of its inclination toward doubling, due to the 1:1 ratio between the forme roller 28' and the forme cylinder 07, can be used equally well in printing units 01 which are configured for newspaper printing, and especially in those for commercial printing.

Figure 7:
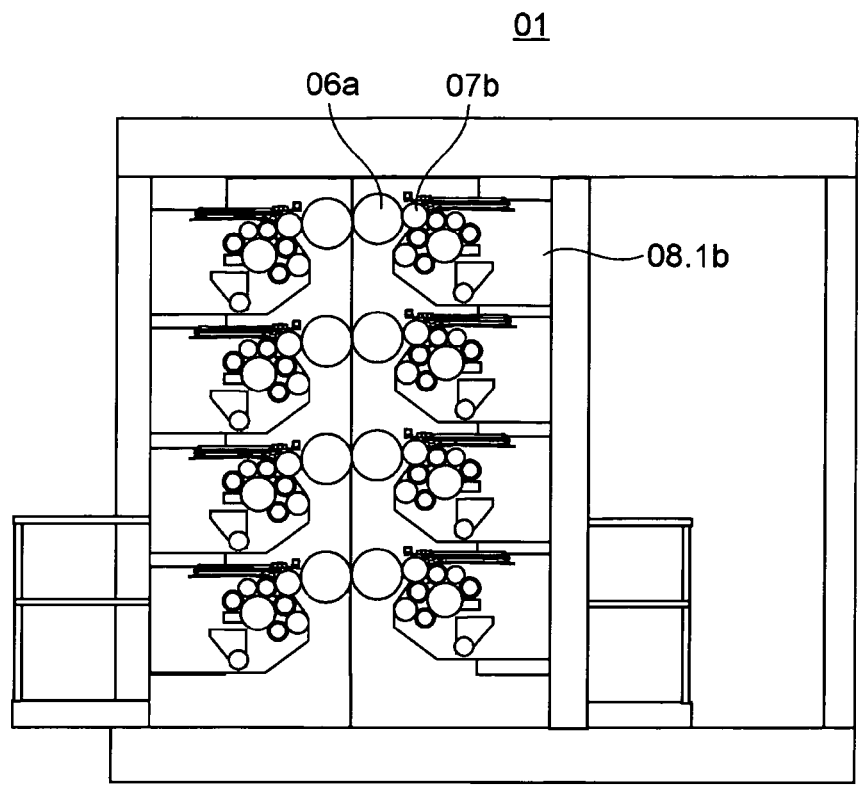
FIG. 7 a second preferred embodiment for the configuration of a printing unit.

Advantageously, for the inking units 08 of the same type, different embodiments can be provided for the respective different formats of the forme cylinder 07a; 07b, as indicated in FIG. 4. In addition to the modular use of different inking unit technologies, the different formats can then also be operated in a modular fashion. The inking units 08 of the same type are then advantageously constructed in the same manner, but differ from one another, optionally, in their geometric orientation overall, or at least in the geometric orientation of the forme rollers 28; 28'. Thus, depending upon the forme cylinder 07a; 07b, either the short inking unit 08.1a, shown in FIG. 2 or the short inking unit 08.1b, shown in FIG. 7, is to be used. If a differentiation is made between more than two circumferential formats for the forme cylinder 07 that can be distinguished from one another, then there can be a corresponding number of embodiments for inking units 08 of the same type. What is essential here is that at least the actuated components, rotationally axially assume the same position, at least relative to one another, at least for the different inking unit formats of the same type.

The side frames 11; 12 for multiple inking units 08 of the same type, and/or of different types, advantageously have the same base that supports the inking unit 08, and the same recess or stops. However, they can also be configured in terms of their shape, such that they are capable of accommodating multiple inking units 08 of the same type or of different types. In addition, suspension edges or bearing surfaces that can be used for different inking units 08, or multiple different suspension edges or bearing surfaces at the same time, each structured to work with different inking units 08, can be prepared in the side frame 11; 12 after production.

By way of example, in FIG. 5 one cross member 23 is shown for each printing group 04, on which cross member 23 the respective inking unit 08 can be seated or suspended. In addition, or as an alternative, in their mounted state, the inking units 08 can be stacked one above another, and/or can additionally be secured or fastened to the vertical pillars.

As was represented in FIGS. 2 and 3, the printing unit 01, for example for use in newspaper printing, is equipped, in an advantageous first embodiment, with short inking units 08.1, such as shown in FIG. 6a. Because the forme cylinder 07a is implemented in a double format, the printing unit 01 is equipped, for example, with a corresponding short inking units 08.1a. In this embodiment, the printing and inking units 04; 08 are configured for "dry offset" or for "waterless offset printing". In other words, the printing forme and the inking unit 08 are structured such that no dampening agent and thus no dampening unit 09 are provided.

FIG. 7 shows, in a second preferred embodiment, for example for use in newspaper printing, the loading of the printing unit 01 in dry offset printing with short inking units 08.1b for the case of a single-sized forme cylinder 07b.

Figure 8:
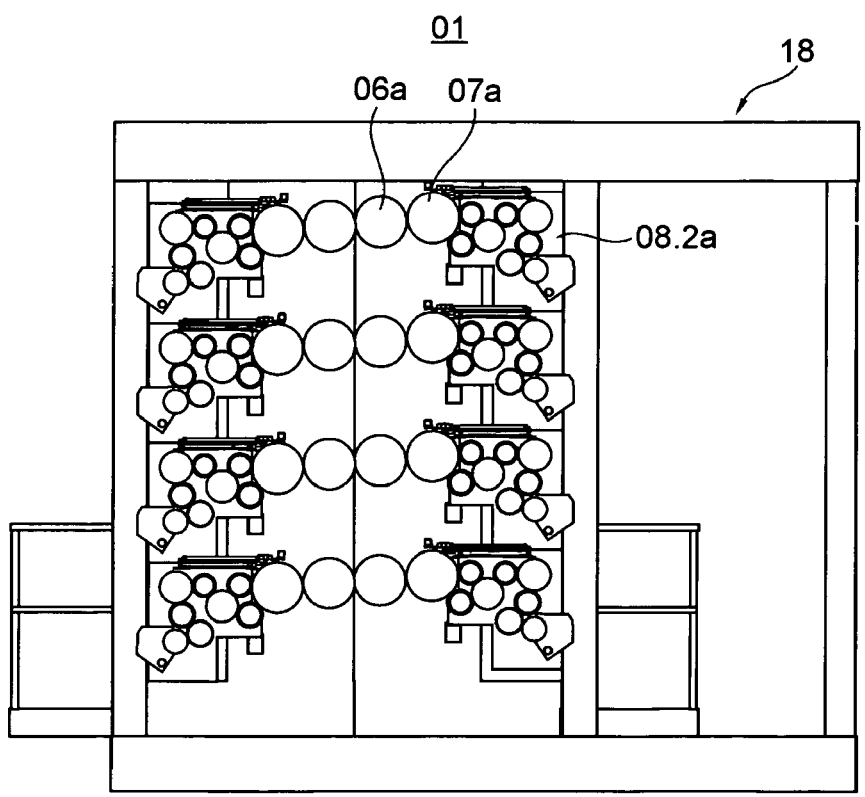
in FIG. 8 a third preferred embodiment for the configuration of a printing unit.
Figure 9:
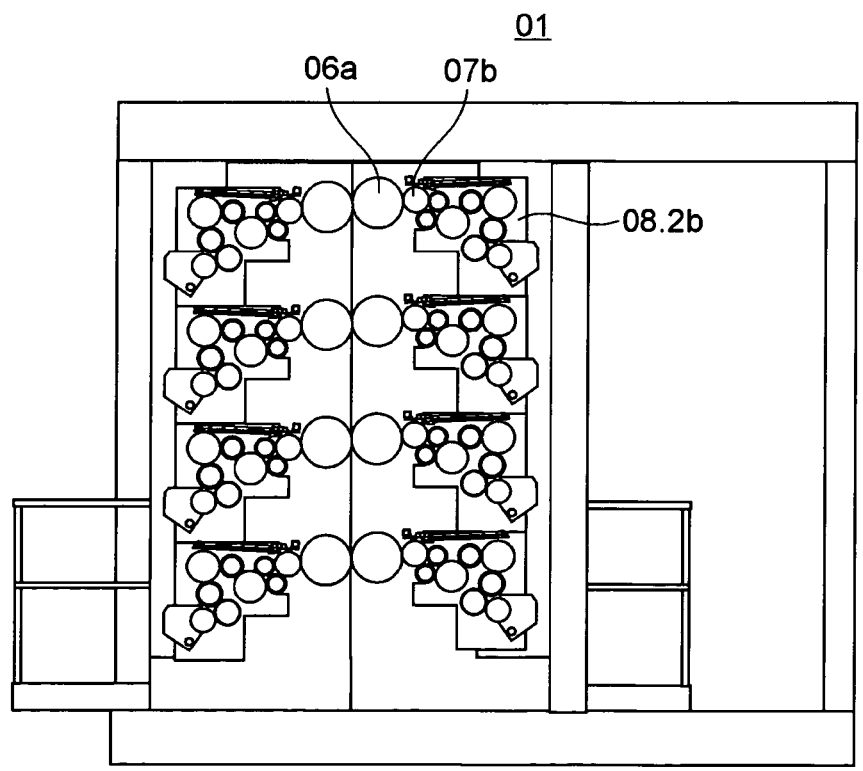
in FIG. 9 a fourth preferred embodiment for the configuration of a printing unit.

FIG. 8 and FIG. 9 show the printing unit 01, for example for use in newspaper printing, in a third and a fourth embodiment, respectively, and loaded with single-train roller inking units 08.2a; 08.2b, in the first case one with double-sized forme cylinders 07a, and in the second case with single-sized forme cylinders 07b, each for dry offset printing.

Figure 10:
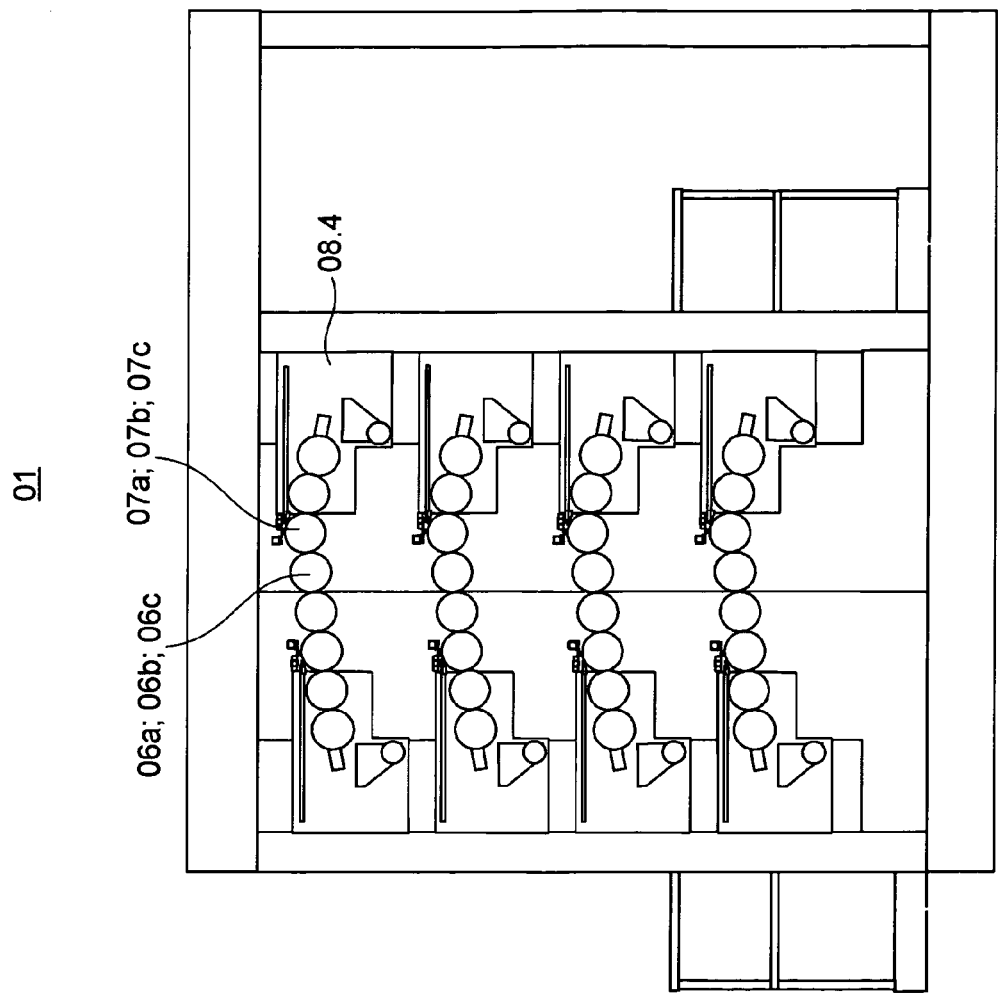
in FIG. 10 a fifth, sixth and seventh preferred embodiments for the configuration of a printing unit.

FIG. 10 shows the printing unit 01, alternatively intended for newspaper printing or for commercial printing, but indicated here, in a shared representation, in fifth, sixth and seventh embodiments, as being equipped with the second variant of the short inking units 08.4, with double-sized forme cylinders 07a, with single-sized forme cylinders 07b, or with a forme cylinder 07c, as will be described below, for commercial printing, each in a dry offset printing process. The forme roller 28', as shown in FIG. 6d in each case preferably has the circumference of the allocated forme cylinder 07a; 07b; 07c.

In addition to the embodiments for dry offset printing described thus far, the embodiment of printing groups 04 operating in "wet offset printing" is also advantageously provided in the modular concept. In other words, in addition to ink, dampening agent is also supplied to the printing forme via a dampening unit 09 which is strictly separated from the inking unit 08, or which is connected, in parallel, via a stripper roller, to the inking unit 08.

Figure 11:
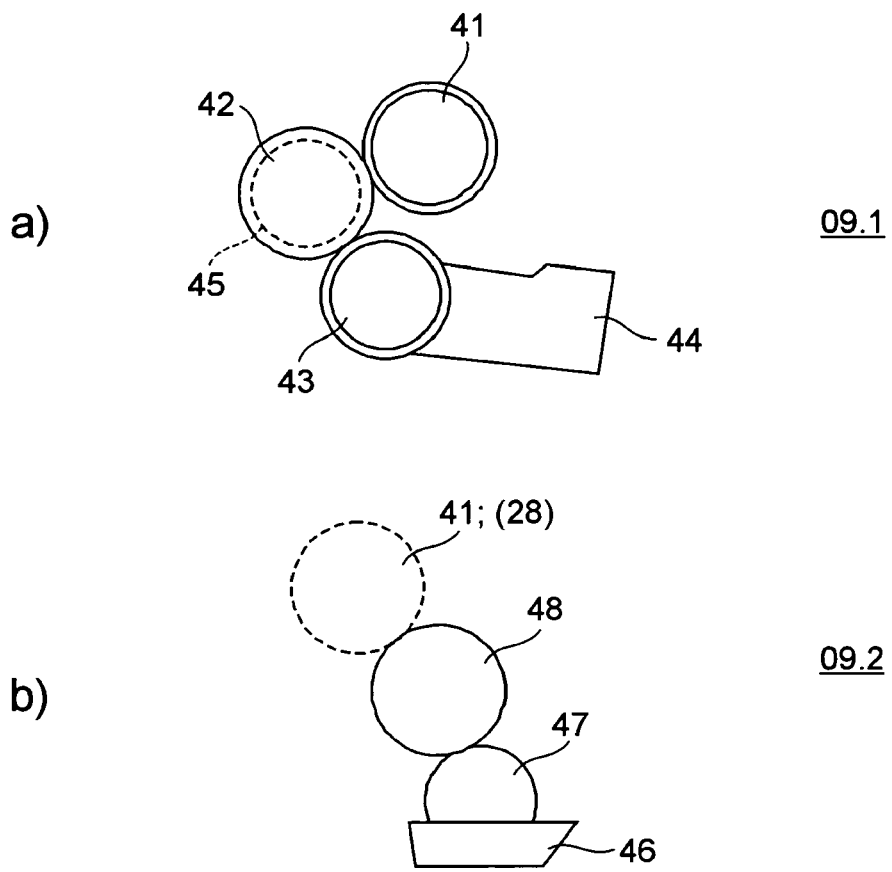
in FIGS. 11a) and 11b) various examples of modular dampening units.

In FIG. 4, and in FIG. 11 a, a first embodiment of the dampening unit 09 is represented by a solid line as the dampening unit 09.1 having at least three rollers 41; 42; 43. Preferably, the dampening unit 09.1 is implemented as a so-called contactless dampening unit 09.1, and especially as a spray-type dampening unit 09.1. The dampening agent is transferred to a last roller 43 in the dampening unit 09 in a contactless manner from a dampening agent source 44. This can be accomplished, for example, via contactless casting, contactless brushes, or in some other manner, but preferably via spray nozzles in a spray bar 44. If three rollers 41; 42; 43 are present in a row between the spray bar 44 and the forme cylinder 07, without optional rider rollers, then the roller 41 that acts in coordination with the printing forme, such as, for example, the forme roller 41, is preferably implemented with a soft surface, for example rubber. A subsequent roller 42, preferably configured as an oscillating distribution cylinder 42, is preferably implemented with a hard surface, for example of chromium or precious steel, and the roller 43 that, in a three-roller dampening unit 09.1 receives the dampening agent from the dampening agent source 44, is preferably implemented with a soft surface, for example rubber. In an alternative four-roller, contactless dampening unit 09, a fourth roller having, for example, a hard surface, which is not illustrated here, follows the soft roller 43, and receives the dampening agent. In this embodiment, the distribution cylinder 42 is preferably rotationally actuated via its own drive motor that is independent from the cylinders 06; 07. The two rollers 41 and 43 are actuated via friction. In an alternative variant, a separate rotational drive motor can also be provided for the roller 43. The oscillating motion of the distribution cylinder 42 can be accomplished via its own drive element, or, as provided for here at reduced expense, by a transmission that converts its rotational motion into axial motion.

FIG. 11 *a*), in its representation utilizing the circle shown by a dashed line, illustrates a particularly advantageous further development of the three-roller dampening unit 09.1 from FIG. 11 *a*). In contrast to the dampening unit 09.1 according to FIG. 11 *b*), the roller 42 is configured with an ink-friendly or oleophilic surface 45, in which i.e. the contact angle of the wetting with corresponding fluid, especially the ink, is smaller than 90°, and which is made for example, of rubber or plastic, such as for example, a polyamide material. Thus, in this embodiment, the circumferential surfaces of all three rollers 41; 42; 43 in the dampening unit 09 are structured with an ink-friendly or oleophilic surface 45, in which the contact angle of the wetting with corresponding fluid, especially the ink, is smaller than 90°. In principle, this center roller 42 can be configured as a roller 42 that is secured in an axial direction. In other words it cannot oscillate. Especially for the case in which the roller 42 is provided with a soft surface, especially of rubber, a positive rotational drive for the rollers 41; 42; 43 can be omitted and these rollers 41; 42; 43 can all be actuated merely via the friction of the forme cylinder 07, with roller 41 being driven by forme cylinder 07, roller 42 driven by roller 41, and roller 43 driven by roller 42. A positive drive, which is provided in connection with FIG. 26 through 30 via a separate drive motor 132 or a drive connection 141, is entirely omitted in this embodiment. None of the rollers 41; 42; 43 has an additional positive rotational drive, in addition to the drive by friction. If the roller 42 is configured as an oscillating roller 42, then the forced oscillating motion can be provided, either by an expressly provided motorized oscillation drive or by a transmission that converts the rotational motion into axial motion.

In one variant of the embodiment according to FIG. 11 *a*), in the representation utilizing the circle shown by a dashed line, the center roller 42 of the three rollers 41; 42; 43 in the dampening unit roller train has an ink-friendly surface or circumferential surface 45 which is made of plastic, for example a polyamide material such as especially Rilsan. In this connection, in one embodiment, it can be advantageous for this roller 42 to be positively rotationally actuated via its own drive motor 132, which is mechanically independent of the printing unit cylinders 06; 07, or via a drive connection 141 by the printing group 04 and/or the inking unit 08, as may be seen below in reference to FIGS. 26 and 30. If the roller 42 is utilized as an oscillating roller 42, then to accomplish the forced oscillating motion, either a motorized oscillating drive or a transmission that converts the rotational motion into axial motion can again be provided.

A "soft" surface in this context is understood to mean a surface that is elastically compliant in a radial direction. In other words, the surface has an elasticity modulus, in a radial direction, of preferably at most 200 Mpa, and especially less than or equal to 100 Mpa. The roller 43 that receives the dampening agent from the dampening agent source 44, and/or the roller 42 that is arranged in the roller train downstream in the direction toward the forme cylinder 07, preferably has a circumferential surface having a hardness in the range of between 55° and 80° Shore A. The roller 41 that applies the dampening agent to the forme cylinder 07 preferably has a circumferential surface having a hardness in the range of between 25° and 35° Shore A.

Figure 14:
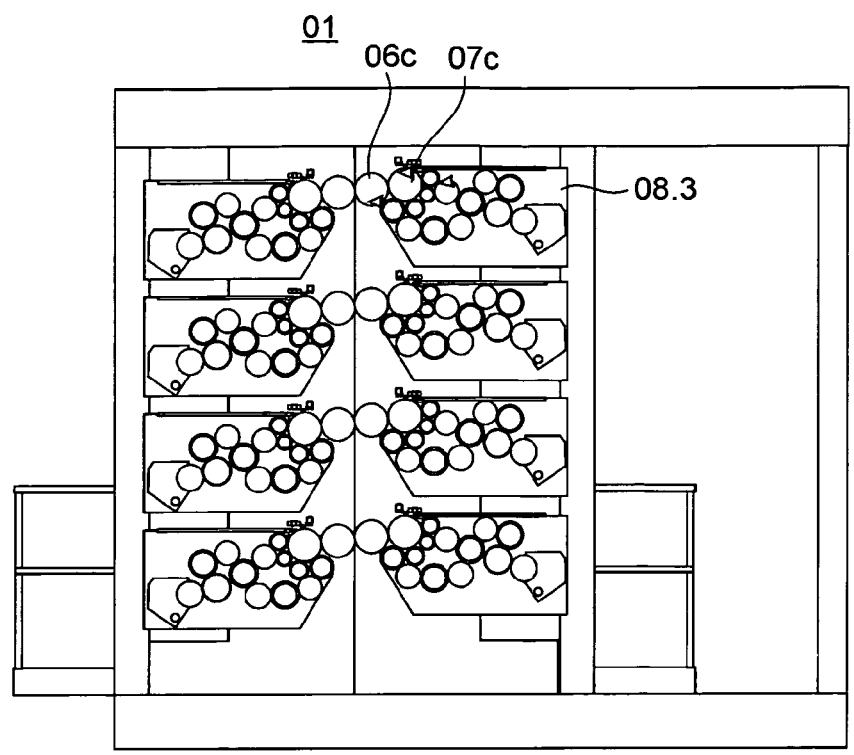
in FIG. 14 a tenth preferred embodiment for the configuration of a printing unit.

In FIG. 4 and FIG. 11 *b*) there is depicted a second embodiment of the dampening unit 09 as a contact dampening unit 09.2, such as a film dampening unit, a vibrator, or a rag or brush dampening unit having a total of three rollers 47; 48; 41 (28) in a row between the dampening agent receiver 46 and the forme cylinder 07. The dampening unit 09.2 is preferably configured as a so-called film dampening unit 09.2, wherein a last roller 47, which is structured as a dipping roller or as a fountain roller 47, dips into the dampening agent receiver 46, for example a dampening agent pan 46, and transfers the dampening agent it takes up, via a roller 48, for example an oscillating distribution roller 48, and especially a roller 48 with a smooth and hard surface, such as, for example, of chromium, onto at least one forme roller 41 having a soft surface. The at least one forme roller 41 is indicated here only by a dashed line, as it can be a shared forme roller 28 (41) that is either allocated only to the dampening unit 09, which is not shown in FIG. 14, or, as illustrated in FIG. 14, which roller is allocated to both the inking and dampening units 08; 09 simultaneously, and which, for example, optionally guides only dampening agent, or guides both dampening agent and ink. If the dampening unit 09.2, as seen in FIG. 11*b* is structured, as shown here, with a total of three rollers, then the dipping roller 47 is preferably implemented with a soft surface. In an alternative four-roller contact dampening unit 09.2, a fourth roller with, for example, a hard surface, which is not specifically shown here, follows the soft roller 47, and dips into the dampening agent pan 46 in place of the roller 47. Preferably, at least the dipping roller 47 is rotationally actuated by its own drive motor, which motor is independent from the cylinders 06; 07 and from the other inking unit rollers. The roller 41 is actuated via friction. In an advantageous variant, the distribution cylinder 48 can also be provided with its own rotational drive motor. The oscillating motion of the distribution cylinder 48 can be provided by its own drive element, or as provided here at reduced expense by a transmission that converts its rotational motion into axial motion.

The dampening unit 09 can either be implemented as a separate module, or in other words as a unit 09 which is largely preassembled in its own frame, or in an advantageous embodiment, for use in wet offset printing, the dampening unit 09 can be integrated into the "inking unit 08" module.

Figure 12:
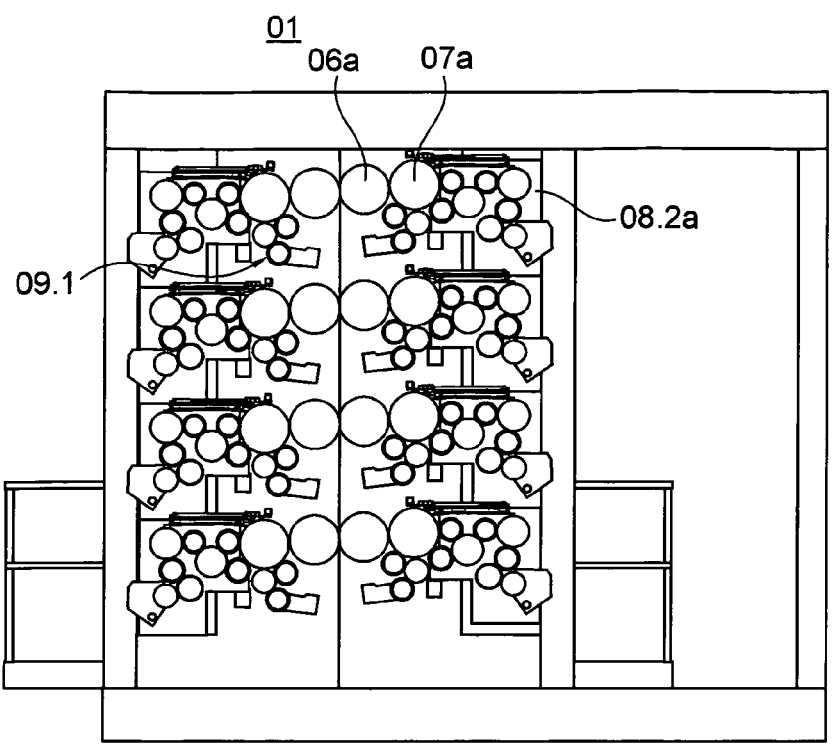
in FIG. 12 an eighth preferred embodiment for the configuration of a printing unit.
Figure 13:
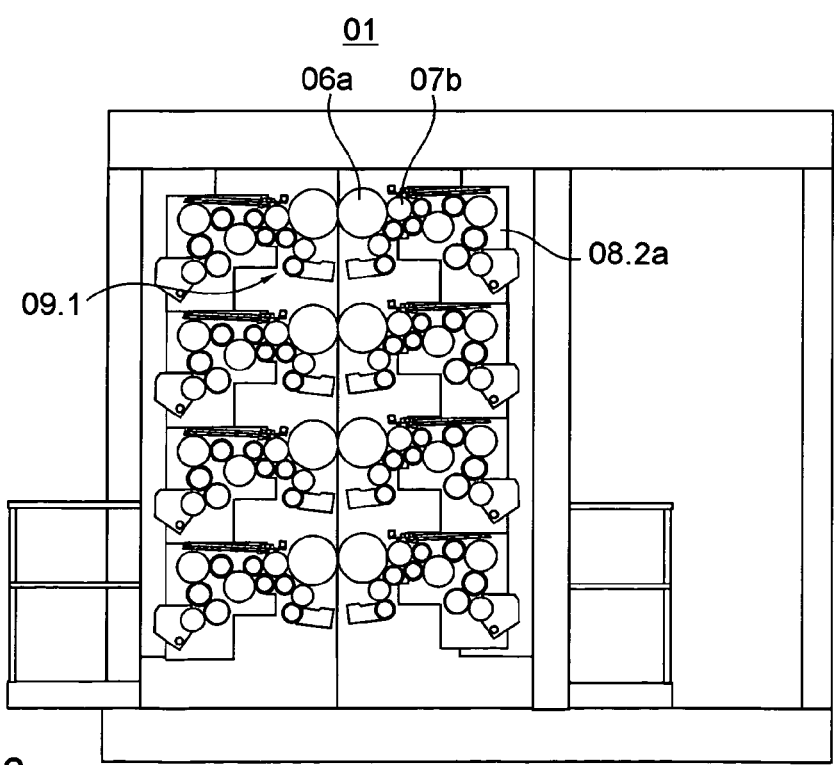
in FIG. 13 a ninth preferred embodiment for the configuration of a printing unit.

Both FIG. 12 and FIG. 13 now show the printing unit 01, for example for use in newspaper printing, in eighth and ninth embodiments, equipped with single-train roller inking units 08.2*a*; 08.2*b*, one with double-sized forme cylinders 07*a*, as seen in FIG. 12, and in the second case with single-sized forme cylinders 07*b*, as seen in FIG. 13, but, in contrast to FIGS. 8 and 9, in wet offset printing with the arrangement of dampening units 09, in this case, for example, three-roller spray-type dampening units 09.1.

The aforementioned double-sized forme cylinders 07*a*, which have a circumference of two printed pages implemented as newspaper pages, preferably have two channels, arranged in tandem in a circumferential direction, and for the purpose of affixing two printing formes, also arranged in tandem in a circumferential direction, and each having the length of one printed page. The two channels, which, in an advantageous embodiment, are continuous in an axial direction, or the two groups of multiple channel segments, which are arranged side by side in an axial direction, and/or the corresponding clamping devices are configured in such a way that at least two separate printing formes, each one or two newspaper pages wide, can be affixed side by side in an axial direction. In one operating situation, the forme cylinder 07*a* is then implemented with two printing formes in a circumferential direction, each with the length of one printed page, and multiple, for example two, three, four, or even six printing formes in a longitudinal direction, each with the width of one printed page. Printing formes that are the width of one printed page, or a width of two or even three printed pages can also be mixed side by side. Alternatively only multiple printing formes having the width of two or even of three printed pages can be arranged side by side on the forme cylinder 07*a*.

The aforementioned single-sized forme cylinders 07*b*, having a circumference of one printed page, which is implemented as a newspaper page, preferably have, viewed in a circumferential direction, only one channel for use in affixing the ends of a printing forme having the length of one printed page. The channel, which, in the advantageous embodiment, is continuous, or a group of multiple channel segments which are arranged side by side in an axial direction, and/or corresponding clamping devices for this, are structured in such a way that at least two separate printing formes, each with the width of one or two newspaper pages, can be affixed side by side in an axial direction. In one operating situation, the forme cylinder 07*b* is then implemented with one printing forme having the length of one printed page, and especially a newspaper page, in a circumferential direction, and with multiple printing formes, such as, for example, two, three, four, or even six printing formes, each with the width of at least one printed page, and especially with the width of a newspaper page, in a longitudinal direction. Printing formes having the width of one printed page and having the width of two or even three printed pages can also be arranged side by side mixed together. Alternatively, only multiple printing formes measuring the width of two or even three printed pages can be arranged side by side on the forme cylinder 07*b*.

In a further preferred embodiment, the printing unit 01, in addition to use for newspaper printing, is also usable for printing a format that differs from newspaper printing and/or for a print quality that deviates from that of newspaper printing. This is reflected, for example, in the provision of the printing unit 01 or in the provision of the printing groups 04 with a specific embodiment of the inking and/or dampening unit 08; 09, with a specific embodiment of the printing group cylinders 06; 07, with a specific embodiment of the rubber packing, such as, for example, the printing formes, or the rubber printing blankets on the cylinders 06; 07, with a specific paper web thickness and/or quality that under certain circumstances differs substantially, and/or with a specific drying stage that is subsequent to the printing process, all in an advantageous embodiment.

In other words, between newspaper printing and a higher-quality printing, which for example is customarily referred to as commercial printing, in some cases substantial differences can be identified in the implementation and in the construction of the printing groups 04. As a rule, web-fed rotary printing presses for newspaper and for commercial printing, or their printing units 01, are constructed and produced largely independently of one another with respect to side frames 11; 12, cylinder arrangement and/or inking unit structure.

Thus, one printing group 04 of this type has forme cylinders 07*c* each having only one channel, on their circumference, that is continuous over the barrel length of that forme cylinder 07*c*, and which bears a single printing forme that extends around the full circumference and the entire barrel length. The usable barrel length corresponds, for example, to four, six, or even eight printed pages in a vertical position, for example in DIN A4 format, or in a number of pages that correspond to this length, but of a format that deviates therefrom, side by side in a crosswise direction, and two printed pages of this type, in tandem in a lengthwise direction.

The full-circumference printing forme accordingly contains all of the printed pages. The transfer cylinder 06*c* also has only one continuous channel, and only a single full-circumference packing, such as, for example, a rubber printing blanket, and especially one multilayer printing blanket which is implemented, for example, as a metal printing blanket, and which has a dimensionally stable support plate with an elastic layer. A circumference of the forme cylinder 07*c*, and thereby a maximum printing length on the web 02, totals, for example, 520 to 650 mm, and especially totals 545 to 630 mm. The same preferably also applies to the corresponding transfer cylinders 06*c*.

Figure 15:
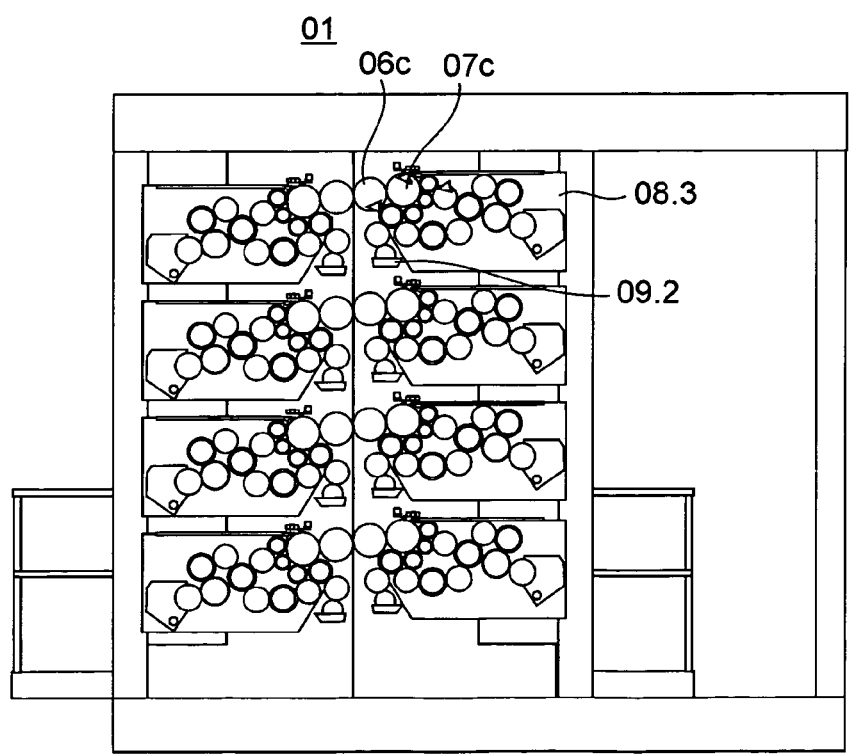
in FIG. 15 an eleventh preferred embodiment for the configuration of a printing unit.

FIG. 14 and FIG. 15 now show the printing unit 01 configured, for example, for commercial printing, in a tenth and in an eleventh preferred embodiment, respectively, and equipped with forme cylinders 07*c* usable for commercial printing, and with two-train roller inking units 08.3, one waterless, and, in the second case, in wet offset printing with an arrangement of dampening units 09.2, here, for example, with three-roller film units 09.1. Their forme roller 41 is simultaneously allocated to the inking unit 08.3, for example as a fourth forme roller 28.

In a twelfth embodiment that is not represented in a separate figure but which is indicated by symbols in parentheses in FIG. 2, the printing unit 01 has short inking units 08.1 or single-train inking units 08.2, as in FIG. 2, which, in this case, act in coordination with cylinders 06*c*; 07*c* for commercial printing.

The modular construction of the inking units 08 or of the printing unit 01, with respect to the inking units 08, makes it possible for the construction of the inking units 08 of a certain type to be the same up to the format-dependent, i.e. the double, single, commercial, etc. arrangement/embodiment of the forme rollers 28, so that the distribution cylinder diameter of at least one type, with the exception of the inking unit 08.4 can be the same in many or even in all formats. If a separate rotational drive is provided for the inking unit 08, a coupling to the cylinders 06; 07 is omitted, which further benefits a modular construction. The drive and transmission can be structured to be independent of format.

The printing units 01 of FIGS. 2, 7 through 10, and 12 through 15 that contain the modules can be advantageously implemented, as indicated by the dividing line in FIGS. 2 and 3, with partitioned or with partitionable frame panels 11; 12, or in principle can also be implemented with conventional, closed side frames 11; 12.

Figure 24:
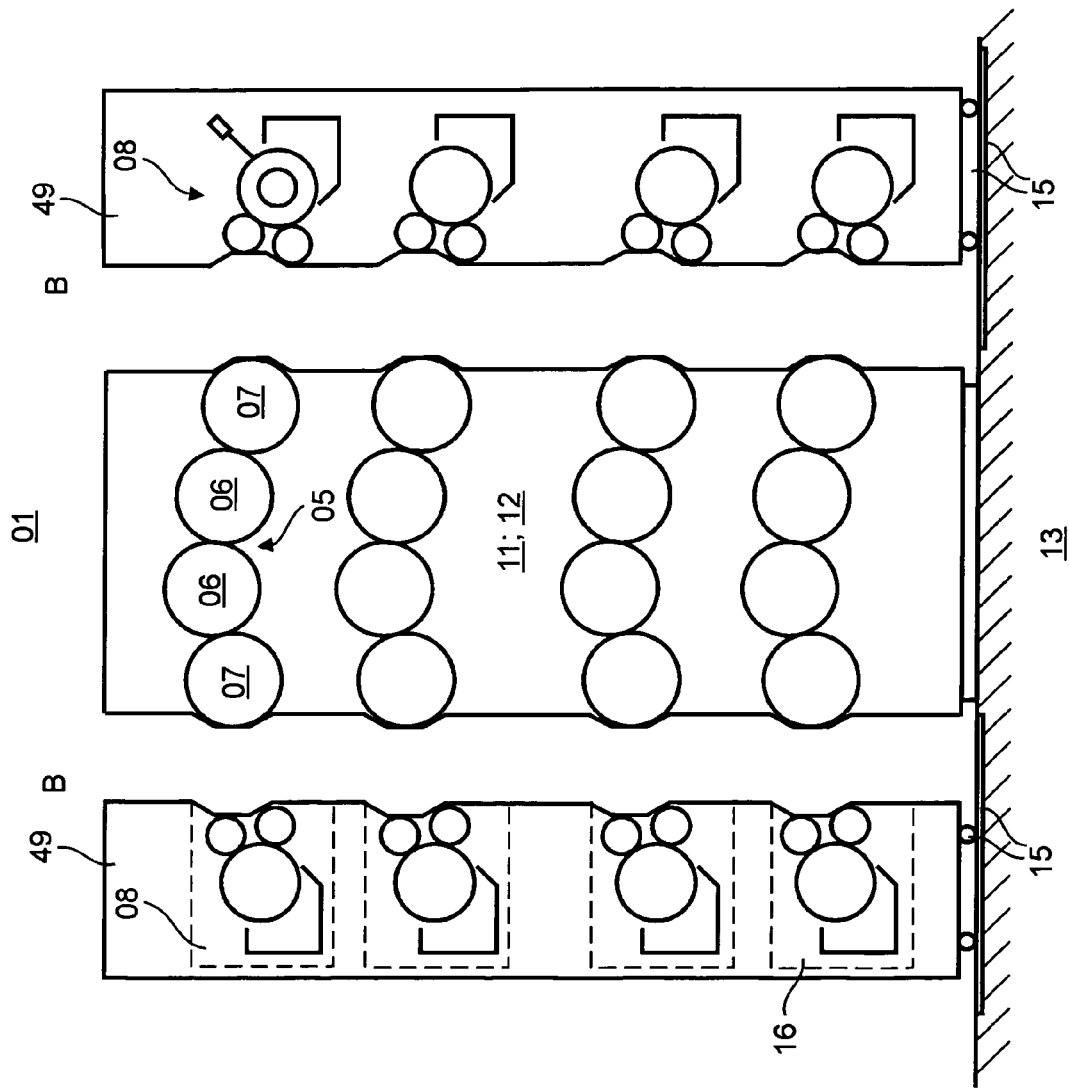
in FIG. 24 a variation of the present invention for a printing unit that can be partitioned.

In one variant, as shown FIG. 24, of a partitionable printing unit 01, the side frame 11; 12 cannot be partitioned in such a way that the printing group cylinders 06; 07 are separated at the printing positions 05. Instead, the printing group cylinders 06; 07 are mounted in, or on a common side frame such that they cannot be partitioned. Both sides panel sections 49, that accommodate the inking units 08, can be placed in an operational position A, which is not shown here or in a maintenance position B, which is shown here. The partitioning is accomplished in FIG. 24 between the forme cylinder 07 and the inking units or optionally the dampening units 08, 09. The inking units 08, which are represented here only schematically, and the optionally present dampening units 09 can be accommodated in the panel sections 49 in the sense of the above-described modular construction as modules, as seen in FIG. 24, at the left side. As an alternative to this, as shown in FIG. 24 on the right, the constructional unit comprised of the inking units 08 and the panel sections 49 is implemented overall as a preassembled module. Depending upon the requirements of a press user, the center sections, including side frame 11; 12, can then be combined with the appropriate cylinder equipment and the side components containing the inking units 08.

As a further module, as already indicated in FIG. 4, and in the printing units 01 of FIGS. 2, 3, 7 through 10 and 12 through 15, a plate or blanket handling device 24, for use in supporting the exchange of printing formes, can be provided. In the preferred embodiment, the handling device 24 is implemented as an at least partially automated or even fully automated printing forme changer 24.

Figure 16:
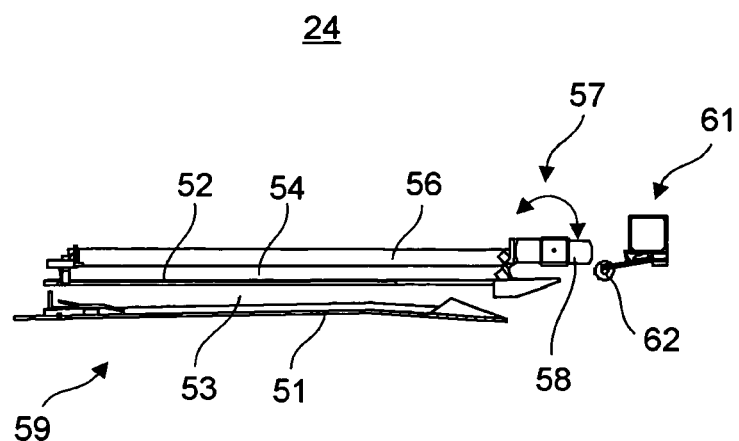
in FIG. 16 an embodiment of a modular automatic plate or dressing handling system.

As illustrated in FIG. 16, between a lower guide 51, which is preferably structured to be flat, brace-like, or frame-like, and an upper guide 52, the handling device 24 has a chute-like receiving area 53 that is configured to receive printing formes. In a basic fitting, the receiving area 53 is preferably structured in terms of modularity, in such a manner that, with respect to space, in principle, at least up to optionally non-structural additional components, both wide printing formes that extend over the length of the barrel, and multiple printing formes, each measuring one or two pages wide and arranged side by side, can be accommodated in this handling device 24. Non-structural and/or removable additional components could, for example, be lateral guides for center printing formes in the case of multiple printing formes that are arranged side by side on the forme cylinder 07a; 07b. The same applies with respect to space to an intake area 54 for printing formes to be newly plated. This can be bordered by the upper guide 52 and optionally by a cover 56, either flat or braced, and also chute-like toward the top, and optionally can be covered to prevent contamination. The guide 52 that supports the new printing formes should preferably be flat or at least braced in such a way that the printing forme will not bend in any way. The handling device 24 is preferably equipped with a lateral register device 57, which, in one embodiment, has only one lateral stop 58, for example lateral stops 58 for a single continuous printing forme, and in another embodiment has multiple stops 58 which are spaced axially from one another for multiple printing formes to be arranged side by side. Ideally, the lateral register device 57 is structured such that in one operating position a number "n," and in another operating position a number "m" of lateral stops 58, wherein n>m and m=1, 2, 3, . . . can be placed in the infeed path of the printing forme. In another embodiment, in different operating positions, although the same number "n" of lateral stops 58 can be placed in the infeed path, these are spaced from one another in a manner that differs from those of the first situation. In other words, they are provided for another printing forme width or another printing page width. In a third embodiment, in one operating situation generally only one lateral stop 58, for the commercial printing forme and in another operating manner a defined number "n," can be placed in the infeed path.

The part of the handling device 24 that comprises the receiving area 53, the intake area 54 and the lateral register device 57 is preferably implemented as a preassembled module or component part, which is hereinafter referred to as the magazine 59, and which can be installed as a complete unit, based upon equipment requirements for the printing machine, into the printing unit 01. This magazine 59 preferably has a drive mechanism that is not illustrated here, such as for example, one or more sliding frames or belt conveyors and a corresponding control for the purpose of conveying the printing formes to be plated off and on, and thereby enables a fully automatic printing forme change. In principle, this magazine 59 can also have elements for pressing and/or guiding the printing formes during the change, such as for example, adjustable rollers. Preferably, however, the handling device 24 is modular in design, wherein on one side the magazine 59, which enables a fully automatic printing forme change, is provided, and on the other side a pressing device 61 with rollers 62 that are adjustable, for example via elements actuated with pressure medium, is provided. The pressing device 61 alone supports both a fully automatic printing forme change with the magazine 59 and a semiautomatic, or partially manual printing forme change without the magazine 59, and, in contrast to the magazine 59, is preferably provided, in principle, in the printing unit 01.

Figure 17:
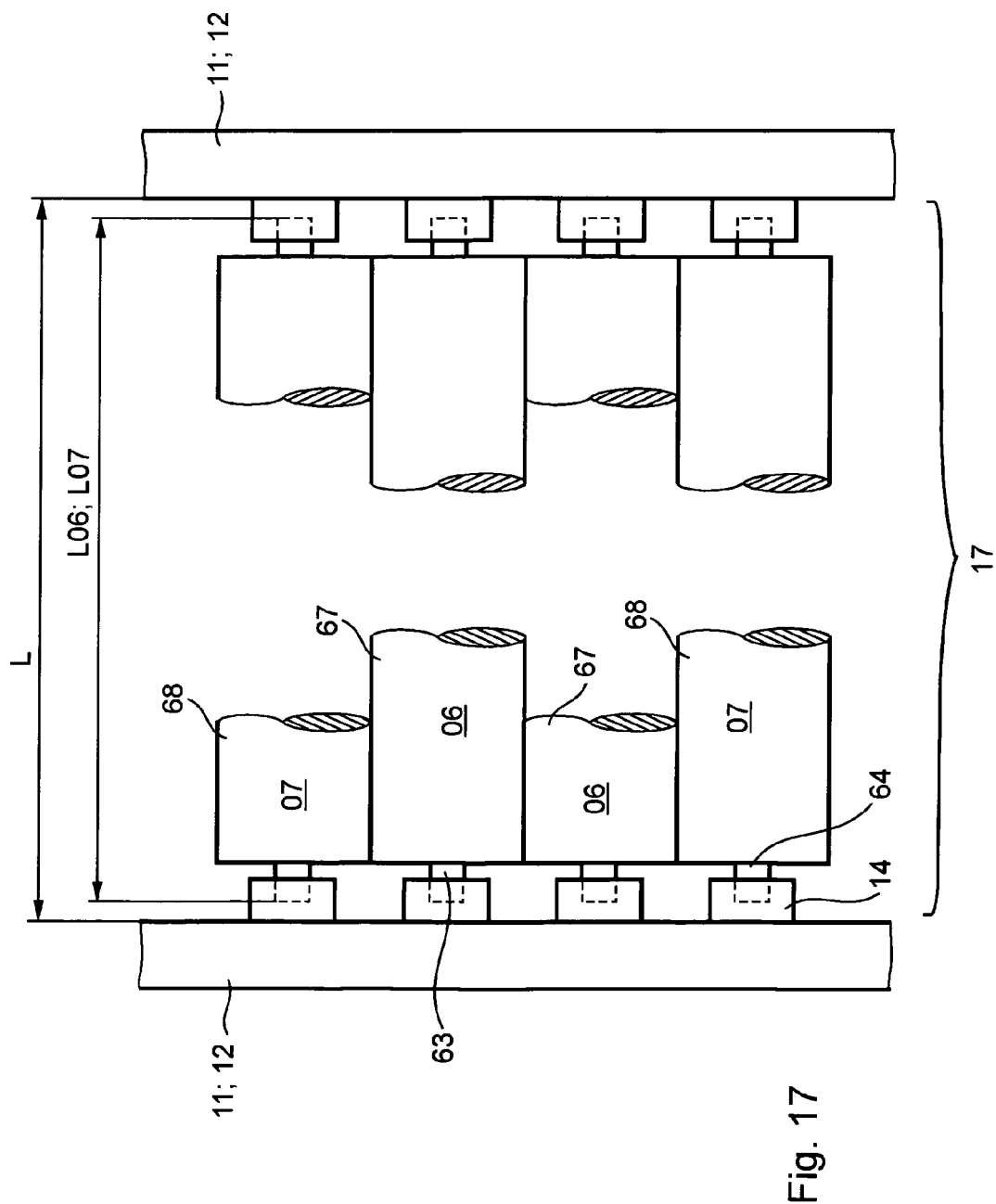
in FIG. 17 a side elevation view of a blanket-to-blanket printing unit.

First, independently of the described modular construction and/or the partitionability of the side frame 11; 12, in one advantageous embodiment, as seen in FIG. 17, the printing unit 01 is provided with the cylinders 06; 07 adapted to be rotatably mounted in bearing units 14 on the side frames 11; 12. The cylinders 06: 07 do not penetrate the alignment of the side frames 11; 12. The cylinders 06; 07 with their barrels 67; 68, and including their journals 63; 64, have a length L06; L07, which smaller than or equal to an inside width L between the side frames 11; 12 that support the printing unit cylinders 06; 07 at both end surfaces, again as seen in FIG. 17. The side frames 11; 12 that support the printing unit cylinders 06; 07 at both end faces are preferably not side frames that are open at the sides such that the cylinders 06; 07 could be removed axially. Instead, they are side frames 11; 12 that in an axial direction overlap the end surface of the mounted cylinder 06; 07 at least partially. In other words, the cylinder 06; 07, especially its bearing, see below, is at least partially enclosed at the end surface by the two side frames 11; 12.

Preferably, all four of the printing group cylinders 06; 07, but at least three of the printing group cylinders 06: 07 each have their own bearing unit 14, into which the on/off adjustment mechanism is already integrated. Bearing units 14 that contain the on/off adjustment mechanism can also be provided for three of the four cylinders 06; 07, and for the fourth cylinder, bearing units without the on/off adjustment mechanism can be provided.

Figure 19:
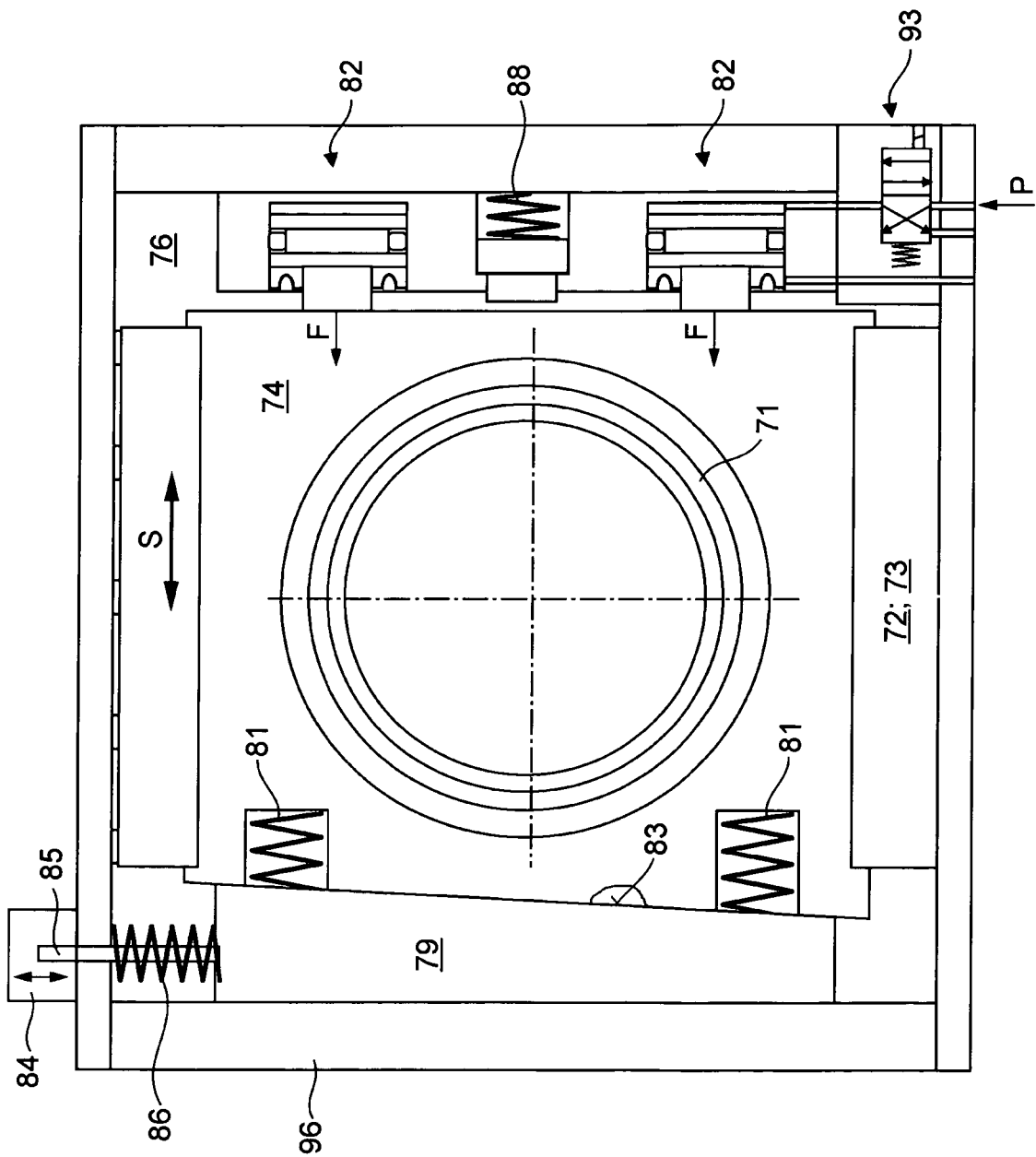
in FIG. 19 a schematic cross-section of a bearing unit of the present invention.

FIGS. 18 and 19 show a bearing unit 14, which is preferably based upon linear adjustment paths, in a schematic lengthwise and crosswise section. The bearing unit 14 into which the on/off adjustment mechanism is integrated, in addition to a bearing 71, such as, for example, a radial bearing 71, and particularly such as a cylindrical roller bearing 71, which is usable for the rotational mounting of the cylinder 06; 07, also has bearing elements 72; 73 that are intended to allow the radial movement of the cylinder 06; 07, for adjustment to the print-on or print-off position. In addition, the bearing unit 14 has bearing elements 72 which are fixed on the support, and which are fixed on the frame once the bearing unit 14 is mounted, and bearing elements 73 that can be moved relative to these bearing elements 72. The bearing elements that are fixed on the support 72, and those that are movable 73 are structured as interacting linear elements 72; 73 and, together with corresponding sliding surfaces or roller elements positioned between them, are provided as linear bearings 70. The linear elements 72; 73 accommodate, in pairs, a bearing block 74 between them, such as, for example, a sliding frame 74, which accommodates the radial bearing 71. The bearing block 74 and the movable bearing elements 73 can also be implemented in a single piece. The bearing elements 72, which are fixed to the support, are arranged on a support 76, which will be, or is connected, as a unit, to the side frame 11; 12. For example, the support 76 is implemented as a mounting plate 76, as seen in FIG. 18, which has, for example, at least on a press drive side, a recess 77 adapted for the penetration of a shaft 78, such as, for example, a drive shaft 78 for a cylinder journal 63; 64, which is not illustrated in FIG. 19.

The frame panel 11; 12, on the press drive side, is also preferably equipped with a recess or with an opening for a drive shaft 78. On the cylinder end surface opposite the drive side, it is not essential to provide a recess 77 or an opening in the side frame 12; 11.

Preferably, a length of the linear bearing 70, especially at least a length of the bearing element 72 that, in its mounted state, is fixed to the frame, is smaller than a diameter of the allocated printing group cylinder 06; 07, viewed in the direction of adjustment S, which is shown in FIG. 19.

The coupling of the cylinder 06; 07 or the bearing block 74, on a drive side of the printing unit 01, to a drive, such as, for example, to a drive motor 121 and/or to a drive train 122 or to a transmission 150, as described with reference to FIG. 26 through FIG. 30, is accomplished, as illustrated by way of example in FIG. 18, via the shaft 78, which, at its end that is near the cylinder, encompasses an end of the journal 63; 64, and which is connected, for example, without torsion via a clamping device 66 to the cylinder journal 63; 64. The clamping device 66, in this case, is structured, for example, as a partially slotted hollow shaft end, which encompasses the journal end, journal 63; 64 and which can be drawn together by a screw connection in such a manner that a non-positive, non-rotatable connection between the journal end, or journal 63; 64, and the inner surface of the hollow shaft can be formed. The coupling can also be implemented in another manner, such as, for example, by using a form closure in a circumferential direction. The shaft 78 is passed through an opening in the side frame 11; 12, which opening is sufficiently large in dimension for the movement of the shaft 78 together with the bearing block 74, and which is configured, for example, in the nature of a longitudinal slot. A cover 69, with a collar that overlaps the longitudinal slot, and which is connected, for example, to the bearing block 74 but not to the shaft 78, can be provided as protection against contamination.

At the end of the shaft 78 that is distant from the cylinder, as illustrated in FIG. 18, one coupling 148 of optionally many arranged in series, and especially a multi-disk coupling 148, as will be described in reference to FIG. 26 through 29 can be coupled by a non-rotatable connection 75, such as, for example, a clamping element 75. In another embodiment, as described in reference to the further development of FIG. 30, a transmission 150 with a drive motor 121 can be coupled directly to the shaft 78 without a coupling 148 that is configured to compensate for angle and/or offset. In this embodiment, the drive motor 121 is not fixed to the frame. Instead it is arranged fixed to the cylinder, and is moved along with the cylinder 06; 07.

Figure 36:
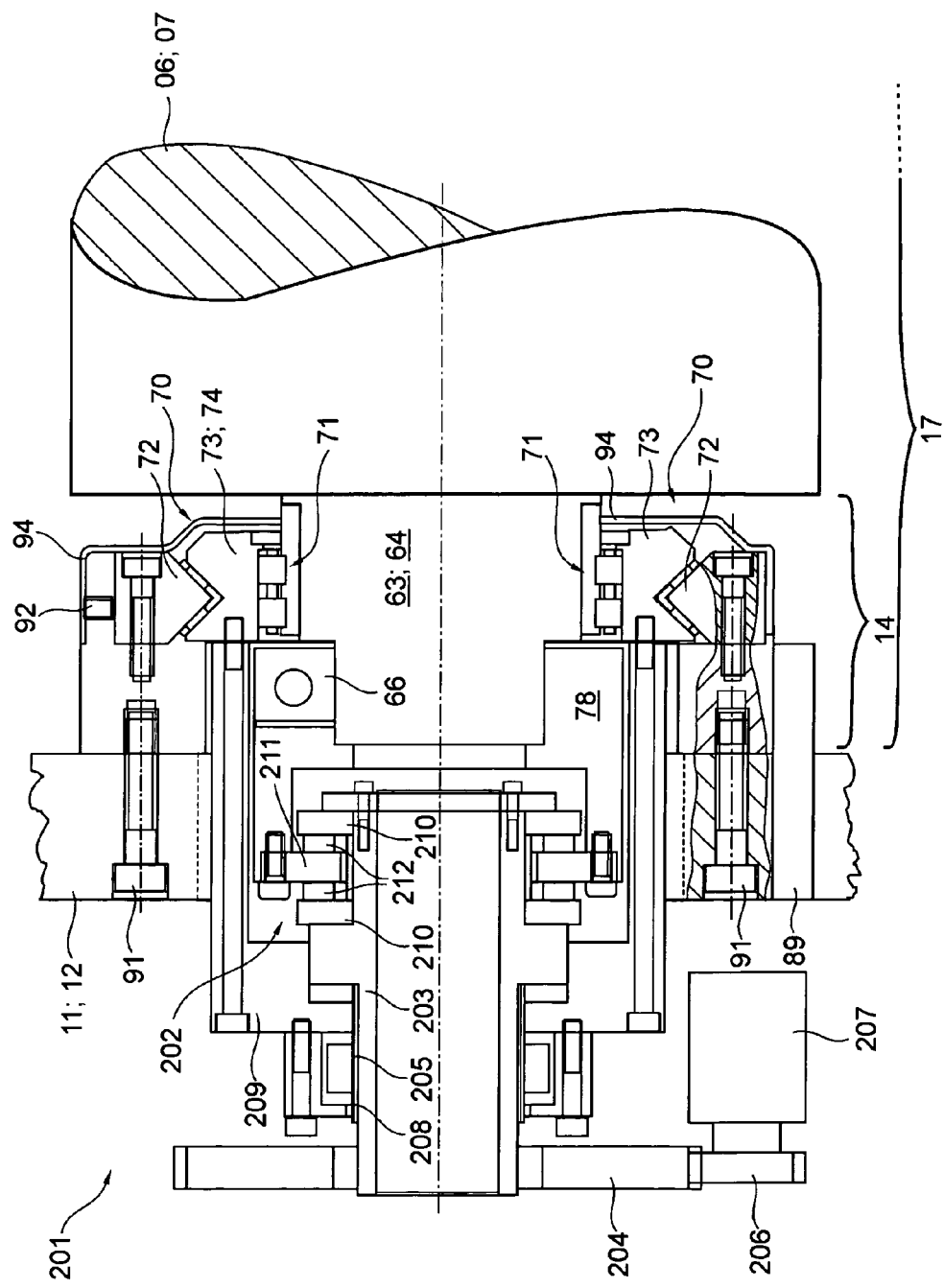
in FIG. 36 a coupling of a cylinder to a lateral register drive.

On a side of the cylinder 06; 07 that is opposite the press drive side, especially the cylinder 07 that is provided as a forme cylinder 07, the journal 64 is preferably coupled with a device for axially moving the cylinder 07; i.e. with a lateral register drive 201, as seen in FIG. 36. The shaft 78, which is connected to the journal 63; 64, for example, in the manner shown in FIG. 18, is connected via a bearing 202, for example, an axial bearing 202 with an axial drive 203, 204, 206, 207. The axial drive comprises a spindle 203, especially with at least one threaded section 205, a spur gear 204 that is non-rotatably connected to the spindle 203, a sprocket 206, and a motor 207 that drives the sprocket 206. The threaded section 205 acts in coordination with an internal threading 208 that is fixed on the bearing block, such as, for example, an internal threading 208 of a pot 209 that is connected to the bearing block 74, and, with the rotation of the spindle 203, effects an axial movement of the same, along with the shaft 78, via the axial bearing 202 and the journal 63; 64. The axial bearing 202 permits a relative rotation between the shaft 78 and the spindle 203, but is intended to be rigid to compression and tension relative to an axial direction of the cylinder 07. This is accomplished by the use of a disk 211 which is arranged on the shaft 78, which disk 211 is mounted on both sides, for example, via rolling elements 212, and which is limited, in its travel in both directions, by stops 210 that are fixed to the spindle. An adjustment of the lateral register is now accomplished with the motor 207, via a control device that is not specifically illustrated. In this arrangement, either the motor 207 can be equipped with a position reset indicator internal to the motor, for example one that has been appropriately calibrated beforehand, or a position reset indication to the control can be accomplished via a sensor that is not illustrated here, such as, for example, a correspondingly calibrated rotary potentiometer, which is coupled to a rotational component of the axial drive.

The structure of the linear bearing 70 in such a manner that the coordinating bearing elements 72; 73 are both provided on the bearing unit 14 component, and not a part on the side frame 11; 12 of the printing unit 01, enables a preassembly and a prealignment or adjustment of the bearing tension. The advantageous arrangement of the two linear bearings 70, which encompass the bearing block 74, enables an adjustment which is free from play, since the two linear bearings 70 are arranged opposite one another in such a way that the bearing pre-tension and the bearing forces encounter or accommodate a significant component in a direction that is perpendicular to the rotational axis of the cylinder 06; 07. The linear bearings 70 can thus be adjusted in that direction in which it also appears in the play-free adjustment of the cylinder 06; 07.

Because the cylinders 06; 07 along with the journal 63; 64 and bearing unit 14 do not penetrate through the frame panel 11; 12, these cylinders, journals and bearing units can be installed already preassembled, with the bearings, both the radial bearings 71 and the linear bearings 70 preadjusted or correctly pre-stressed, as a modular cylinder unit 17 into the printing unit 01. The phrase "do not penetrate through" and the above definition, with respect to the inside width L, should advantageously be understood in the further sense to mean that, at least in the area of the provided end position of the cylinder 06; 07, and at least on a continuous path from a frame edge to the point of the end position, a "non-penetration" of this type is present. The cylinder unit 17 can accordingly be moved to approach the end position from an open side that lies between the two end-surface side frames 11; 12, without tipping, or in other words in a position in which the rotational axis is perpendicular to the plane of the frame, and can be arranged there between the two inner panels of the frame. Specifically, it can be fastened to the inner panels of the frame. This is also possible if cast pieces or if other elevated areas are present on the inner surface, as long as the aforementioned continuous assembly path is provided.

The bearing units 14 are arranged on the inner panels of the side frame 11; 12 in such a manner that the cylinders 06; 07, and especially their bearing units 14 on the side distant from the cylinder, are protected by the side frame 11; 12, which provides static and assembly advantages.

Figure 42:
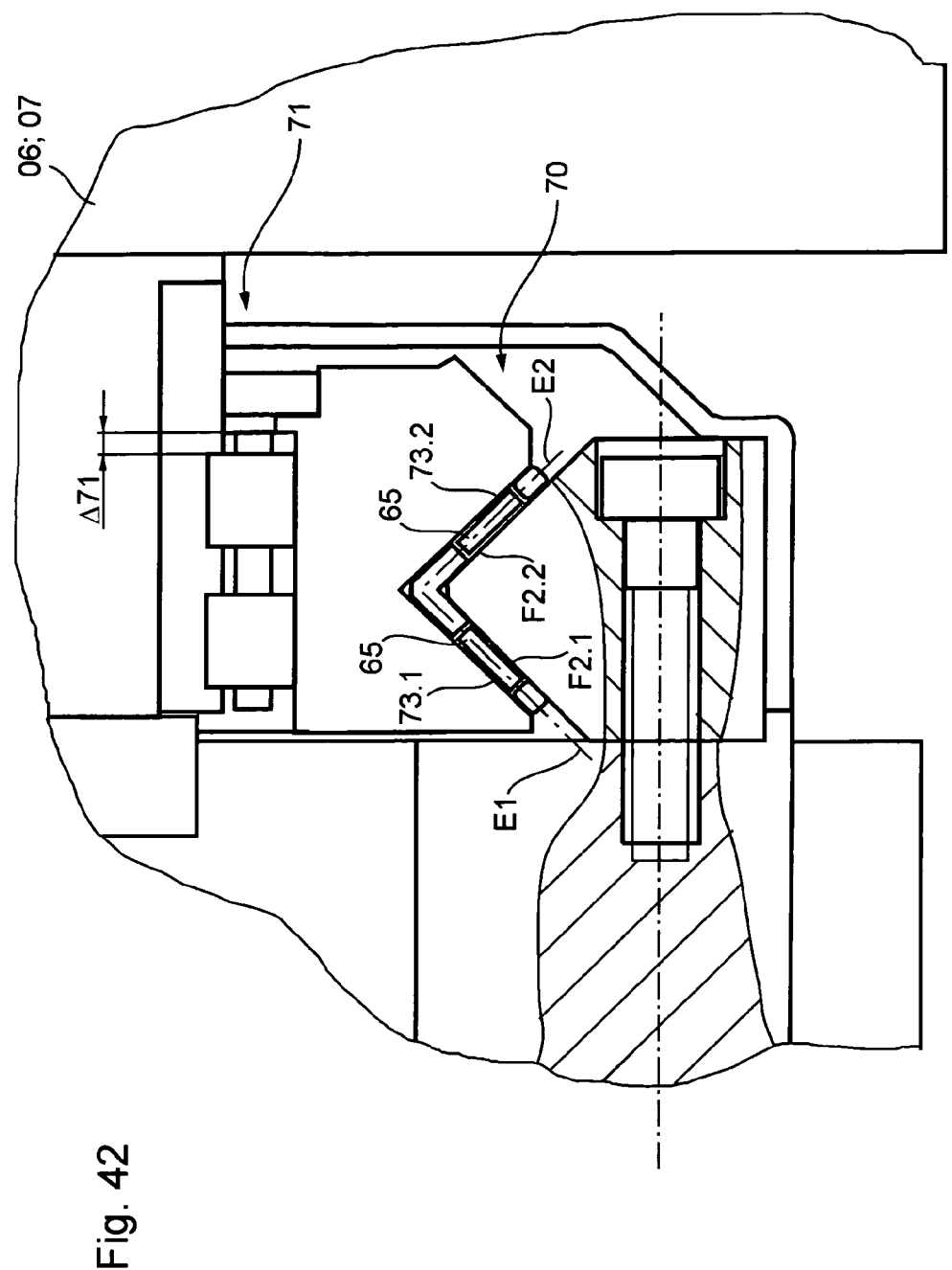

The linear bearings 70, 72, 73, which are identifiable in FIGS. 18 and 19 thus each have pairs of corresponding and coordinating bearing elements 72 and 73 or their guide or active surfaces, configured as sliding surfaces, which are not shown, or with rolling elements 65 arranged between them. As shown in FIG. 42, in the preferred embodiment at least one of the two, and advantageously both, linear bearings 70 of a bearing unit 14 are structured such that the two corresponding bearing elements 72 and 73 each have at least two guide surfaces 72.1; 72.2; 73.1; 73.2, which lie in two planes inclined relative to one another. The two guide surfaces 72.1; 72.2; 73.1; 73.2, or their planes E1; E2 of the same bearing element 72; 73 are, for example, v-shaped relative to one another. For example, they are inclined at an angle of between 30 and 60° relative to one another, and especially between 40 and 50°. In this arrangement, the two guide surfaces 73.1; 73.2; 72.1; 72.2 of the coordinating bearing element 73; 72 are inclined relative to one another in a manner that complements their shape. At least one of the two pairs of coordinating guide surfaces 72.1; 72.2; 73.1; 73.2 lies parallel to a plane E1, which has a component that is not equal to zero in the radial direction of the cylindrical axis, and which thereby suppresses the degree of freedom of movement in a purely axial direction of the cylinder. Preferably, both pairs of the guide surfaces lie at the planes E1; E2, both of which have a component that is not equal to zero in the radial direction of the cylindrical axis, but, in the reverse inclination, have one that is against the cylindrical axis, and thereby suppress the degree of freedom of movement in both axial directions of the cylinder. A line of intersection of the two planes E1; E2 runs parallel to the direction of adjustment S.

If, as is apparent in FIG. 18, the bearing block 74 is bordered or is situated between the two linear bearings 70, each of which has two pairs of coordinating guide surfaces 72.1; 73.1 and 72.2; 73.2, and especially if it is prestressed with a level of pre-tension, then the bearing block 74 has only a single degree of freedom of movement along the direction of adjustment S.

The inclined active or guide surfaces 72.1; 72.2; 73.1; 73.2 are arranged such that they counteract a relative movement of the bearing parts of the linear bearing 70 in an axial direction of the cylinder 06; 07. In other words, the bearing is "set" in an axial direction.

The linear bearings 70 of both bearing units 14, which are allocated at the end surface of a cylinder 06; 07, have two pairs of coordinating guide surfaces 72.1; 72.2; 73.1; 73.2 arranged in this manner relative to one another. In this case, however, at least one of the two radial bearings 71 of the two bearing units 14 advantageously has a slight bearing clearance D71 in an axial direction.

In FIG. 18 and FIG. 42, the guide surfaces 72.1; 72.2 of the bearing elements 72 that are fixed to the frame point the linear guide 70 in the half-space that faces the journal 63; 64. In this case, the bearing elements 72 that are fixed to the frame wrap around the bearing block 74, which is arranged between them. The guide surfaces 72.1; 72.2 of the two linear bearings 70, which are fixed to the frame, thus wrap partially around the guide surfaces 73.1; 73.2 of the bearing block 74, relative to an axial direction of the cylinder 06; 07.

For the correct placement of the bearing units 14, or the cylinder units 17 including the bearing unit 14, mounting aids 89, such as, for example, alignment pins 89, can be provided in the side frame 11; 12, on which side frames 11; 12 the bearing unit 14 of the fully assembled cylinder unit 17 is aligned, before the mounting aids are connected to the side frame 11; 12 via separable connecting elements 91, such as screws 91, or even with adhesive force via welding. For the adjustment of the bearing pre-stress in the linear bearings 70, which is to be performed prior to installation of the bearings 70 in the printing unit 01 and/or which is to be readjusted after installation, appropriate elements 92, for example adjustment screws 92, can be provided, as seen in FIG. 18. The bearing unit 14, at least toward the cylinder side, is preferably largely protected against contamination by a cover 94, or is even implemented as completely encapsulated structural unit.

In FIG. 18, the cylinder 06; 07 with the journal 63; 64 and with a preassembled bearing unit 14 is schematically characterized. This component group can be installed, preassembled, between the side frames 11; 12 of the printing unit 01 in a mounting-friendly manner, and can be fastened at points intended for this purpose. Preferably, for a modular construction, the bearing units 14 for the forme and transfer cylinders 07; 06, optionally up to the permitted operational size of the adjustment path, are configured to have the same construction. With the embodiment that can be preassembled, the active inner surface of the radial bearing 71, and the active outer circumferential surface of the journal 63; 64 can be cylindrical rather than conical in configuration, as both the mounting of the bearing unit 14 on the journal 63; 64 and the adjustment of the bearing clearance can take place outside of the printing unit 01. For example, the bearing unit 14 can be shrunk to fit.

The structural unit that can be mounted as a complete unit, the bearing unit 14 is advantageously configured in the structure of an optionally partially open housing, from, for example, the support 76, and/or, for example, from a frame, shown in FIG. 19 without reference symbol, and including for example, the four plates that border the bearing unit 14 toward the outside on all four sides, and/or, can be configured for example, from the cover 94, as seen in FIG. 18. The bearing block 74 having the radial bearing 71, the linear guides 70, and in one advantageous embodiment, for example, the actuator 82 or the actuators 82 are accommodated inside this housing or this frame.

The bearing elements 72 that are fixed to the frame are arranged essentially parallel to one another and define a direction of adjustment, as shown in FIG. 19.

An adjustment to a print-on position is accomplished by moving the bearing block 74 in the direction of the printing position by the application of a force F that is applied to the bearing block 74 by at least one actuator 82, and especially by an actuator 82 that is power-controlled or that is defined by a force, by the use of which actuator, a defined or definable force F can be applied to the bearing block 74 in the print-on direction to accomplish the on-adjustment, as shown in FIG. 19. The linear force at the nip points, which linear force is decisive for ink transfer and thus for print quality, among other factors, is thus defined not by an adjustment path, but by the equilibrium of forces between the force F and the linear force $F_L$ that results between the cylinders 06; 07, and the resulting equilibrium. In a first embodiment, which is not shown separately, cylinders 06; 07 are engaged against one another in pairs. The bearing block 74 is acted upon by the correspondingly adjusted force F via the actuator(s) 82. If multiple, such as, for example, three or four cylinders 06; 07 that are adjacent to one another in direct sequence, and each acting in coordinating pairs, are implemented without a possibility for fixing or for limiting the adjustment path S via a purely force-dependent adjustment mechanism, then although a system that has already been adjusted with respect to the necessary pressures, or linear forces, can be again correctly adjusted in sequence and in succession, it is possible to implement a basic adjustment only with difficulty, due to the somewhat overlapping reactions.

For the basic adjustment of a system, with corresponding packings, etc., it is thus provided, in one advantageous embodiment, that at least the two center cylinders of the four cylinders 06, or expressed differently, that at least all the cylinders 06 that differ from the two outer cylinders 07, can be fixed or can at least be limited in their travel, at least during a period of adjustment to a defined position, and advantageously to the position of adjustment which is determined by the equilibrium of forces.

Particularly advantageous is an embodiment of the present invention in which the bearing block 74, even during operation, is mounted such that it can move in at least one direction away from the printing position against a force, such as, for example, a spring force, and especially a definable force. With this, in contrast to a mere travel limitation, on one hand a maximum linear force is defined by the coordination of the cylinders 06; 07, and on the other hand, a yielding is enabled in the cylinder 06; 07, for example in the case of a web tear which is associated with a paper jam.

On one side that faces the printing position 05, the bearing unit 14, at least during the adjustment process, has a movable stop 79, which limits the adjustment path toward the printing position 05. The movable stop 79 is movable in such a manner that a stop surface 83, that acts as the stop, can be varied in at least one area along the direction of adjustment. Thus, in an advantageous implementation, an adjustment device, such as the adjustable stop 79, is provided, by the use of which, the position of an end position of the bearing block 74, that is near the printing position, can be adjusted. For travel limitation or adjustment, for example, a wedge drive, which will be described below, is provided. In principle, the stop 79 can be adjusted manually or via an adjustment element 84, which is implemented as an actuator 84, as will be discussed below. Further, in one advantageous embodiment, a holding or a clamping element, not illustrated in FIGS. 18 and 19, is provided, by the use of which, the stop 79 can be secured in the desired position. Further, at least one spring-force element 81, such as, for example a spring element 81, is provided, which exerts a force $F_R$ from the stop 79 on the bearing block 74 in a direction away from the stop. In other words, the spring element 81 effects an adjustment to the print-off position in the case in which the movement of the bearing block 74 is not impeded in some other way. An adjustment to the print-on position is accomplished by moving the bearing block 74 in the direction of the stop 79 through the use of at least one actuator 82, and especially through the use of a power-driven actuator 82, by which, a defined or definable force F can optionally be applied to the bearing block 74 in the print-on direction for the purpose of adjustment. If this force F is greater than the restoring force $F_R$ of the spring elements 81, then, with a corresponding spatial configuration an adjustment of the cylinder 06; 07 relative to the adjacent cylinder 06; 07 and/or an adjustment of the bearing block 74 relative to the stop 79 takes place.

In an ideal case, the applied force F, the restoring force $F_R$ and the position of the stop 79 is selected such that between the stop 79 and the stop surface of the bearing block 74, in the adjustment position, no substantial force DF is transferred, and such that, for example, ½DF½<0.1*(F−$F_R$), and especially ½DF½<0.05*(F−$F_R$), ideally ½DF½>>0 applies. In this case, the adjusting force between the cylinders 06; 07 is essentially determined from the force F that is applied by the actuator 82. The linear force at the nip points that is decisive for ink transfer and thereby that is decisive for print quality, among other factors, is thus defined primarily not by an adjustment path, but, in the case of a quasi-free stop 79, by the force F and the resulting equilibrium. In principle, once the basic adjustment has been determined with the forces F necessary for this, a removal of the stop 79 or of a corresponding immobilization element, that is effective only during the basic adjustment, would be conceivable.

In principle, the actuator 82 can be provided as any actuator 82 that will exert a defined force F. Advantageously, the actuator 82 is configured as a correcting element 82 that can be actuated with pressure medium, and particularly as pistons 82 that can be moved using a fluid. Advantageously, with respect to a possible tilting, the arrangement involves multiple, in this case two, actuators 82 of this type. A liquid, such as oil or water, is preferably used as the fluid due to its incompressibility.

To actuate the actuators 82, which are configured in this case as hydraulic pistons 82, a controllable valve 93 is provided in the bearing unit 14. The valve 93 is structured, for example, to be electronically actuatable, and places the hydraulic pistons 87, in one position, that is pressureless or which is at least at a low pressure level, while in another position, the pressure P that conditions the force F, is present. In addition, for safety purposes, a leakage line, not indicated here, is also provided.

In order to prevent on and off adjustment paths that are too large, while still protecting against web wrap-up, on a side of the bearing block 74, that is distant from the printing positions, a travel limitation can be provided by, for example a movable, force-limited stop 88, as an overload protection element 88, for example a spring element 88. In the operational print-off position, in which the pistons 82 are disengaged and/or are drawn in, the stop 88 can serve as a stop for the bearing block 74. In the case of a web wrap-up or other excessive forces from the printing position 05 the stop 88 will yield and will allow a larger travel path. A spring force for this overload protection element 88 is therefore selected to be greater than the sum of forces from the spring elements 81. Thus, in operational on/off adjustment, only a very short adjustment path, for example only 1 to 3 mm, can be provided.

In the represented embodiment shown in FIG. 19, the stop 79 is implemented as a wedge 79 that can be moved crosswise to the direction of adjustment S. In the movement of the wedge 79, the position of the respective effective stop surface 83 along the direction of adjustment S varies. The wedge 79 is supported, for example, against a stop 96 that is stationarily fixed to the support.

The stop 79, which is implemented here as a wedge 79, can be moved by an actuator 84, such as, for example, by a correcting element 84 that can be actuated with pressure medium, such as a piston 84 that is actuatable with pressure medium, in a working cylinder with (dual-action) pistons, via a transfer element 85, configured, for example, as a piston rod 85, or by an electric motor via a transfer element 85 configured as a threaded spindle. This actuator 84 can either be active in both directions, or, as illustrated in FIG. 19, can be implemented as a one-way actuator, which, when activated, works against a restoring spring 86. For the aforementioned reasons, the force of the restoring spring 86 is selected to be weak enough so that the wedge 79 is held in its correct position against only the force of gravity or oscillation forces.

In principle, the stop 79 can also be implemented in another manner, for example as a ram that can be adjusted and can be affixed in the direction of adjustment, in such a way that it forms a stop surface 83 for the movement of the bearing block 74 in the direction of the printing position 05, which is variable in the direction of adjustment S and which, at least during the adjustment process, can be fixed in place. In an embodiment which is not specifically illustrated, an adjustment of the stop 79 is implemented, for example, directly parallel to the direction of adjustment S via a drive element, such as, for example, a cylinder that is actuatable with pressure medium, with dual-action pistons or as an electric motor.

Figure 20:
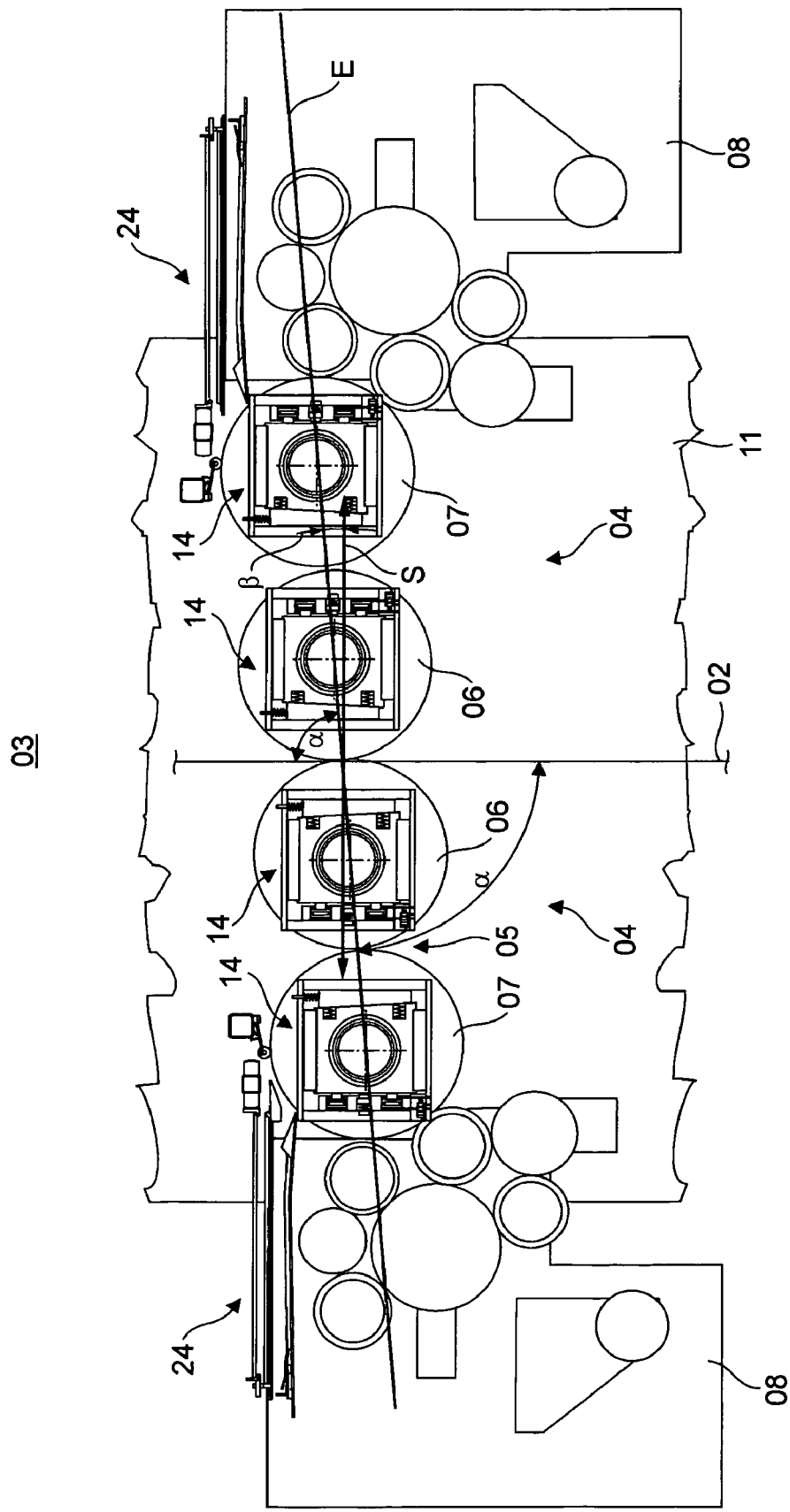
in FIG. 20 a first bearing arrangement of a blanket-to-blanket printing unit.

FIG. 20 schematically shows, on the printing unit 03, which is configured as a blanket-to-blanket printing unit 03, one bearing unit 14 arranged on the side frame 11 for each cylinder 06; 07. In one advantageous embodiment, as illustrated here, in the print-on position, the rotational centers of the cylinders 06; 07 form an imaginary line or a plane of connection E, which is hereinafter referred to as the "linear blanket-to-blanket printing unit". The plane E and the entering and exiting web 02 preferably form an interior angle a that deviates from 90°, measuring between 75 and 88°, and especially between 80 and 86°. In the mounted state, in the embodiment depicted in FIG. 20, the bearing unit 14 of the transfer cylinder 06, and especially of all cylinders 06; 07, are arranged on the side frame 11 in such a way that their directions of adjustment S, for example, for the purpose of a power-defined print-on adjustment, as will be discussed below, form a maximum angle of 15° with the connecting plane E, for example an acute angle b of approximately 2° to 15°, especially 4 to 10°, with one another. This arrangement is of particular advantage, with respect to mounting, if the direction of adjustment S extends horizontally and the web 02 extends essentially vertically.

In a modified embodiment of a blanket-to-blanket printing unit 03, which is arranged in an angular fashion (n or u printing unit 03), the plane E' is understood as the connecting plane for the cylinders 06 that form the printing positions 05, and the plane E" is understood as the connecting plane between the forme and transfer cylinders 07; 06, and what is described above, in reference to the angle b in the direction of adjustment S for at least one of the cylinders 06 that form the printing positions 05, or the forme cylinders 07, and the planes E' or E", applies.

One of the cylinders 06 that form the printing positions 05 can also be arranged in the side frame 11; 12 such that it is stationary and is operationally non-adjustable, but is optionally adjustable, while the other cylinder is mounted such that it is movable along the direction of adjustment S.

One operational adjustment path, for adjustment to the on/off positions along the direction of adjustment S between the print-off and print-on positions, for example in the case of the transfer cylinder 06, measures between 0.5 and 3 mm, particularly between 0.5 and 1.5 mm, and in the case of the forme cylinder 07 between 1 and 5 mm, and particularly between 1 and 3 mm.

In the embodiment as a linear blanket-to-blanket printing unit 03, the plane E is inclined from the planes of the incoming and outgoing web 02 for example, at an angle a of 75° to 88° or 92 to 105°, preferably from 80 to 86° or 96 to 100°, in each case on one side of the web, or 96 to 100° or 80 to 86° on the respective other side of the web.

Figure 21:
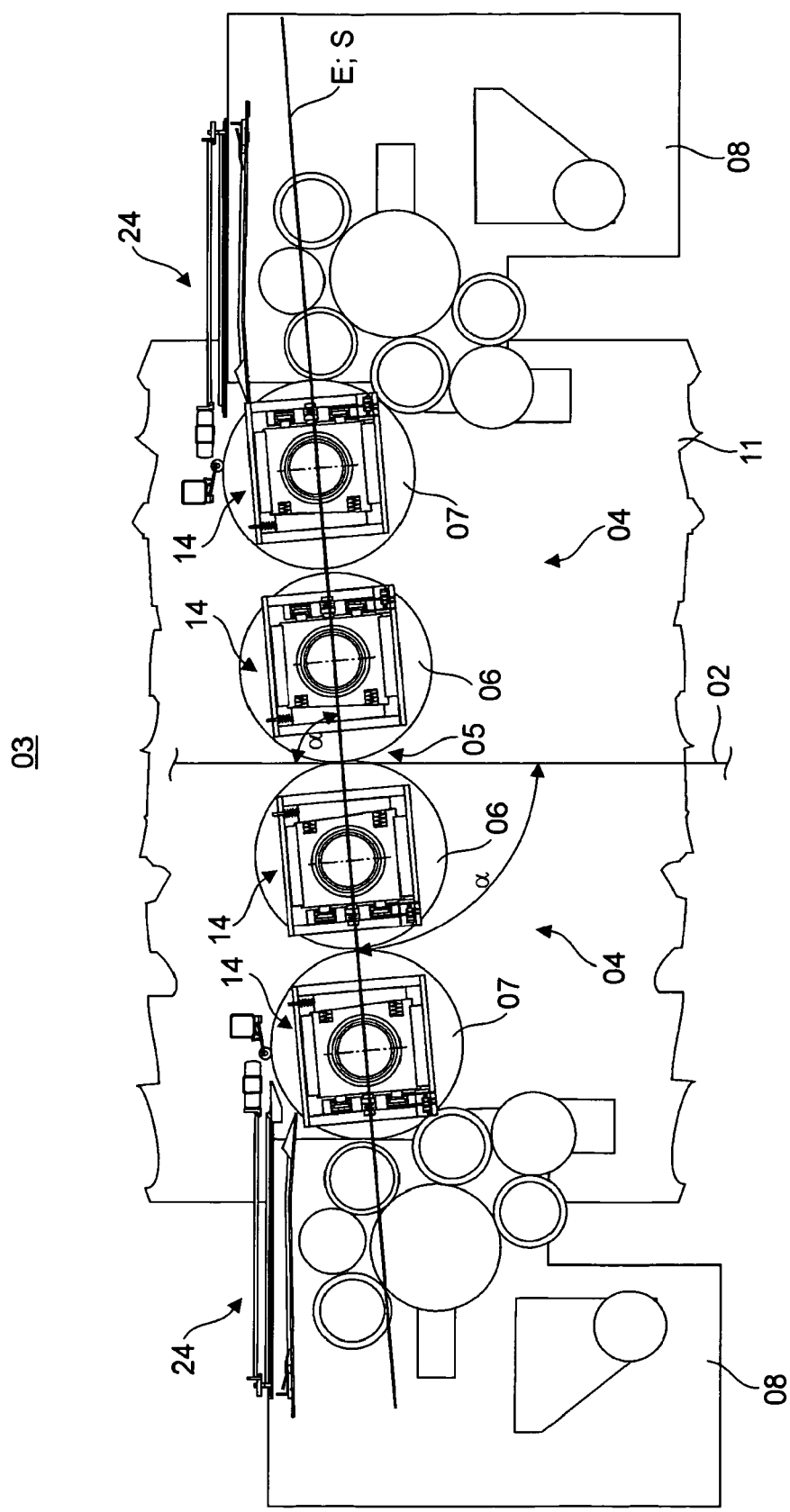
in FIG. 21 a second bearing arrangement of a blanket-to-blanket printing unit.

In another embodiment, which is illustrated in FIG. 21, the bearing units 14 of the transfer cylinder 06, and especially of all of the cylinders 06; 07, are arranged, in the mounted state, on the side frame 11 in such a way that their directions of adjustment S coincide with the planes of connection E. In other words, they form an acute angle β of approximately 0°. Thus, all the directions of adjustment S coincide, and are not spaced from one another.

Figure 22:
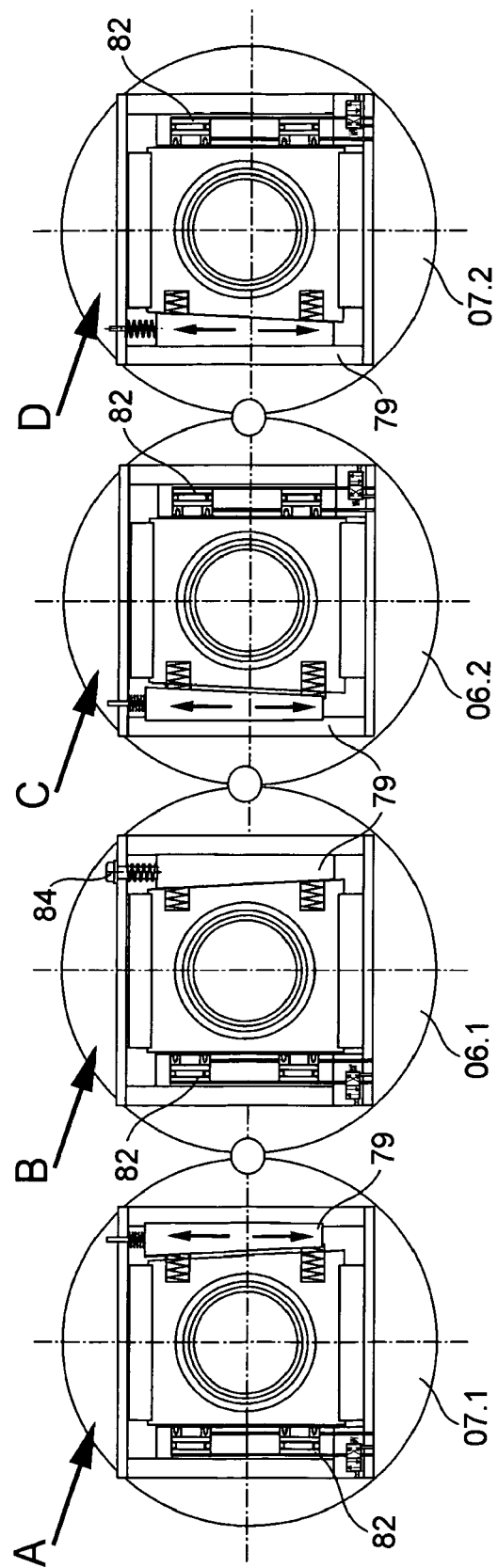
in FIG. 22 a simplified depiction, illustrating, in principle, the mounting and adjustment of the cylinder in accordance with the present invention.

Independent of the inclination of the adjustment paths, shown in FIGS. 20 and 21, relative to the planes E or E' or E", of slight inclination or of no inclination, in the schematic example of FIG. 22 an advantageous process method for adjusting the cylinders 06; 07, in this case given the suffixes "1" and "2" to differentiate between the left and right printing couples or their print-on position, is described in what follows:

First, a first cylinder 06.1 that participates in defining the printing position 05, such as, for example, a transfer cylinder 06.1, is aligned in its position in the print-on setting, wherein the actuators 82 are active within the printing unit 01 and relative to the web 02 by adjusting the stops 79, at both end surfaces. This can be accomplished, as indicated here, by the use of an actuator 84, such as an adjustment screw, which is shown here, by way of example, as being manually actuatable. A so-called "0-position" that defines the printing position is hereby established.

Once the stop 79 of the assigned forme cylinder 07.1 has been released, or in other words, once the stop 79 has been removed, for example, beforehand by drawing it toward the top, and the print-on position of the transfer cylinder 06.1 is still activated, in other words the actuators 82 of the transfer cylinder 06.1 are activated, the amount of force F, which is desired between the forme and transfer cylinders 07.1; 06.1 for the print-on position, is exerted. This is accomplished by an impingement of the actuators 82 of the forme cylinder 07.1 with the desired amount of engagement pressure P. If the bearing unit 14 of the first forme cylinder 07.1 is also equipped with an adjustable stop 79, then, in a first variant, this stop 79 can now be placed, essentially without force, in contact with the corresponding stop surface of the bearing block 74 on the first forme cylinder 07.1.

When the print-on position is activated, in other words when force is respectively exerted in the direction of the printing position 05 for the two first cylinders 06.1; 07.1 and the print-off position of the second forme cylinder 07.2 is activated, while or after the stop 79 of the third cylinder 06.2 is or has been released, then the desired amount of force, or pressure P, for the print-on position is exerted on the second transfer cylinder 06.2 or its bearing block 74, and once equilibrium is reached, its stop 79 is placed, essentially without force, in contact with the corresponding stop surface of the bearing block 74. Within this framework, the stop 79 of the first forme cylinder 07.1 can also be placed in contact with the assigned bearing block 79 before, during, or afterward, if this has not already taken place as in the aforementioned variant.

In a final step, with a free or an already released stop 79, the second forme cylinder 07.2, or its bearing block 74, is placed in a print-on position, while the assigned transfer cylinder 06.2 is also in a print-on. Once a steady-state condition is reached, if a stop 79 is provided there, this stop 79 is also placed, essentially without force, in contact with the corresponding stop surface of the bearing block 74 on the second forme cylinder 07.2.

In this manner, an adjustment of the cylinders 06; 07 of the blanket-to-blanket printing unit 03, that is optimal for the printing process, is accomplished.

Figure 23:
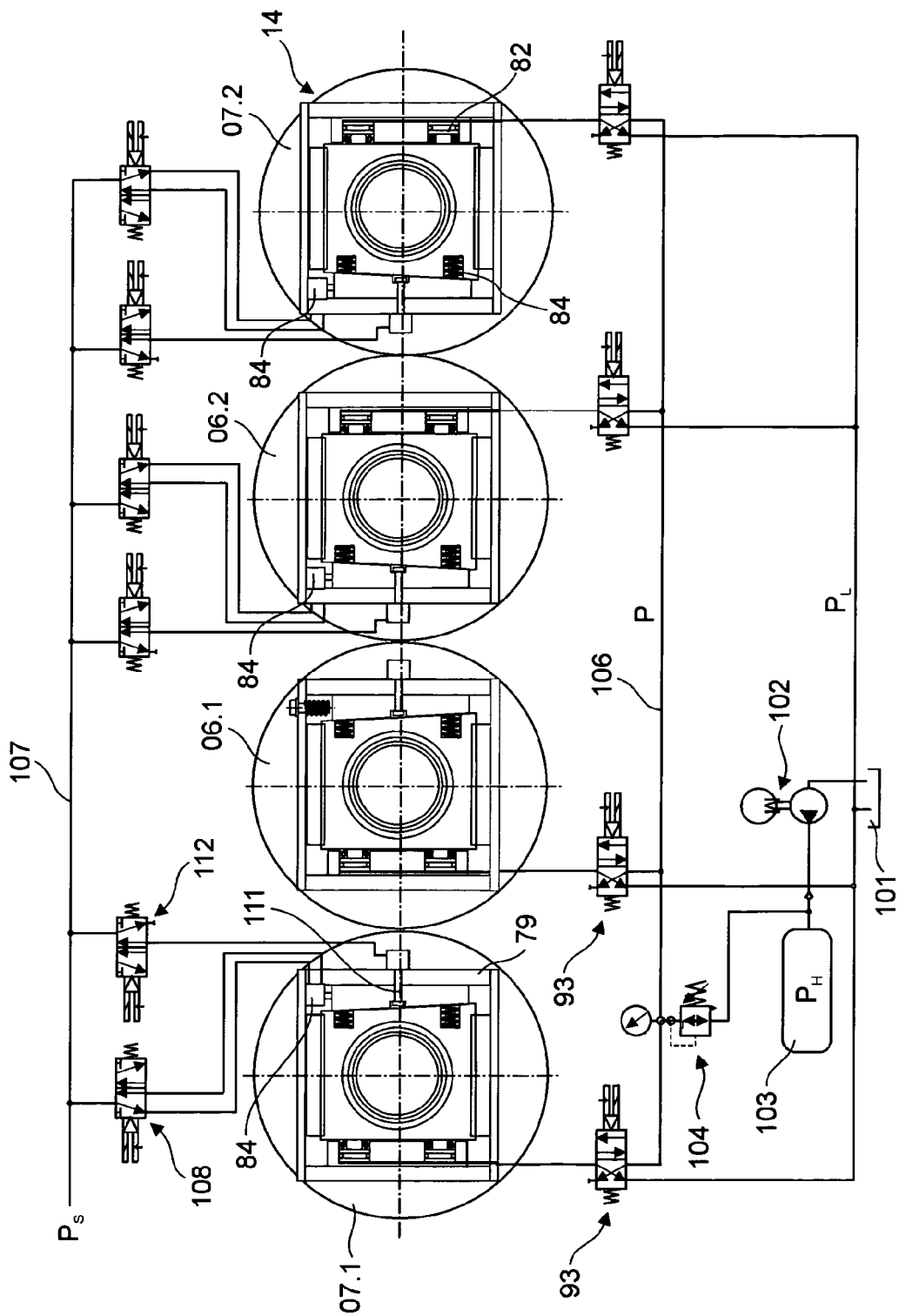
in FIG. 23 a preferred embodiment of an interconnection for a supply of a pressure medium.

In FIG. 23, a preferred embodiment of an electrical interconnection of a pressure medium supply, which is suitable for implementing the aforementioned process method, is shown. A fluid reservoir 101, that is open or closed toward the outside, is set at a pressure level for a pressure $P_L$, such as for example, an ambient pressure that is lower than a pressure P that corresponds to the restoring force $F_R$ of the spring elements 81 of a bearing unit 14. The pressure medium or fluid is compressed by a compressor 102, such as, for example, a pump or a turbine, to a pressure level for a pressure $P_H$, which corresponds at least to the pressure P that is required for the engagement force F. In order to keep pressure medium fluctuations, which may be caused by the removal of pressure medium, as low as possible, fluid which is compressed to the pressure $P_H$ can be advantageously stored in a pressure tank 103. From the pressure medium line that contains the high pressure $P_H$, a supply line 106 is pressurized via a control element 104, especially an adjustable pressure-reducing element 104. The pressure level of that supply line is adjusted, via the pressure reducing element 104, to the pressure P that is suitable for adjustment to the print-on position, such as the corresponding force F; optionally taking into consideration the restoring force $F_R$ and optionally the force DF. In an embodiment that is not specifically shown, two different pressure levels P, such as, for example, $P_{DS}$ for the engagement force at the printing position, and $P_{DW}$ for the engagement force between the printing group cylinders 06; 07, can also be provided via two adjustable pressure reducing elements 104 in two supply lines 106.

The intakes of the valves 93, which have already been mentioned in connection with FIG. 19, and especially multi-way valves, for each adjustable cylinder 06; 07 are now connected to the supply line 106 for the pressure P. With the two aforementioned levels, the intakes of the valves 93 that are allocated to the movable transfer cylinders 06 are connected, for example, to the pressure $P_{DS}$, and the intakes of the valves 93 that are allocated to the forme cylinders 07 are connected, for example, to the pressure $P_{DW}$. The outlets of the valves 93 are connected to the fluid reservoir 101.

A control of the stops 79, which are configured to be movable in a not purely manual fashion, via the correcting elements 84, which are structured as actuators 84 that can be actuated with pressure medium, is accomplished, for example, either advantageously via a separate supply line 107 that supplies a pressure $P_S$, as shown or optionally integrated into the aforementioned pressure level. As shown in FIG. 23, the fluid that supplies the pressure $P_S$ as a gaseous pressure medium, such as compressed air, can be provided in an open system. An intake of a valve 108 that is connected to the assigned actuator 84, is connected to the supply line 107. Based upon the embodiment of the actuator 84, either dual-action in both directions or active in only one or two possible directions, one or two outlets for the valve 108 are connected to one or two intakes for the actuator 84.

In a further development, which is illustrated in FIG. 23, for the purpose of fixing the stop 79 in place, an actuatable holding element 111, such as, for example, a ram, is also provided, by the use of which, the stop 79 can be held in its essentially force-free position, without changing its position with release for adjustment to the print-off position. This holding element 111 can also be connected to the pneumatic supply line 107 for the purpose of actuation or release via corresponding lines and additional valves 112. In the depicted example, the holding element 111 is configured to optionally clamp, with activation, the stop 79 in a non-positive fashion relative to the bearing block 74.

Figure 37:
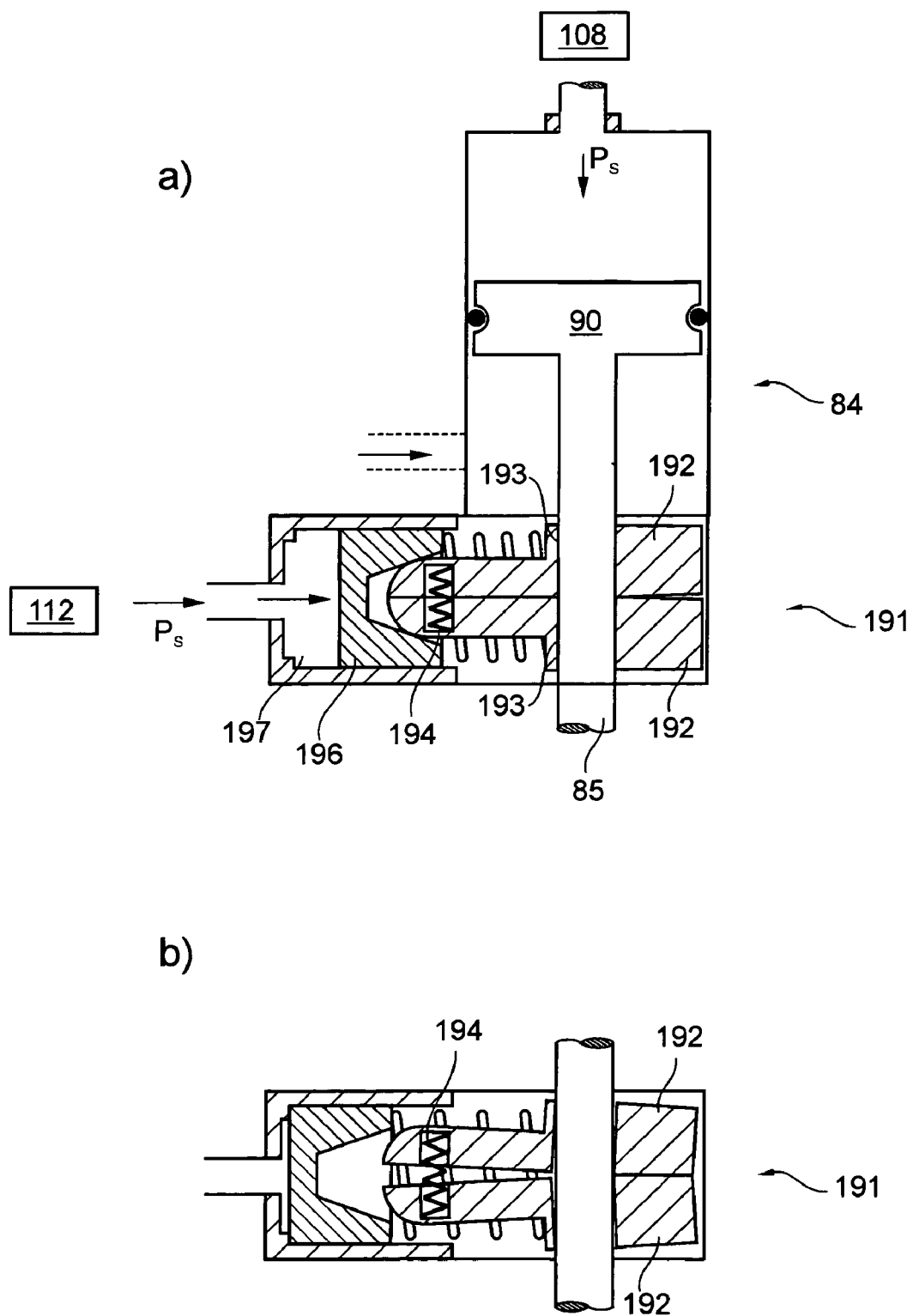
in FIGS. 37a) and 37 b) a preferred embodiment of a support element for a stop for the bearing unit according to FIG. 23.

In one advantageous embodiment, in place of the holding element 111 that fixes the stop 79 in place, a holding element 191, as represented in FIG. 37, is provided, by the use of which, the transfer element 85, and especially the piston rod 85 or a corresponding extension piece, can be clamped. The holding element 191 can be integrated into the actuator 84, or can be arranged between the actuator 84 and the stop 79 as shown in FIG. 37, in such a way that the transfer element 85 can be optionally held in place or can be freely movable in its direction of motion. For example, the holding element 191 has two clamping jaws 192 with openings 193 or at least with recesses for encompassing the transfer element 85, which jaws 192 or openings 193 are in active connection with the transfer element 85 in such a way that, in a first operational state, in which the lengthwise axes of the openings 193 extend parallel to the transfer element 85, they release the transfer element 85, and in a second operational state, in which the lengthwise axes of the openings 193 are tilted relative to the lengthwise axis of the transfer element 85, especially they are spread apart from one another, whereby the latter element is clamped, thus preventing motion. The holding element 191 is preferably configured to be self-locking, so that when the holding element 191 is not actuated, such as, for example, by the force of a spring 194, the second operational state is assumed. The actuation of the clamping jaws 192 is accomplished via surfaces of an actuator 196 that are inclined in such a way that when the actuator 196 is in a first position, the clamping jaws 192 are inclined, as described above, and when the actuator 196 is in a second position, they are not inclined. In principle, the holding element 191, especially the actuator 196, can be actuated manually, for example via a corresponding actuation device, or can be actuated non-manually, remotely, advantageously via a servo drive 197. In FIG. 37, the servo drive 197 is provided as a cylinder 197 that can be pressurized with pressure medium, and in which the actuator 196, which is structured as a piston, is movable. When it is acted upon with the pressure $P_S$, as seen in FIG. 36 a, a release of the clamping occurs, in this case via a corresponding orientation of the clamping jaws 192 or their openings 193. With that release, as seen in FIG. 36 b, a spreading or tilting of the clamping jaws 192 is accomplished via the spring 194, thereby causing a clamping.

A resetting of the stop 79 can be accomplished either via the spring 86 shown in FIG. 9 or alternatively, as indicated in FIG. 37 by a dashed line, actively via the provision of the actuator 84 as a cylinder that can be actuated with pressure medium, with dual-action pistons, or in other words with two pressure medium supply lines, with one on each side of a piston 90.

In the illustrated embodiment, all four cylinders 06; 07 are mounted such that they can be adjusted to the on/off positions via actuators 82. However, only the stops 79 of the two forme cylinders 07 and of one of the transfer cylinders 06 can be adjusted non-manually, especially remotely actuatable, via the actuators 84 that can be actuated with pressure medium. The stop 79 of the other transfer cylinder 06 can be adjusted and can be secured in place, for example, by a correcting element 84 that can be implemented as an adjustment screw. Thus, for example, no holding element 111 is necessary.

In an aforementioned simpler variant, all four cylinders 06; 07 are mounted so as to be linearly movable via actuators 82. Only the two transfer cylinders 06 have movable stops 79, optionally with the aforementioned actuators 84 and/or holding elements 111.

In a further simplified embodiment, although one of the two transfer cylinders 06 can be adjusted in its position, it is not operationally movable in the sense of an on/off adjusting movement. Rather, it is mounted, fixed to the frame. The three other cylinders 06; 07 are then movably mounted, in the sense of an on/off adjusting movement. In a first variant, all of these three cylinders 06, 07, and, in a second variant, only the transfer cylinder 06 that differs from the fixed transfer cylinder 06, have a movable stop 79 and optionally the holding element 111.

Figure 25:
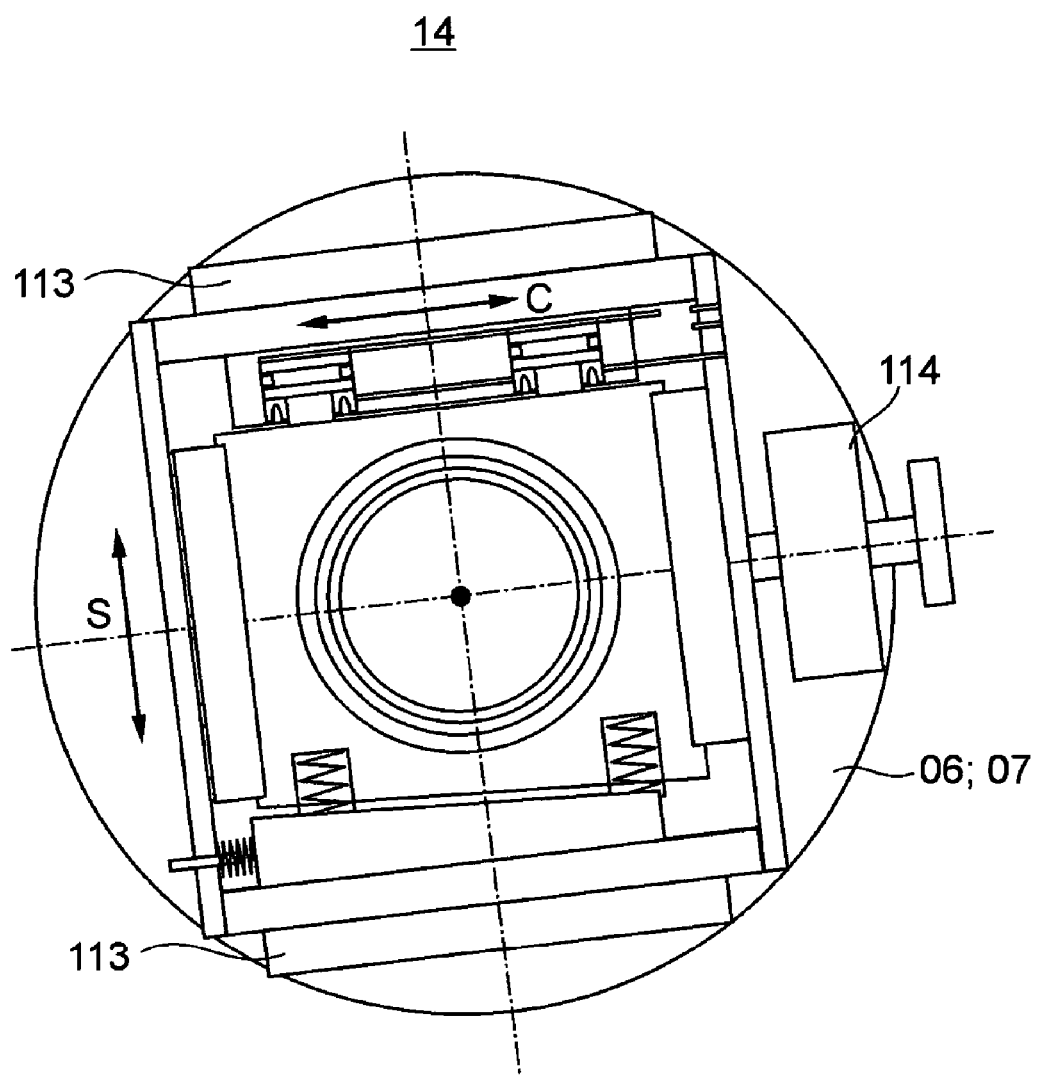
in FIG. 25 a bearing unit with elements for use in the inclination of a cylinder.

In a further development of the cylinder mounting, the bearing units 14 of the forme cylinder 07 and/or of the transfer cylinder 06, as schematically illustrated in FIG. 25, are themselves movably mounted on at least one end surface in bearings 113, such as, for example, in linear bearings 113, such that they are movable in one direction of motion C, which direction extends perpendicular to the axis of cylindrical rotation, and which has at least one component that is perpendicular to the direction of adjustment S. The direction of movement C is preferably selected to be perpendicular to the direction of adjustment S, and, with a single-side actuation, effects an inclination, or a so-called "cocking" of the relevant cylinder 06; 07. The adjustment of the cylinder 06; 07 can be accomplished via a manual or a motor-driven correcting element 114, such as, for example, via a handwheel or preferably via a motor-driven adjustment screw. This type of additional mounting of the bearing unit or units 14 on the forme cylinder 07 enables an inclination of that cylinder, and a register adjustment, and enables the forme cylinder 07's inclination relative to the transfer cylinder 06.

Figure 38:
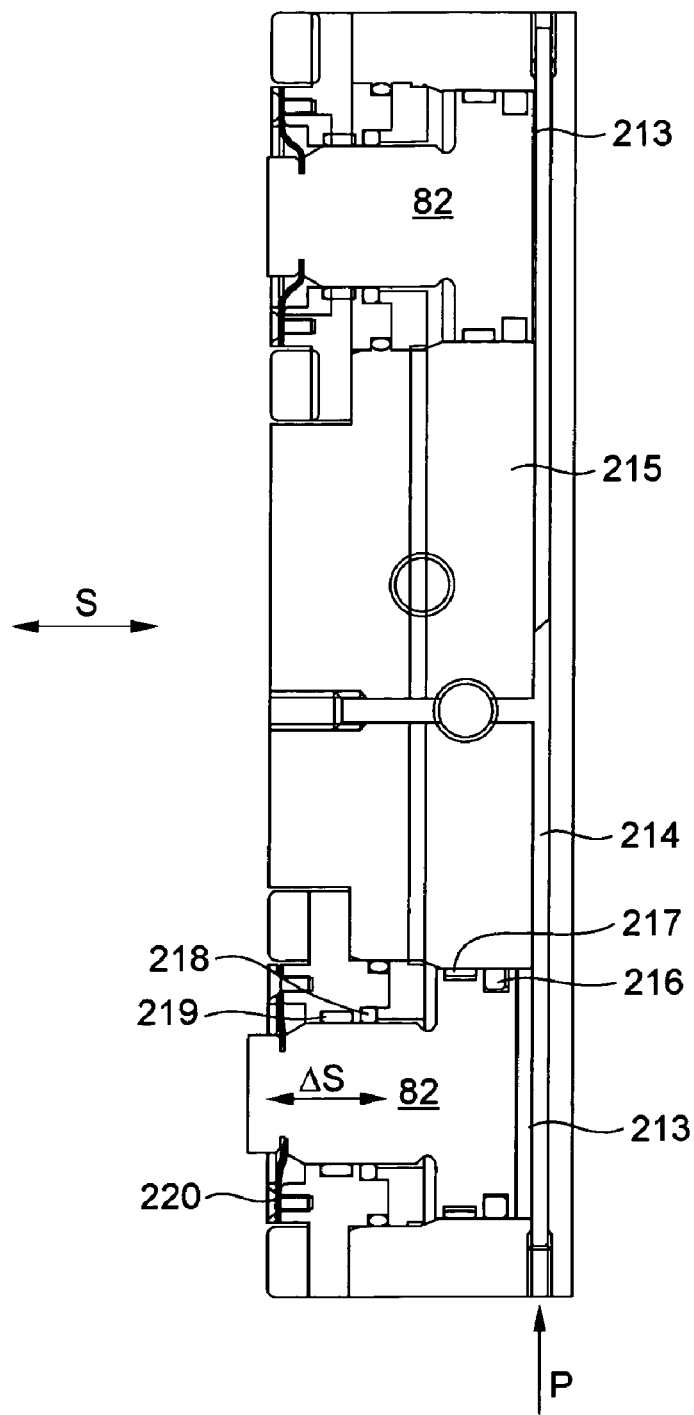

In addition, the actuator 82, which is provided in the above embodiment of the bearing units 14, is structured to provide an adjustment path DS that is suitable for on or off adjustment, and thus preferably has a linear stroke that corresponds at least to DS. The actuator 82 is provided for adjusting the engagement pressure of rollers or cylinders 06, 07, which are engaged against one another, and/or for performing the adjustment to the print-on/print-off position, and are configured accordingly. The adjustment path ΔS, or the linear stroke amounts, for example, to at least 1.5 mm, and especially to at least 2 mm. In FIG. 38 there is shown an advantageous embodiment of an actuator element 97, such as for example, provided as a preassembled component. This actuator element 97 comprises at least one, and preferably two, actuators 82 arranged as pistons 82, that can be actuated with pressure medium to move in the direction of adjustment S. These pistons are movably mounted in recesses 213 in a base component 215 that serve as pressure chambers 213 that can be impinged upon with pressure medium. The actuator element 97 also comprises a supply line 214 for supplying the pressure chambers 213 with pressure medium at the pressure P. Preferably, the two pressure chambers 213 are supplied by one common supply line, and thus are pressurized or are released in the same manner. In FIG. 38, however, the upper piston 82 is represented, by way of example for both pistons 82, in an inserted position, and the lower piston is represented, by way of example for both pistons 82, in a retracted position. For this reason, the supply line 214 has also been characterized only partly as being acted upon by pressure medium.

The piston 82 is sealed against the pressure medium chamber 213 by a seal 216, which is positioned near the pressure chamber, and which is extending around the circumference of the piston 82, and is guided via a sliding guide 217 that is positioned near the pressure chamber. A second seal 218 and a second sliding guide 219 can also be advantageously provided in an area of the piston 82 that is distant from the pressure chamber. In one particularly advantageous embodiment, in place of, or in addition to the second seal 218, the piston 82 is also sealed against the outside by a membrane 220, for example made of rubber, especially a roller membrane 220. This membrane 220 is connected on one side, all the way around, to the piston 82. On the other side, on its outer peripheral line, the membrane is entirely connected to the base component 215 or to other stationary internal parts of the actuator element 97.

In one advantageous embodiment of the printing unit 01, parts of the printing unit 01, especially panel sections 11; 12; 49, are arranged to be linearly movable relative to one another, especially in a linear guide, for the purpose of loading or maintaining the printing unit 01. The cylinders 06; 07 of the printing unit 01 are arranged to be linearly movable within the corresponding panel section 11; 12, in linear bearings, for the purpose of adjusting the engagement pressure and/or for performing the print-on/print-off adjustment.

The actuation embodiments, which will be described in what follows, are, in principle, also advantageous independently of the above-described partitionability and/or modularity and/or the cylinder arrangement on the inner panels of the side frame 11; 12 and/or the linear arrangement and/or the special linear bearing and/or the previously mentioned on/off positioning and adjustment of the cylinders 06; 07. However, particular advantages result specifically from a combination with one or more of the aforementioned characterizing features.

Below, preferred embodiments of drive transmissions, which are structured as functional modules, are described. In the drive solutions, functional groups for the printing unit 01 are logically combined and are equipped with their own drive motors, as discussed below, especially servo, AC, or asynchronous motors. Here, a printing cylinder transmission, with its own drive motor, comprises, for example, the drive for a forme cylinder/transfer cylinder pair. In addition, an inking unit transmission with its own drive motor, which is usable for both rotation and oscillating motion and, in the case of wet offset printing, a dampening unit transmission with its own drive motor, also for rotation and oscillating motion provide a high degree of the aforementioned modularity.

Figure 26:
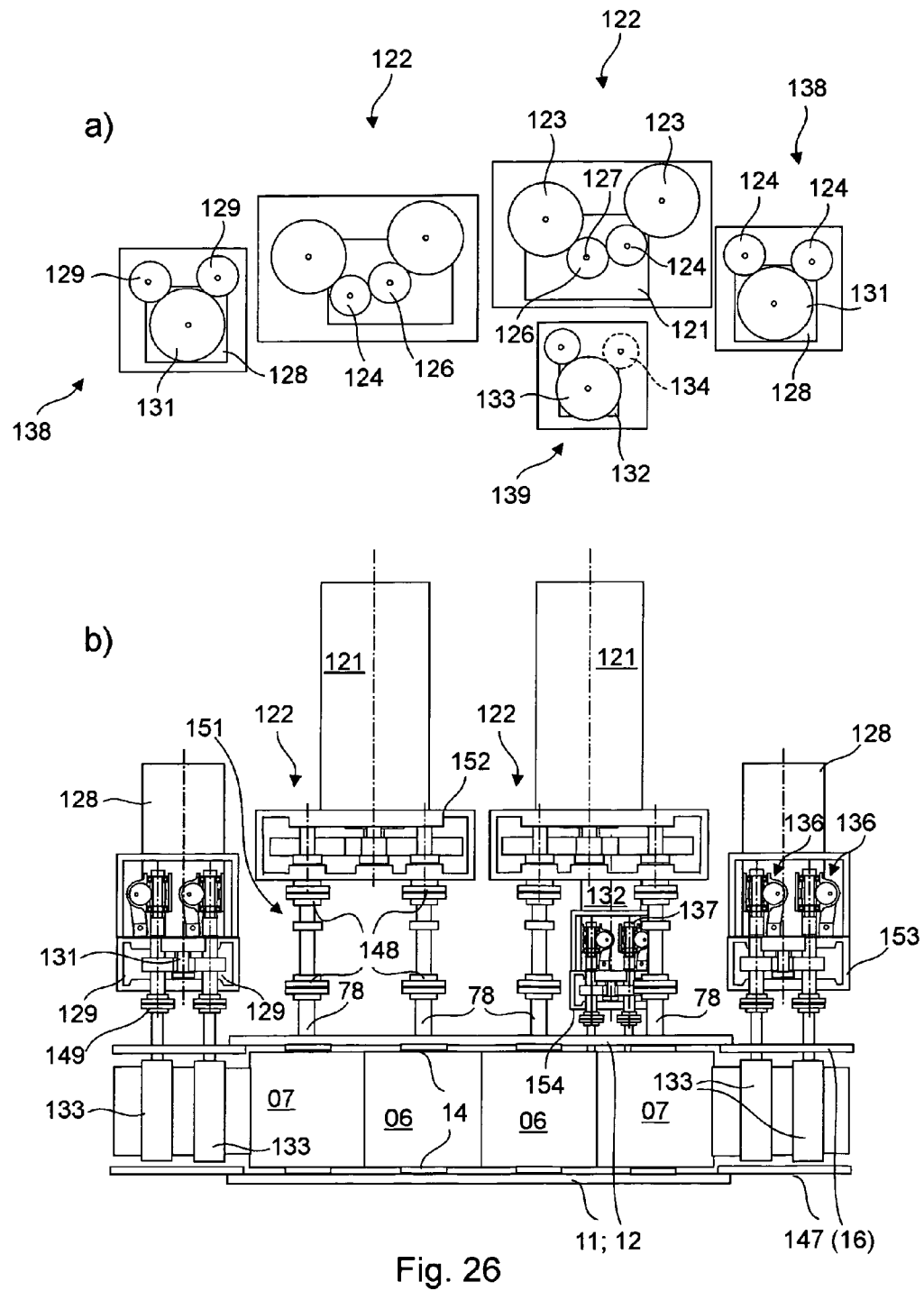
in FIG. 26 a first preferred embodiment of the drive for a printing group.

The transmission units, which are preferably preassembled as modules, can be completely preassembled as sub-units for the printing unit cylinders 06; 07, as shown in FIG. 26, 27 and/or for the inking units 08, as seen in FIG. 26, 27, which are, for example, implemented as a module, and can, in one advantageous embodiment, be pre-mounted on the frame 147, or the framework 16 of the inking unit module before being installed in the printing unit 01. On the other hand, such modularity also permits the installation/replacement/exchange of the transmission that is implemented as a module when the inking unit module is already installed in the machine.

The concept of modularity for separate printing group cylinders, for inking unit drives and for dampening unit drives ensures both the partitionability of the printing unit 01 at the printing position 05, see, for example, FIG. 3 and the partitionability between the forme cylinder 07 and the inking unit 08, see FIG. 24. The separate modules for the printing group cylinders 06; 07, the inking unit 08 and optionally the dampening unit 09 also permits the simultaneous set-up operation and printing forme exchange and/or the washing of the rubber blanket while a washing of the inking unit and/or a pre-inking is taking place. In this connection, the process programs can differ from one another in terms of duration, speed and functional progress.

Figure 27:
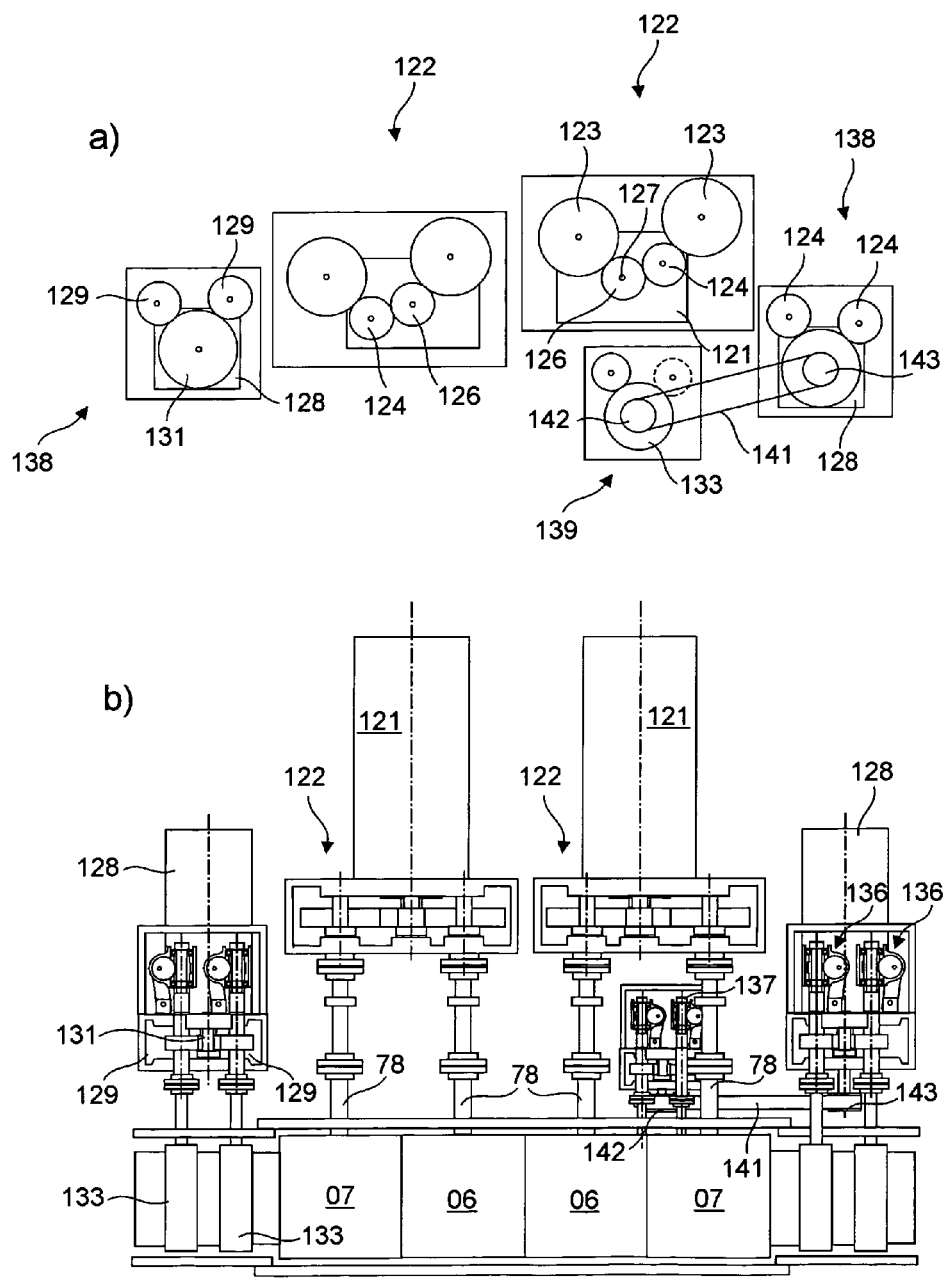
in FIG. 27 a second preferred embodiment of the drive for a printing group.

When requirements with respect to variation and/or modularity are low, larger functional groups can also be combined to form one module, as is depicted in FIG. 27, 28, 29.

In the preferred embodiment, the transmission or the gear train of the respective drive module is, in each case, structured as an separately enclosed transmission, and is actuated by at least one drive motor that is mechanically independent from the other functional modules. Thus, when a printing unit 01 is comprised of modules, it is not necessary to account for an extensive fluid chamber and/or drive connections. The structural components, considered in and of themselves, are complete and separated.

Figure 28:
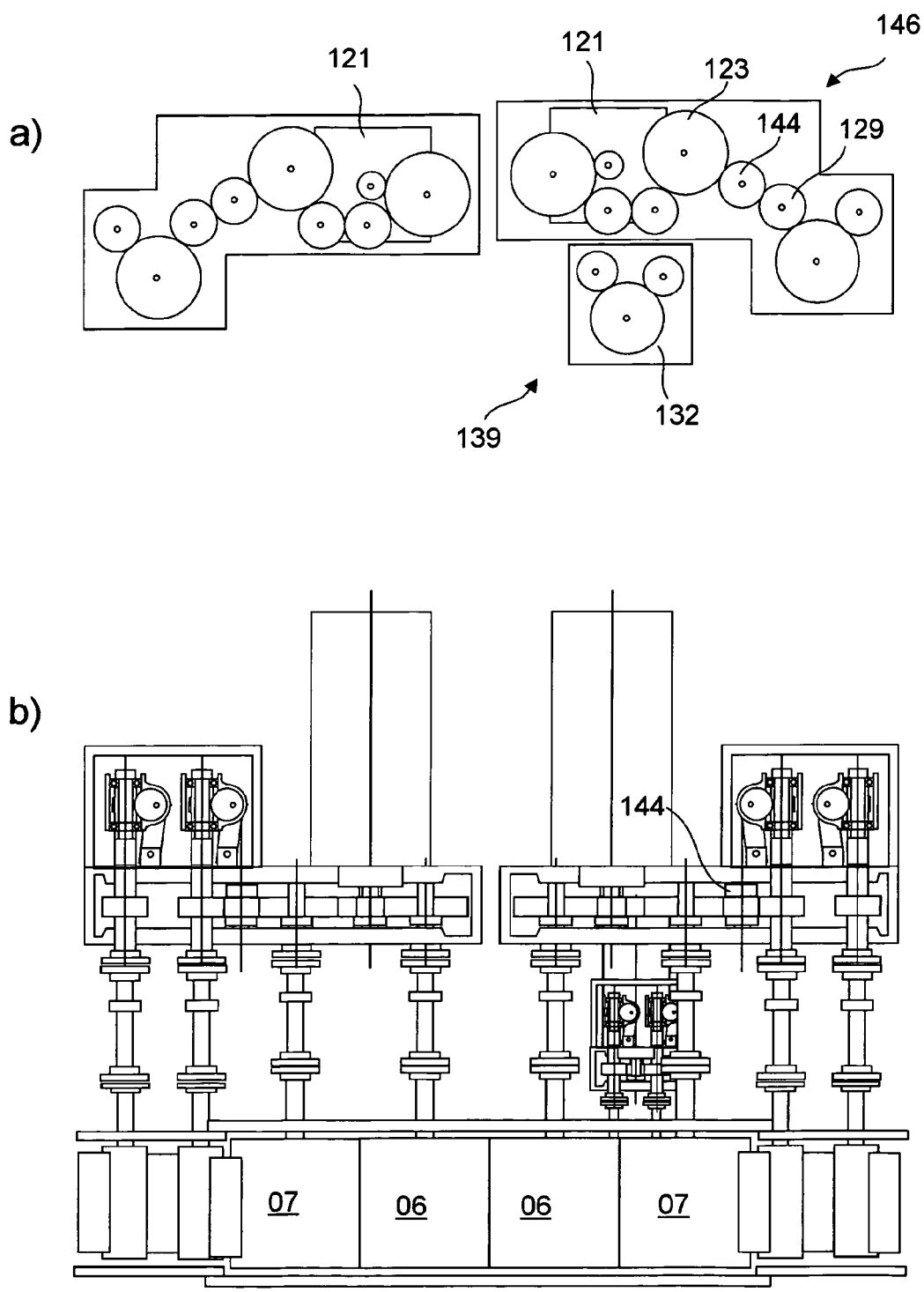
in FIG. 28 a third preferred embodiment of the drive for a printing group.
Figure 29:
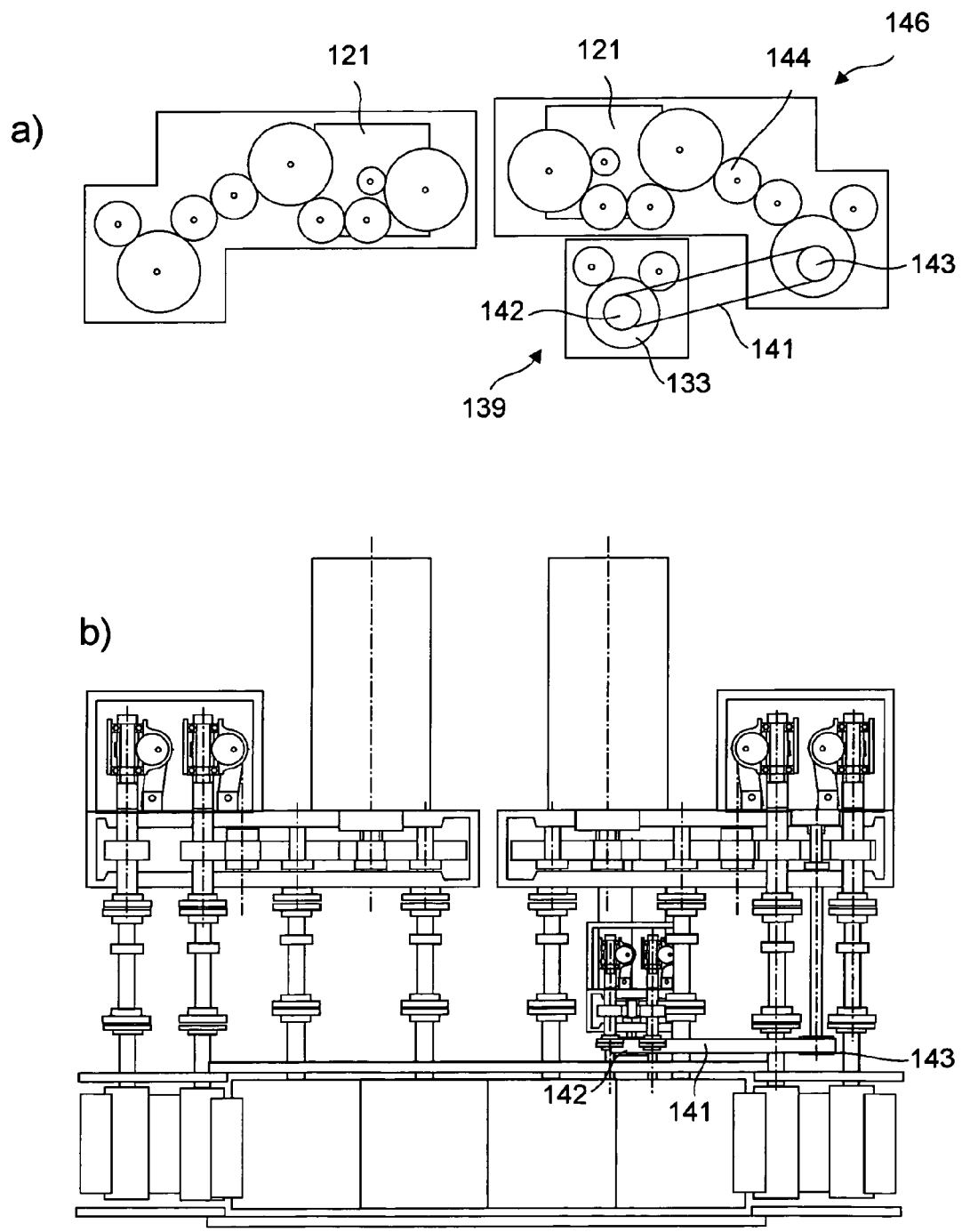
in FIG. 29 a fourth preferred embodiment of the drive for a printing group.

By way of example, on the left side of each of FIGS. 27, 28, 29 the conditions for the dry offset process are shown, and on the right side, the conditions for wet offset printing are shown. Naturally, the two printing groups 04 of an actual blanket-to-blanket printing unit 03 are of the same type. In the end-surface views, in order to provide an overall view, the roller layout is omitted and only the drive trains, with motors, are represented. In the plan view, the drive concept is in the example of an inking unit 08 with two rotationally actuated distribution cylinders 33, in this context see inking unit 08.2 and, in the case of wet offset printing, in contrast to the FIGS. 11a) and 11b), in the example of a dampening unit 09 with two rotationally actuated distribution cylinders 33, as indicated as optional in FIG. 26 by a dashed line.

The actuation of the printing group cylinders 06; 07 is implemented in pairs. In other words, every pair of cylinders 06, 07, which is made up of the forme cylinder and of its assigned transfer cylinder 07; 06, is equipped with at least one drive motor 121 of its own, which drive motor 121 is mechanically independent from other printing group cylinders. In a variant that is not shown here, for example, this can be accomplished with a separate, mechanically independent drive motor 121. Alternatively, as represented in what follows, it can be accomplished with the paired actuation via drive connections or drive trains.

In FIG. 26*a*), in an end-surface view, and in FIG. 26*b*) in a plan view, a gear or drive train 122 is represented, and is especially configured as a drive or a functional module 122, in each case for the pair of printing cylinders 06, 07. The cylinders 06; 07 are each equipped with drive wheels 123, especially with spur gears 123, which are non-rotatably connected via the drive shafts 78, whose tip diameter is smaller than the outer diameter of the respective cylinder 06; 07 or cylinder barrel 67; 68. These spur gears 123 are in drive connection with one another via an even number of intermediate gears 124; 126, and in this case via two toothed gears 124; 126. In an embodiment which is represented in FIG. 26*a*), one of the two toothed gears 124; 126, and especially the toothed gear 126 that is positioned near the transfer cylinder, acts as a sprocket and is actuated via the motor shaft 127 of the drive motor 121. In principle, as is shown in FIG. 27, the drive can also be implemented by the drive motor 121 via an additional sprocket on one of the two drive wheels 123, especially on the drive wheel of the transfer cylinder 06.

The inking unit 08 is, in each case, equipped with its own drive motor 128 for rotational actuation, which drive motor is mechanically independent from the printing group cylinders 06; 07. With this configuration, especially the two distribution cylinders 33 of the inking unit 08.2, and in the case of an anilox roller 26 the one cylinder 33, or in the case of three distribution cylinders 33 the three cylinders 33 are actuated, for example via drive wheels 129 that are non-rotatably connected to these cylinders, and a drive sprocket 131. In the case of wet offset printing, as depicted on the right, essentially the same applies for the actuation of the dampening unit 09 with a drive motor 132, a drive sprocket 133 and one or more drive wheels 134, represented by a dashed line, of one or more distribution cylinders 42; 48. In FIG. 26*b*) one friction gearing 136 or 137, that generates the axial oscillating motion, is provided for each distribution cylinder 33 of the inking unit 08 and for each distribution cylinder 42; 48 of the dampening unit 09. In principle, this axial oscillating motion can be actuated by an additional drive motor, or, as represented here, it can be structured as a transmission 136; 137 that converts the rotational motion into axial motion. In the modification of the embodiment shown in FIG. 26, the actuation of the inking unit 08 can be accomplished, according to FIG. 32. In other words, only the distribution cylinder 33.2 that is positioned distant from the forme cylinder is forced into rotational actuation. However, optionally both distribution cylinders 33.1; 33;2 are forced into axial actuation, and/or a three-roller dampening unit 09 can be rotationally actuated purely via friction, as described above with regard to the further development of FIG. 11*a*).

The drive of the extra actuated inking unit 08 and, if provided, of the dampening unit 09 is, in each case, preferably implemented as a functional group, especially as a drive or a functional module 138; 139. These drive modules 138; 139 can especially be mounted as a complete unit and can each preferably be implemented as enclosed units, as is seen in FIG. 26*b*.

In FIG. 26, by way of example for the other drive variants in the subsequent figures, an advantageous embodiment of the bearing as bearing units 14 is also indicated in the aforementioned embodiment for the mounting of the four cylinders 06; 07. For example, the shafts 78 are guided through corresponding recesses or openings, optionally, with respect to modularity and thus with different axial spacing, as an elongated hole, in the side frame 11; 12.

The corresponding or repeated parts are not all explicitly marked again with reference symbols each time in FIGS. 26 through 29.

In the advantageous embodiment, which is represented in FIGS. 26 and 27, the rotational axes of the four printing group cylinders 06; 07 of the blanket-to-blanket printing unit 03 are arranged, by way of example, in the shared plane E. However, the drive concept of FIG. 26 or 27 can also be applied to nonlinear arrangements of the cylinders 06; 07 as shown, by way of example, in FIGS. 1, 28 and 29, with the corresponding nonlinear arrangement of the drive wheels 123. The drive concept from FIGS. 28 and 29 can also be applied to the linear arrangement of the cylinders 06; 07.

In an embodiment of the present invention, and according to FIG. 27, the printing group cylinders 06; 07 and the inking units 08 have their own drive, as was the situation in connection with FIG. 26. Although the inking and dampening unit drives are configured as separate functional modules, the printing group 04 on the right that represents wet offset printing has a dampening unit 09 without its own rotational drive motor. In this case, the rotational actuation is accomplished by the inking unit 08 via a mechanical drive connection 141, such as, for example, by a belt drive 141, either directly via a drive wheel, such as a pulley, that is connected to the respective distribution cylinder 42; 48, or, as represented, via a drive wheel 142, such as a pulley, that is connected to the drive sprocket 133, for its distribution cylinder 42; 48 or its distribution cylinder 42; 48. Actuation is accomplished, for example, via a drive wheel 143, such as, for example, a pulley 143, which is non-rotatably connected to the drive shaft of the drive motor 128. In a modification of the embodiment according to FIG. 27, the actuation of the inking unit 08 can be accomplished according to FIG. 32. In other words, only the distribution cylinder 33.2 that is distant from the forme cylinder can be forced into rotational actuation, and optionally both distribution cylinders 33.1; 33.2 can be forced into axial actuation, and from there can be actuated on the dampening unit 09.

In an embodiment according to FIG. 28, the dampening unit 09 is structured as a functional module and has, as in FIG. 26, its own drive motor 132. However, the inking unit 08 does not have a drive motor that is independent from the printing group cylinders 06; 07. Rotational actuation is accomplished via one of the cylinders 06; 07, especially the forme cylinder 07, via a mechanical drive connection 144, for example via at least one intermediate gear 144, especially a toothed gear 144, between the spur gear 123 and the drive wheel 129 of one of the distribution cylinders 33. In an advantageous variant, the drive connection 144 can also be implemented as a belt drive. The actuation of the printing group cylinder pair 06, 07 with an allocated inking unit 08 is preferably provided as a drive train 146 or as a drive or functional module 146, especially at least the space that contains the drive train of the cylinder pair 06, 07 and inking unit 08 is, for example, enclosed. In a modification of the embodiment according to FIG. 28, the actuation of the inking unit can be accomplished according to the principle presented in reference to FIG. 32. In other words, only the distribution cylinder 33.2 that is positioned distant from the forme cylinder is forced into rotational actuation by the forme cylinder 07 via a drive connection. However, optionally both distribution cylinders 33.1; 33.2 can be forced into axial actuation. The drive of a three-roller dampening unit 09 can be rotationally actuated via the drive motor 132, or, as described above in reference to the further development of FIG. 11*a*), can be rotationally actuated purely via friction.

In an embodiment according to FIG. 29, the dampening unit 09 is configured as a functional module. However, as in FIG. 27, it does not have its own drive motor. The inking unit 08 does not have an independent drive motor, as in FIG. 28. Rather, it is again actuated, as in FIG. 28, rotationally by one of the cylinders 06; 07, especially by the forme cylinder 07, via a drive connection 144, for example an intermediate toothed gear 144. As in FIG. 27, the dampening unit 09 is actuated via a belt drive 141. The drive of the printing group cylinder pair with the allocated inking unit 08 is again preferably provided as a functional module 146. Specifically, it can be enclosed. In a modification of FIG. 29, the actuation of the inking unit 08 can be accomplished according to the principle presented in reference to FIG. 32. In other words, only the distribution cylinder 33.2 that is distant from the forme cylinder is forced into rotational actuation by the forme cylinder 07 via a drive connection. However, optionally both distribution cylinders 33.1; 33.2 are forced into axial actuation. The drive of a three-roller dampening unit 09 can be rotationally actuated via the drive connection 141, or as described above in reference to the further development of FIG. 11*a*), purely via friction.

In further, fifth variants, which are not illustrated here, in wet offset printing the printing cylinder transmission and the dampening unit transmission can be implemented together as a functional module with a shared drive motor. The functional module 138 is retained as it is in FIG. 26, and has a drive motor 128. In a modification, the inking unit is implemented as a functional module 138. However, it is actuated without its own motor by the printing cylinder transmission via a belt drive.

In a modification of FIG. 27, actuation of the dampening unit drive, that is implemented as a functional module 139, can be accomplished not by the inking unit 08, but by the drive train 122 of the printing group cylinders 06; 07, via a belt drive.

As is apparent in FIG. 26 through 29, the drive modules 122 with the two printing group cylinders 06; 07 are coupled in each case via at least one non-rotatable coupling 148, and especially by at least one angle-compensating coupling 148. Preferably, two couplings 148 of this type are provided in series with an intermediate piece, or with a component which is implemented overall as a double universal joint, which then in combination represent a coupling 151 that serves to compensate for an offset. In this manner, despite the movability, during on/off adjustment of the cylinders 06; 07, an arrangement of the drive modules 122 and drive motors 121, in which they are fixed to the frame is possible. During mounting, only those shafts 78 that have the couplings 148 need to be flange-mounted to the functional modules 122, which are manufactured separately. From the functional module 122, which is especially closed to the outside or is encapsulated, shaft butts or flanges, which are indicated in the figures, advantageously protrude, and which, during assembly of the printing unit 01, only need to be non-rotatably connected to the shaft piece that has the coupling 148; 151, which, in turn, is non-rotatably connected to the shaft 78. Especially advantageously, the coupling 148 is implemented as a disk coupling 148 or as an all-metal coupling, and has at least one disk packet that is positively connected to two flanges, but which is offset in the circumferential direction of the disks.

The coupling 151 between the functional module 122 and the forme cylinder 07 is preferably implemented to enable a lateral register control or regulation in such a way that it also accommodates an axial relative movement between the forme cylinder 07 and the functional module 122. This can also be accomplished with the aforementioned disk coupling 148, which, with deformation in the area of the disks, enables an axial length change. An axial drive that is not shown here can be provided on the same side of the frame, or on the other side of the frame as the rotational drive.

The actuated rollers 33, and especially the distribution cylinders 33, of the dampening unit 09 are also preferably coupled via at least one coupling 149, especially a coupling 149 that compensates for angular deviations, to the functional module 138. Because, as a rule, no off/on adjustment of these rollers 33 occurs, a coupling 149 of this type is sufficient. In a simple embodiment, the coupling 149 is also structured as a rigid flange connection. The same applies to the drive on the optionally functional module 139.

In FIG. 26 through 29, the friction gearing 136; 137 can be arranged outside of an enclosed space that can accommodate the rotational drive trains, and which enclosed space the lubricant space.

The drive trains 122; 138; 139; 146, which are provided as drive modules 122; 138; 139; 146, are implemented as components that, as units, are each completely closed off by housings 152; 153; 154, which are different from the side frames 11; 12. For example, they have an intake, to which, for example, a drive motor or a drive shaft can be coupled, and one or more outlets, which can be non-rotatably connected to the cylinder 06; 07 or the roller, such as the anilox roller or the distribution roller 26; 33; 42; 48.

As an alternative to the above-described coupled printing cylinder drives, in another advantageous embodiment, the printing cylinders 06; 07 can also each be individually actuated by a drive motor 121, as seen in FIG. 30. Preferably, in a "drive train" between the drive motor and the cylinders 06; 07, a transmission 150, and especially a speed-reduction gear set 150, such as a planetary gear set, is provided. Such as gear set can be already structurally pre-assembled as an adapter transmission on the motor 121 to form a component unit. However, a modular transmission can also be provided as a drive or as a functional module, at the intake of which the drive motor can be coupled, and at the output of which the respective cylinder can be coupled, especially via a coupling 148 or 151 that serves to compensate for angle and/or offset.

In the embodiments of the present invention, according to FIG. 26 through 30, the drive motors 121 with their drive modules 122 or transmissions 150 can be arranged, fixed to the side frames 12. Any necessary offset in the on/off adjustment of the nip points is enabled by the couplings 148. In one advantageous embodiment that is not illustrated here, and in a further development of the embodiment according to FIG. 30, the individual drive motors 121, especially with the adapter transmission 150, for each printing unit cylinder 06; 07 are rigidly connected not to the side frame 12, but directly to the movable bearing element 74. For example, they are screwed on, and are moved along with the adjusting movement. To support the drive motors 121, a bracket with a guide can be provided on the side frame 12, on which bracket the drive motor 121 is supported and can be moved along with the movement of the relevant cylinder 06;07 in the direction of adjustment S.

FIG. 31 through 35 show an embodiment of the inking unit 08 or the inking unit drive, advantageous, for example, in terms of ink transport and wear and tear, which alone, but also in combination with one or more features of the aforementioned printing units 01, contains benefits.

The inking unit 08, referred to, for example, as a single-train roller inking unit 08 or also as a "long inking unit", has a multitude of the rollers 28; 33; 34; 36; 37 already mentioned above. It comprises, according to FIG. 31, at least two forme rollers 28 that apply ink to the printing forme of the forme cylinder 07, and which receive the ink via an oscillating distribution roller 33.1 or distribution cylinder 33.2, which is provided, for example, with a hard surface that is near the printing forme or forme cylinder; an inking or transfer roller 34, which is provided, for example, with a soft surface; a second oscillating distribution roller 33.2 or distribution cylinder 33.2 that is distant from the forme cylinder; another inking or transfer roller 34, which is provided, for example, with a soft surface; a film roller 37 and a fountain or dipping roller 36 from an ink fountain 38. Dipping and film rollers 36; 37, which are characteristic of a film inking unit can also advantageously be replaced by another ink supply or metering system, such as, for example, a pump system in an ink injector system, or a vibrator system in a vibrator inking unit.

Figure 31:
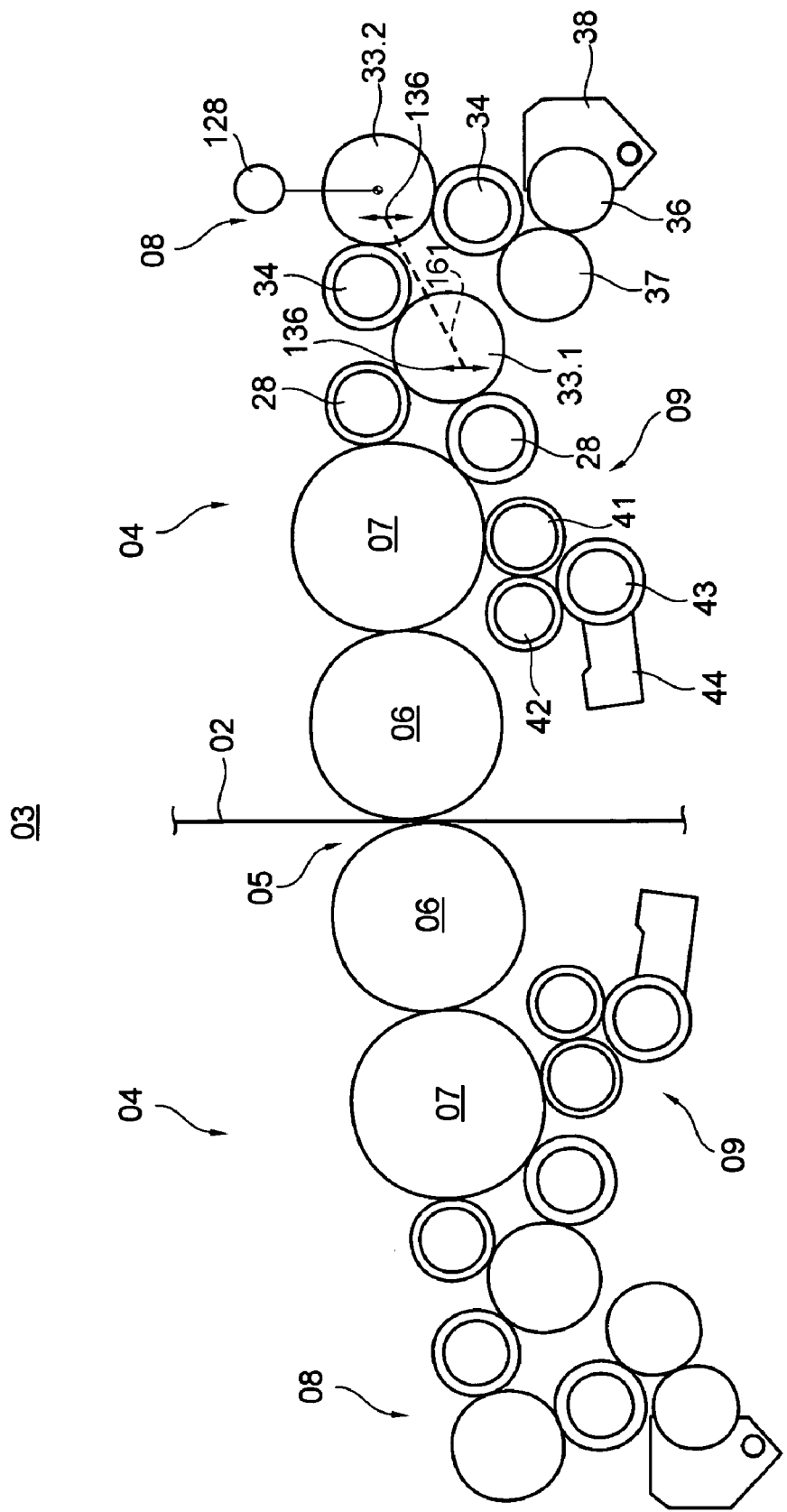
in FIG. 31 an enlarged representation of a blanket-to-blanket printing unit built in accordance with the planar construction principle.

The soft surfaces of the forme and/or transfer rollers 28; 34, in short: soft rollers 28; 34, are resilient in a radial direction. For example, they are configured with a rubber layer, which is indicated in FIG. 31 by the concentric circles.

Now, if the rollers 28; 33; 34; 37 of the inking unit 08 are positioned adjacent to one another, then the hard surfaces of the distribution cylinders 33.1; 33.2 dip into the soft surfaces of the respective coordinating soft rollers 28; 34 to a greater or lesser extent, based upon engagement pressure and/or the adjustment path. In this manner and as a function of, the impression depth, the circumferential ratios of rollers 28; 33; 34; 37 that roll against one another change.

Now if, for example, for one of multiple coordinating rollers a forced rotational actuation occurs based upon a preset speed, such as, for example, via a drive motor or a corresponding mechanical drive connection to another actuated component, then an adjacent soft roller, that is actuated only via friction from the former roller, rotates at a different speed, which is based upon impression depth. However, if this soft roller were to also be actuated by its own drive motor, or additionally via friction at a second nip point by another speed-set roller, then, in the first case, this could result in a difference between the motor-driven preset speed and the speed caused by friction, and in the second case it could result in a difference between the two speeds caused by friction. At the nip points, this results in slip and/or the drive motor or motors being unnecessarily stressed.

In the area of the inking unit 08 near the forme cylinder, and especially in the area of the application of ink by the rollers 28 onto the printing forme, with the solution described below a slip-free rolling or "true rolling" and inking are achieved.

The distribution cylinder 33.1, which is located near the forme cylinder, is rotationally actuated only via friction from the adjacent rollers 28; 34, and for its rotational actuation does not have an additional mechanical drive connection for actuating the printing group cylinders 06; 07, or another inking unit roller that is forced into rotational actuation, or its own separate drive motor. In this manner, the first distribution cylinder 33.1 is rotationally actuated predominantly via the, in this example, two, and optionally also one or three forme rollers that are actuated via friction with the forme cylinder 07, and essentially has the circumferential speed of the forme cylinder, independent of the impressions in the nip points that lie between them. The distribution cylinder 33.2 that is distant from the forme cylinder, as indicated in FIG. 31, has a drive motor 128 that actuates it rotationally, but which, aside from the friction gearing formed with the rollers 33.2; 34; 33.1, has no mechanical coupling with the first distribution cylinder 33.1. In the case of more than two distribution cylinders 33.1; 33.2, such as, for example, three distribution cylinders, the two that are distant from the forme cylinder can be forced into rotational actuation. Alternatively only the center distribution cylinder 33.2, or the one that is farthest from the forme cylinder, can be forced into rotational actuation.

Preferably, both distribution cylinders 33.1; 33.2 have an oscillation or friction gearing 136 that is symbolized in FIG. 31 by respective double arrows.

In an embodiment that is mechanically less involved, the distribution cylinder 33.1 that is near the forme cylinder has its own oscillation gearing 136 which converts only its rotational motion into an oscillating motion. This can advantageously be structured as a cam mechanism, wherein, for example, an axial stop, that is fixed to the frame, operates in conjunction with a curved, peripheral groove provided in the roller, or an axial stop that is fixed to the roller, operates in a peripheral groove of a cam disk, which is fixed to the frame. In principle, this transmission 136 that converts the rotation to an oscillating axial linear stroke, can be implemented as another suitable transmission 136, such as, for example, as a worm gear or as a crank mechanism that has an eccentric.

As is symbolized in FIG. 31 by a dashed line that connects the double arrows, the oscillation gearing 136 of the first distribution cylinder 33.1 is advantageously mechanically coupled to the oscillation gearing 136 of the second distribution cylinder 33.2 via a transmission 161. The two coupled oscillation gearings 136 advantageously represent a shared oscillation drive 162, or an oscillation gearing 162, and are force actuated for their oscillating movement via a drive motor. Preferably, the forced actuation of the oscillation gearing 162 is accomplished via the drive motor 128 that rotationally actuates the second distribution cylinder 33.2, as seen in FIG. 32.

Figure 32:
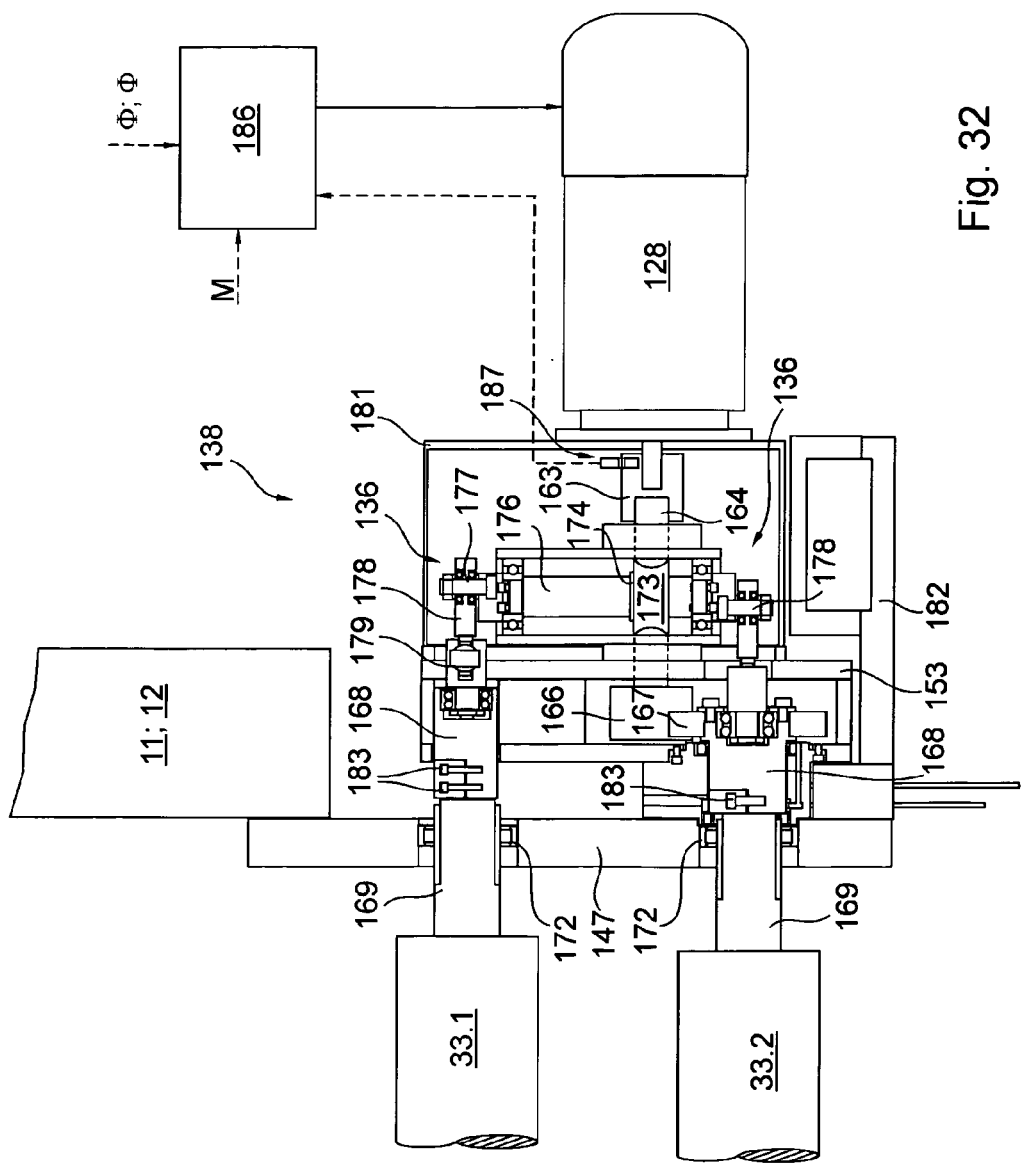
in FIG. 32 a preferred embodiment of an inking unit drive.
Figure 33:
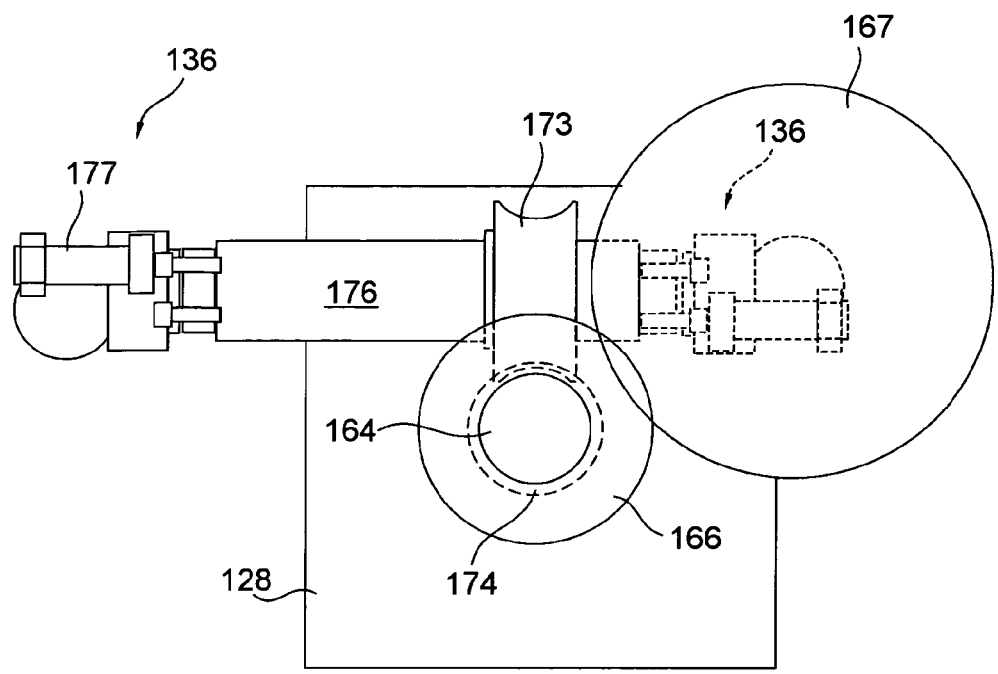

In FIGS. 32 and 33, an advantageous embodiment for the actuation of the distribution cylinders 33.1; 33.2 is illustrated. Only the second distribution cylinder 33.2 is forced into rotational actuation, but both distribution cylinders 33.1, 33.2 are forced into axial actuation via the shared oscillation drive 162. The printing group cylinders 06; 07 can be implemented either in pairs, as represented in FIG. 26, with drive motors 121 for each cylinder pair, or advantageously each cylinder is driven individually, each with its own separate drive motor 121, as represented in FIG. 30.

In this embodiment, the drive motor 128 drives, via a coupling 163 and via a shaft 164 on a drive sprocket 168, which, in turn, acts in conjunction with a spur gear 167 that is non-rotatably connected to the second distribution cylinder 33.2. The connection can be made, for example, via an axle section 168, which supports the spur gear 167, on a journal 169 of the second distribution cylinder 33.2. A corresponding axle section 168 of the first distribution cylinder 33.1 has no such spur gear 167 or no drive connection to the drive motor 128. The drive connection between the drive sprocket 166 and the spur gear 167 of the second distribution cylinder 33.2 are preferably evenly toothed and are configured with a tooth engagement that has a sufficiently large overlap for each position of the oscillating movement. The two distribution cylinders 33.1; 33.2 are mounted in a frame 147 that is formed on the side frame 147 or the frame 16, in bearings 172, such as, for example, in radial bearings 172, which also enable axial movement. There is no rotational drive connection between the drive motor 128 and the first distribution cylinder 33.1. The drive sprocket 166 and the spur gear 167 arranged on the axle section 168 together represent a transmission, and especially a speed-reducing transmission, which itself forms a unit that can be closed and/or can be preassembled and which has its own housing 153. At the output side, the unit can be coupled with the journals 169.

The oscillation drive 162 is also actuated, for example via a worm gear 173, 174, by the drive motor 128. Actuation is accomplished via a worm 173 arranged out of the shaft 164, or via a section of the shaft 164 structured as a worm 173 on a worm gear 174, which is non-rotatably connected to a shaft 176 that extends perpendicular to the rotational axis of the distribution cylinder 33.1; 33.2. In each case, on the end surface of the shaft 176, a driver 177 is arranged eccentrically to the rotational axis of the shaft, which driver is, in turn, connected, for example via a crank mechanism, such as, for example, via a lever 178 that is rotatably mounted on the driver 177 and a joint 179, in the axial direction of the distribution cylinder 33.1; 33.2, so as to be rigid to pressure and tension, to the journals 169 of the distribution cylinder 33.1; 33.2. In FIG. 31, the friction gearing 136 of the distribution cylinder 33.2 that is distant from the forme cylinder is indicated only by a dashed line, as in this view it is covered by the spur gear 167. A rotation of the shaft 176 causes the driver to rotate, which, in turn, effects the linear travel of the distribution cylinder 33.1; 33.2 via the crank drive. The output on the oscillation gearing 162 can also occur at another point in the rotational drive train between the drive motor 128 and the distribution cylinder 33.2, or even on a corresponding oscillation gearing 162, on the other side of the machine from the journal 169 that is located at the other end surface of the distribution cylinder 33.2. A transmission that is different from a worm drive 173, 174 for decoupling the axial drive can also optionally be provided.

As is represented in FIG. 32, the oscillation drive 162 or the oscillation gearing 162 is configured as a complete structural unit with its own housing 181, which housing can also be implemented as an encapsulated unit. The oscillation gearing 162 can be lubricated in the encapsulated space with oil, but preferably with a grease. The oscillation gearing 162 is supported in the embodiment shown by a mount 182 that is connected to the side frame 147. The drive motor 128 is separably connected to the housing 181 of the oscillation gearing 162.

Figure 34:
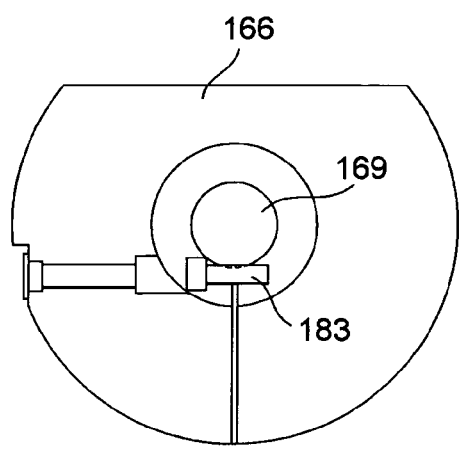

FIG. 34 shows an advantageous embodiment of a non-rotatable connection between the axle section 168 and the respective journal 169. Rotation involves frictional contact, which is produced by a clamping of a tapered section of the journal 169 by the slotted axle section 168 that encompasses it. The position of a clamping screw 183 is measured such that, viewed crosswise to the rotational axis of the journal 169 it dips at least partially into a peripheral groove in the journal 169. Thus, with respect to an axial direction, it represents a positive securing of the connection.

With reference to FIG. 35, a further advantageous development is described, wherein the distribution cylinder 33.1; 33.2, including the rotational and axial drive, are arranged in the manner of a module that can be preassembled and/or movable, on its own side frame 147 (16) that is structurally different from the side frame 11; 12 which supports the printing group cylinders 06; 07. A second frame side, which supports the distribution cylinders 33.1; 33.2 on their other end surface, is not shown here. These side frames 147 (16) that support the distribution cylinders 33.1; 33.2 and their drive can then be positioned on the side frame 11; 12, based upon the size and geometric arrangement of the printing group cylinders 06; 07. FIGS. 35a) and 35b) show a position of the side frames 147 (16) and 11; 12 relative to one another, using one larger (a) and one smaller (b) forme cylinder 07. A distance, indicated by the double arrow in FIG. 35, between the side frame 11; 12 and the inking unit drive, in this case the oscillation gearing 162, is then different, based upon the position of the inking unit 08 that is implemented in the manner of a module. Thus, printing units 01, having printing group cylinders 06; 07 with different circumferential formats, can be operated in a simple manner using the same inking unit 08.

The transmission unit, which is preferably preassembled as a module, from an axial gearing and/or from an oscillation gearing 162 can be completely pre-assembled as a sub-unit for the inking units 08 that are implemented, for example, as a module, and in an advantageous embodiment can be pre-mounted on the side frame 147 (16) of the inking unit module before being installed in the printing unit 01. On the other hand, modularity also allows the installation or replacement or exchange of the transmission that is implemented as a module when the inking unit module has already been installed in the machine.

Because the distribution cylinder 33.1 that is near the forme cylinder has no forced rotational actuation, the rollers 28, 34 roll against one another largely without slip, at least in the area of the inking unit that is near the forme cylinder.

In principle, the drive motor 128 that rotationally drives the second distribution cylinder 33.2 can be provided as an electric motor that can be controlled or regulated with respect to its output and/or its torque and/or also with respect to its speed. In the latter case, if the drive motor 128 is operated in a speed-regulated/controlled fashion, even in print-on, then in the area of the inking unit 08 that is distant from the forme cylinder, the aforementioned problems involving the different effects of roller circumferences can still occur.

With respect to the aforementioned set of problems involving a preset speed competing with the friction gearing, however, the drive motor 128 is advantageously configured such that it can be controlled or can be regulated, at least during the printing operation, with respect to its output and/or its torque. In principle, this can be accomplished by the provision of a drive motor 128 that is implemented as a synchronous motor 128 or as an asynchronous motor 128:

In a first embodiment, which is the simplest in terms of expenditure, the drive motor 128 is configured as an asynchronous motor 128, for which, in an allocated drive control 186, only one frequency, for example in print-off for the inking unit 08 and/or one electrical drive output or one torque, in print-on for the inking unit 08 is preset. In print-off for the inking unit 08, in other words, the forme rollers 28 are out of rolling contact with the forme cylinder 07, the inking unit 08 can be placed in a circumferential speed that is suitable for the print-on position, using the preset frequency and/or drive output, via the second distribution cylinder 33.2, at which speed the circumferential speeds of the forme cylinder 07 and forme rollers 28 differ by less than 10%, especially less than 5%. This limit advantageously also applies as a condition for the print-on position in the embodiments listed below. A preset frequency or output suitable for this can be determined empirically and/or through calculation performed beforehand, and which can be done either in the drive control itself, in a machine control, or in a data processor of a control center. The preset value can preferably be changed by the operator. This advantageously also applies to the preset values listed below.

In the print-on position, the forme rollers 28 are in rolling contact with the forme cylinder 07 and all the inking rollers are engaged against one another. The rollers 28; 33; 34; 33; 34; 37 are rotationally actuated, in part, by the forme cylinder 07 via the friction gearing now produced between the rollers 28; 33; 34; 33; 34; 37. The drive motor 128 need only apply the dissipated power that increases in the friction gearing with its increasing distance from the forme cylinder 07. In other words, the drive motor 128 can be operated at a low drive torque or a low driving output, which contributes only to keeping the rear area of the inking unit 08 at the circumferential speed that is predetermined essentially by the frictional contact. In a first variant, this driving output can be held constant for all production speeds, or speeds of the forme cylinder 07 and can correspond either to that preset value for starting up in print-off, or can represent its own constant value for production. In a second variant, for different production speeds, and optionally for starting up in print-off, different preset values, with respect to frequency and/or driving output, can be predetermined and stored. Depending upon the production rate or production speed, the preset value for the drive motor 128 can then vary.

In a second embodiment, in addition to the drive control 186 and the asynchronous motor 128 of the first embodiment, the drive also has a rotational speed reset. In the phase in which the inking unit operation is in print-off, the drive motor 128 can be essentially synchronized with the speed of the assigned forme cylinder 07 or of the printing group cylinder 06; 07. A sensor system 187, for example an angular sensor 187, which is configured to detect actual speed, can be arranged on a rotating component, such as, for example, a rotor of the drive motor 128 or the shaft 164 that is non-rotatably connected to the distribution cylinder 33.2. In FIG. 32, an angular sensor 187 that is equipped with a rotating initiator and with a sensor 187 that is fixed in place is represented, by way of example, on the coupling 163. The signal of the sensor is transmitted, via a signal connection that is represented by a dashed line, to the drive control 186 for further processing. With the rotational speed reset, the comparison with a speed M that represents the machine speed, and with a corresponding adjustment of the output or frequency preset value, a slip in the momentum of the print-on position can be prevented or at least can be minimized to a few percent. In print-on operation, the drive motor 128 can then preferably be operated no longer strictly according to the described rotational speed reset, but essentially according to the above-described frequency or preset output values.

A third embodiment has a synchronous motor 128 in place of the asynchronous motor 128 of the second embodiment. A rotational speed reset and a relevant synchronization and regulation in the print-off phase are accomplished according to the second embodiment, for example, in the drive control 186.

In a fourth embodiment, a drive motor 128, especially a synchronous motor 128, is provided, which is optionally speed-controlled in a first mode, for the inking unit 08 in print-off, and which, in a second mode, can be controlled with respect to torque for the inking unit 08 in print-on. For speed control, the drive control 186 and the drive motor 128 preferably again have an inner control circuit, which, in a manner similar to the second embodiment, comprises a reset for an external angular sensor 187 or a sensor system internal to the motor. When synchronous motors 128 are used, multiple ones of these synchronous motors 128 in a printing unit 01 can be assigned a shared frequency transformer or converter.

A further development of the fourth embodiment, which is advantageous in terms of versatility but which is more costly, involves the design of the drive motor 18 as a servo motor 128 that can optionally be position- and momentum-controlled. In other words motor 128 may be a three-phase alternating current synchronous motor with a device that allows the relevant rotational position or the formed rotational angle to be determined based upon an initial position of the rotor. The reporting of the rotational position can be accomplished via an angular sensor, for example a potentiometer, a resolver, an incremental position transducer or an encoder. In this embodiment, each drive motor 128 is equipped with its own frequency transformer or converter.

In the case of a drive motor 128 that is implemented in the manner of the second, third, or especially fourth embodiment, and that can be at least speed-synchronized, and especially can be speed-controlled, the drive control 186 is advantageously in signal connection with a so-called virtual control axis, in which an electronically generated control axis position F rotates. The rotating control axis position F serves in synchronization, with respect to the correct angular position and its temporal change, angular velocity $\phi$ in mechanically independent drive motors of units that are assigned to the same web, especially drive motors 121 of individual printing group cylinders 06; 07 or printing group cylinder groups or pairs, and/or the drive of a folding unit. In the operating mode, in which the inking unit 08 is to be actuated in synchronization with respect to the speed of the forme cylinder 07, a signal connection with the virtual control axis can thus supply the information on machine rate or speed to the drive control 186.

Preferably, in the actuation of the distribution cylinder 33.2 via the drive motor 128, the process is thus that when the inking unit 08 is running, but is in the print-off position, in which the forme rollers 28 are disengaged, the drive motor 128 is actuated in a controlled or regulated fashion with respect to a speed. When the machine is running, as soon as the inking unit 08, including the forme rollers 28, has been adjusted to the print-on position, the speed regulation or control is intentionally abandoned. In other words, a speed is no longer maintained, and instead the drive motor 128 is operated in the further process with respect to a torque, for example at a predetermined electrical power, and/or with respect to a torque that can be adjusted at the controller of a drive motor 128, especially an asynchronous motor 128. The torque that is to be adjusted, or the power that is to be adjusted, is, for example, chosen to be lower than a threshold torque, which would lead to a first rotation, under slip of the driven distribution cylinder 33.2 with a coordinating roller 34 that is engaged, but which is fixed with respect to rotation.

The load characteristics of a drive motor 128, which is configured as an asynchronous motor 128, coordinate with the behavior targeted for this purpose in such a manner that with an increasing load, a frequency decrease with a simultaneous increase in drive torque takes place. If, in the friction gearing between the forme cylinder 07 and the second distribution cylinder 33.2, for example, a great deal of drive energy and thus circumferential speed stemming from the forme cylinder 07 is lost, so that the load of the drive motor 128 now increases, the increased momentum is then provided at a diminished frequency. Conversely, little momentum is transmitted by the drive motor 128, it runs quasi empty, when sufficient energy is being transmitted via the friction gearing to the distribution cylinder 33.2.

The embodiment of the cylinder bearings as bearing units 14 and/or the cylinders 06; 07 as a cylinder unit 17 and/or the inking units 08 in the manner of modules and/or the drives in the manner of drive modules and/or the partitionability of the printing unit 01 enables, depending upon the equipment to different extents, a simplified on-site assembly and therefore provides extremely short assembly and start-up times for end-users.

The side frames 11; 12 or the panel sections 11; 12; 47 are initially set up and aligned. The cylinder units 17 and/or inking units 08 and/or dampening units 09 are preassembled, in the manner of modules, outside of the side frames 11; 12.

The cylinders 06; 07 are loaded, already with their bearing units 14, outside of the frames 11; 12, and then are installed and are fastened as complete cylinder units 17 between the side frames 11; 12. Then, from the outside of the side frame 11; 12, through corresponding recesses in the frame, depending upon the drive embodiment, the drive unit is connected in the manner of a drive module, for example, a transmission 150 or drive train 122 with the corresponding drive motor 121, optionally via the shaft 78, to the journal 63; 64.

If the printing unit 01 is implemented such that it can be partitioned in the area of the printing positions 05, then the cylinder units 17 are preferably installed when the printing unit 01 is open, from the space that is formed between the two partial printing units 01.1; 01.2, and this space is closed again only following installation.

If the printing unit 01 is implemented so as to be partitionable on both sides of the blanket-to-blanket printing unit 03 up to the inking units 08, as seen in FIG. 24, then the cylinder units 17 are preferably installed when the printing unit 01 is opened between the printing group cylinders 06; 07 and the panel sections 47 that accommodate the inking units 08, from the intermediate space that is formed there, and this is closed again only after installation.

For the inking units 08, the frames 16 or 147 allocated specifically to the inking units are loaded outside of the side frames 11; 12 with the appropriate rollers, from 26 through 39, and the corresponding drive module 138, optionally already including the drive motor 128, and are installed as a unit into the printing unit 01 and are secured there.

For the dampening units 09, frames which are allocated specifically to the dampening units are also loaded with the appropriate rollers, from 41; 42; 43; 47; 48, while they are still outside of the side frames 11; 12 and, if necessary in the desired embodiment, also with the corresponding drive module 138, optionally with or without its own drive motor 132, and are installed as a unit into the printing unit 01 and are secured there.

Figure 39:
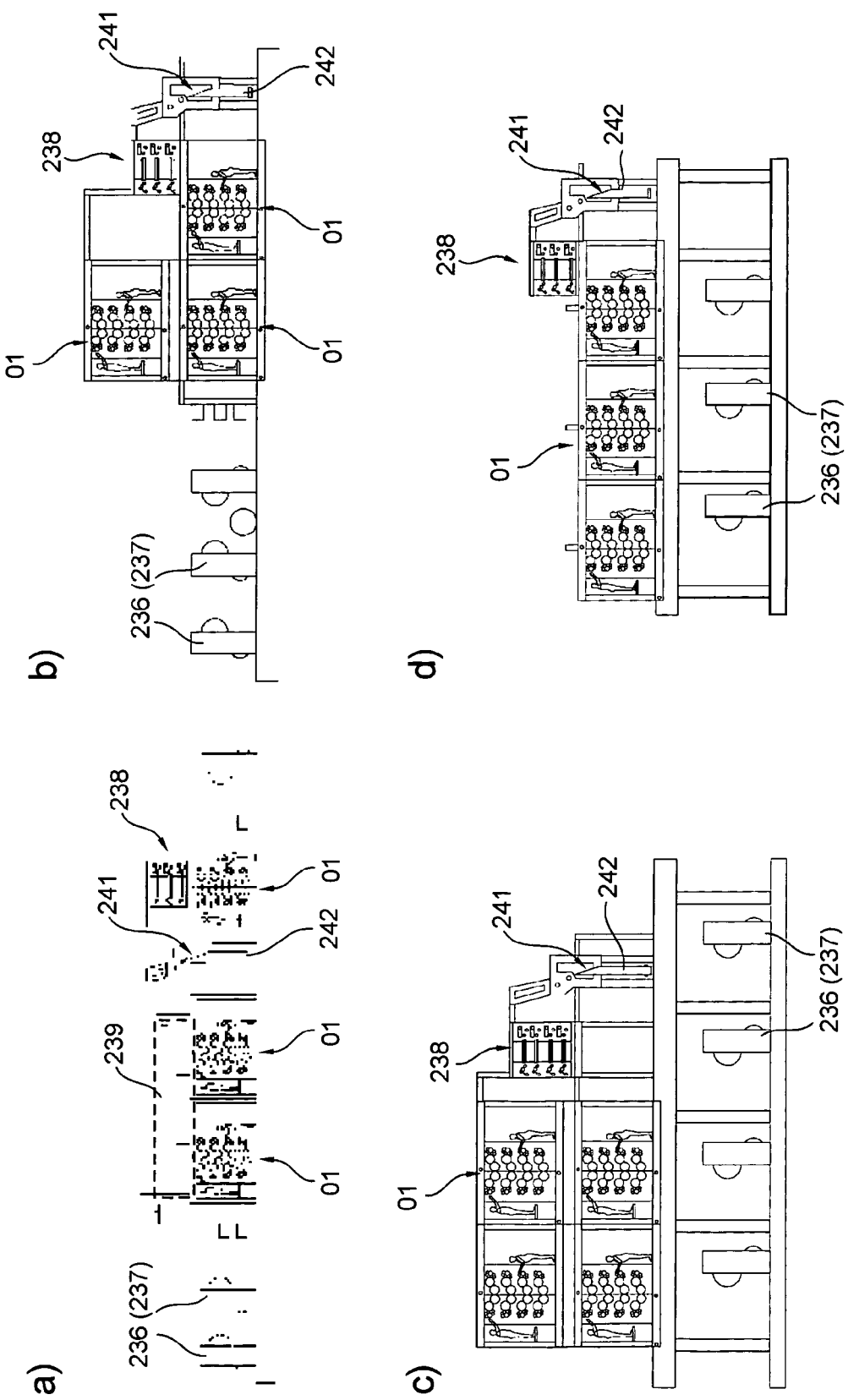
FIG. 39a)-39d) a schematic representation of four embodiments of a printing machine with partitionable or optionally non-partitionable printing units.

FIGS. 39a) through 39d) show schematic illustrations of four embodiments of a printing machine, which comprises multiple of the above-described, partitionable or optionally non-partitionable, printing units 01. The printing machines are equipped with reel changers 236 with infeed units 237 that are not explicitly illustrated here, with a superstructure 238 with at least one longitudinal cutting device, a turning deck and a longitudinal register device for longitudinally cut partial webs, with an optional dryer 239, illustrated by way of example by a dashed line, with a former structure 241 with one, two or even three fold formers, depending upon the width of the web, arranged side by side in a single plane, and with a folding unit 242. With this printing machine that has three printing units 01, in the case of an embodiment that has printing cylinders 06; 07 that are double-width, in other words four printed pages and especially newspaper pages wide, and double-sized, with three webs 02 a total of 48 pages can each be printed in four colors.

FIG. 39a) shows the printing machine in a parterre arrangement, in other words the printing units 01 and the reel changers 236 are aligned in the same plane. In FIG. 39b), a printing machine is represented, in which two printing units 01, each with four blanket-to-blanket printing units 03, are arranged in two different planes. Especially the upper printing unit 01 is arranged with its entire height above the lower printing unit 01. With this printing machine, that has three printing units 01, in the case of an embodiment that has printing cylinders 06; 07 that are double-width, in other words four printed pages, especially newspaper pages wide, and double-sized, with three webs 02 a total of 48 pages can each be printed in four colors.

FIG. 39c) shows a printing machine in three planes. In a lowest plane, the reel changers 236 are arranged, and in the two planes that lie above this, two printing units, each containing four blanket-to-blanket printing units 03, are arranged one above another. Here, the printing machine has, by way of example, two pairs of this type of two printing units 01 arranged one above another. With this printing machine that contains four printing units 01, in the case of an embodiment that has printing cylinders 06; 07 that are double-width, in other words with four printed pages, especially newspaper pages wide, and double-sized, with four webs 02, a total of 64 pages can each be printed in four colors.

In FIG. 39d) a printing machine in two planes is illustrated. In the lower plane the reel changers 236 are arranged, and in the plane above this, the printing units 01, each containing four blanket-to-blanket printing units 03, are arranged. With this printing machine that contains three printing units 01, in the case of an embodiment that has printing cylinders 06; 07 that are double-width, in other words which are four printed pages especially newspaper pages wide, and double-sized, and with three webs 02, a total of 48 pages can each be printed in four colors.

For all of the embodiments of a printing machine having one or more of the aforementioned characterizing features related to partitionability and/or modularity and/or the cylinder arrangement on the inner panels of the side frame 11; 12 and/or the linear arrangement and/or the special linear bearing and/or the above-mentioned on/off setting and adjustment of the cylinders 06; 07 and/or the drive modules 122; 138; 139; 146, a folding unit 242 with its own drive motor that is configured to be mechanically independent from the printing units 01, and/or with a variable format or cut-off length, and which thus is a variable-format folding unit 242 is preferably provided.

Figure 40:
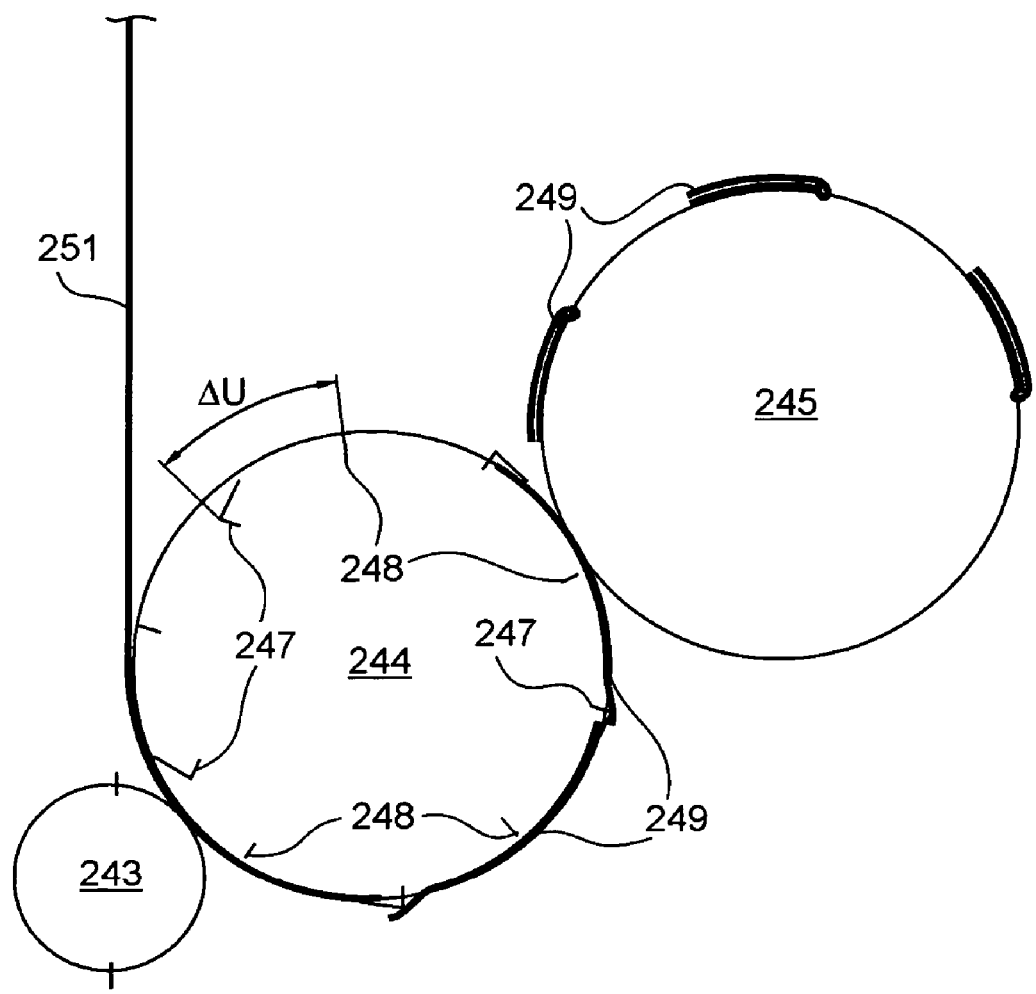
in FIG. 40 a schematic representation of a folding unit.

The folding unit 242, which is illustrated schematically in FIG. 40, has, for example, a cutting cylinder 243, a transport cylinder 244 and a jaw cylinder 246. At least the transport cylinder 244, which is structured as a folding blade cylinder 244, is arranged to be format variable. In other words, a distance $\Delta U$ in a circumferential direction between the holding elements 247 and the respective folding blades 248, which are arranged downstream on the circumference of the transport cylinder 244, is structured to be adjustable. In this, the holding elements 247, implemented, for example, as pin strips or as grippers, can be arranged on one side, while the folding blades 248 are arranged on the other side on two different coaxially arranged cylinders, which are capable of rotating toward one another in a circumferential direction. If the distance $\Delta U$ between the holding elements 247 and the folding blades 248 arranged downstream is decreased, then a product section 249, which is cut off crosswise from a line 251 by the cutting cylinder 243, will be folded crosswise after a shorter cut-off length when the folding blade 248 is extended, and vice-versa. The line 251 can be comprised of one or more longitudinally folded or unfolded webs 02 or partial webs.

The drive control described below is advantageous in principle, even regardless of the above-described partitionability and/or modularity and/or the cylinder arrangement on the inner panels of the side frame 11; 12 and/or the linear arrangement and/or the special linear bearing and/or the above-mentioned on/off position adjustment of the cylinders 06; 07 and/or the drive modules. However, particular advantages are achieved specifically in combination with one or more of the listed characterizing features, especially in combination with units that are actuated mechanically independently of one another, such as, for example, a mechanically independently actuated folding unit 219 and/or printing unit 01 and/or infeed unit 214 and/or cylinders 06; 07 or cylinder groups and/or guide elements of a superstructure 216.

Figure 41:
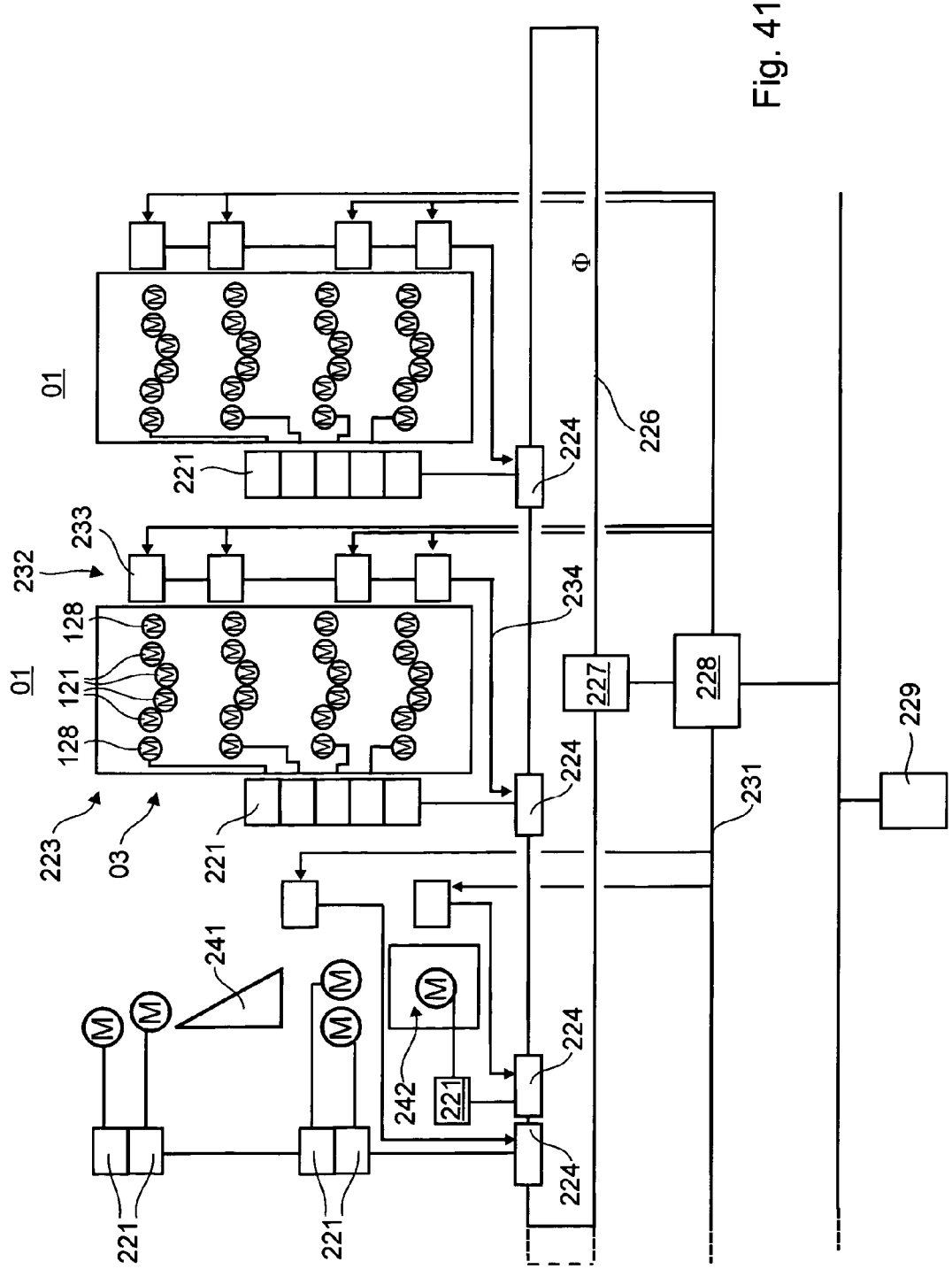
in FIG. 41 a preferred embodiment of a drive for a printing machine; and in FIG. 42 an enlarged representation of the linear bearing of FIG. 18 or of FIG. 36.

FIG. 41 shows an example of a drive for a printing machine having multiple, and in this case two, printing units 01 which are implemented as printing towers 01, each of which has multiple printing units 03, in this case blanket-to-blanket printing units 03. The printing units 03 of a printing tower 01, along with their drive controllers 221, in short their drives 221 and drive motors 121; 128, together form a group 223, such as, for example, a drive motor 223, and especially a printing position group 223, which is connected via a subordinate drive control 224 for this group 223 to a first signal line 226 that guides signals from a respective control axis position φ of a virtual control axis. However, the subordinate drive control 224 can also manage sub-groups of printing units 01 or other sections. Other units having their own subordinate drive control 224, such as, for example, one or more control elements for a superstructure 238 and/or a former structure 241 and/or one or more fold units 242, are also connected to this signal line 226. In this case, the signal line 226 is advantageously implemented as a first network 226 in ring topology, especially as a sercos ring, which receives the control axis position φ from a superordinate drive control 227 that is connected to the network 226. This generates the continuous control axis position φ on the basis of predetermined values, with respect to a predetermined production speed, which it receives from a computing and/or data processing unit 228, such as, for example, a sectional computer. The computing and/or data processing unit 228, in turn, receives the predetermined data on the production speed from a control center 229 or a control center computer 229 that is connected to it.

In order to ensure printing and/or longitudinal cutting that are true to register, the units that are actuated mechanically independently of one another, for example based upon a web lead, are in the correct angular position relative to one another. To accomplish this, offset values $DF_I$ for the individual drives 221 are maintained, which define the angular position relative to the shared control axis and/or relative to one of the units that is correct for production.

The offset values $\Delta\phi_I$ that are relevant for the individual drives 221 are supplied for the relevant production by the computing and data processing unit 228, via a second signal line 231 that is different from the first signal line, and especially by a second network 231, to the subordinate drive controls 224 that are assigned to the respective drive 221, and are stored there in an advantageous embodiment, and processed with the control axis position F to corrected control axis positions $\phi_I$.

The transmission of the offset values $DF_I$ to the subordinate drive controls 224 is accomplished, for example, either via corresponding signal lines by the second network 231 directly to the drive control 224, which is not specifically shown, or advantageously via a control system 232, to which the respective group 18 or the unit that has its own subordinate drive control 224 is allocated. To this end, the control system 232 is connected to the second network 231, or to the computing and data processing unit 227. The control system 232 controls and/or regulates, for example, the control elements and drives of the printing units 03 or folding units 242 that are different from the drive motors 121; 128, such as, for example, the ink supply, adjustment movements of rollers and/or cylinders, dampening unit, positions, and the like. The control system 232 has one or more, especially memory-programmable control units 233. This control unit 233 is connected, via a signal line 234, to the subordinate drive control 224. In the case of multiple control units 233, these are also connected to one another via the signal line 234, for example a bus system 234.

The drives 221 thus receive the absolute and dynamic information regarding the circulation of a shared control axis position φ that forms the basis via the first network 226, and the information necessary for a processing that is true to register, especially offset values $\Delta\phi_I$ for the relative positions of the drives 221 or units that are mechanically independent of one another, are transmitted via a second signal path, especially via at least one second network 231.

The aforementioned individual advantageous features, or the multiple advantageous features that are related to one another, such as the bearing unit 14, plane E, linear adjustment path S, modularity, and drive trains for the horizontal blanket-to-blanket printing unit 03 can also be applied to I-printing units, or in other words to blanket-to-blanket printing units 03 that are rotated essentially 90°. The features of the bearing unit 14 and/or the linear adjustment path S and/or the modularity and/or the drive trains can also be applied to nine- or ten-cylinder satellite printing units, alone or in combination.

While preferred embodiments of devices for mounting of a cylinder printing press and method for adjustment of a print-on position, in accordance with the present invention have been set forth fully and completely hereinabove, it will be apparent to one of skill in the art that various changes in, for example the number of printing presses utilized, the specific sizes of the paper webs, the ink and dampening fluids used and the like could be made without departing from the true spirit and scope of the present invention which is accordingly to be limited only by the appended claims.

What is claimed is:

1. A device for mounting a cylinder on a side frame of a printing unit comprising:
    a radial bearing supporting a journal of said cylinder for rotation about a cylinder axis of rotation;
    a bearing block supporting said radial bearing;
    linear bearings supporting said bearing block for movement along a direction of adjustment of said cylinder toward and away from an adjacent cylinder having an adjacent cylinder axis of rotation, which direction of adjustment is perpendicular to said cylinder axis of rotation, which direction of adjustment forms an acute angle of not greater than 15° with respect to a plane defined by said cylinder axis of rotation and said adjacent cylinder axis of rotation;
    a bearing unit including said radial bearing, said bearing block and said linear bearings, said bearing unit forming a complete structural unit;
    a bearing unit support, at least one of said linear bearings being stationarily fixed to said bearing unit support and wherein said side frame has at least a partial overlap with an end surface of said cylinder when said cylinder is supported by said bearing unit in said side frame;
    a fluid pressure operated actuator in engagement with said bearing block and usable to move said bearing block in said bearing unit along an adjustment path in said direction of adjustment into a print-on position in contact with said adjacent cylinder in response to an application of a fluid pressure medium to said actuator; and
    a bearing block travel limitation device in said bearing unit support and usable to limit a length of said adjustment path in said direction of adjustment toward said adjacent cylinder, said travel limitation device being operable independently of said fluid pressure operated actuator.

2. The device of claim 1 wherein said adjacent cylinder is supported on said side frame in a second said bearing unit and wherein a length of one of said linear bearings which is stationarily fixed to said bearing unit support is less than a diameter of the one of said cylinder supported by its associated bearing unit.

3. The device of claim 1 wherein said bearing block travel limitation device is a stop, said stop being movable with respect to said adjustment path in said adjustment direction, and wherein said stop limits said adjustment path in said direction of adjustment up to a print-on position of said cylinder in said printing unit.

4. The device of claim 3 wherein said stop includes a stop active surface adapted to engage said movable bearing block as a wedge drive.

5. The device of claim 1 wherein said bearing unit includes a bearing block travel limitation device connecting element that is usable to activate said bearing block travel limitation device.

6. The device of claim 1 wherein said linear bearings include first and second linear bearings encompassing said bearing block and wherein a bearing pre-stress of said bearing block has a component perpendicular to said cylinder axis of rotation.

7. The device of claim 1 wherein said actuator applies a defined force to said bearing block.

8. The device of claim 1 wherein said actuator is a connecting element adapted to be activated by said fluid pressure medium at a specific pressure.

9. The device of claim 1 further including a plurality of said actuators adapted to move said bearing block with respect to said print-on position of said cylinder, said plurality of actuators being operable simultaneously and having spaced force application points to said bearing block in a direction perpendicular to said axis of rotation.

10. The device of claim 1 wherein said bearing unit travel limitation device is operable to limit travel of said bearing unit in a direction of said cylinder toward a print-on position and further including a defined force resisting of said bearing unit away from said cylinder print-on position.

11. The device of claim 1 wherein said actuator is intended to adjust an engagement pressure of said cylinder and said adjacent cylinder, said actuator having a linear stroke of at least 1.5 mm.

12. The device of claim 1 wherein said actuator is located in said complete structural unit including said bearing unit.

13. The device of claim 1 wherein said actuator is a piston adapted to be activated by said fluid pressure medium.

14. The device of claim 13 wherein said fluid pressure medium is water-based.

15. The device of claim 13 wherein said fluid pressure medium is oil-based.

16. The device of claim 1 further including two of said actuators in said bearing unit.

17. The device of claim 1 further including two of said linear bearings in said bearing unit and wherein said linear bearings are linear guides which function with said other.

18. The device of claim 17 wherein said rotational axis of said cylinder extends between said two of said linear bearings.

19. The device of claim 17 wherein said radial bearing is located between said two of said linear bearings.

20. The device of claim 1 wherein said linear bearing includes a first linear bearing element secured to said frame and a second linear bearing element secured to said bearing block, each of said first and second linear bearing elements having at least one guide surface.

21. The device of claim 20 wherein said first linear bearing element faces said cylinder journal.

22. The device of claim 1 wherein each said linear bearing includes first and second linear bearing elements, each of which having first and second guide surfaces arranged on first and second planes which are inclined with respect to each other.

23. The device of claim 22 wherein said first and second inclined planes define a V shape.

24. The device of claim 22 wherein said first and second guide surfaces of a first of said linear bearings are in a shape-complementing arrangement with first and second guide surfaces of a second of said linear bearings.

25. The device of claim 22 wherein said first linear bearing element which is fixed to said frame encompasses each of said first and second linear bearings of said bearing block.

26. The device of claim 22 wherein said first and second guide surfaces inclined on said first and second planes are adapted to counteract a selective movement of said bearing element of said linear bearing in an axial direction of said cylinder.

27. The device of claim 22 wherein said bearing unit includes first and second ones of said linear bearings, each of said linear bearings having two pairs of coordinated guide surfaces which are arranged relative to each other to counteract a relative movement of bearing components of said linear bearings in an axial direction of said cylinder.

28. The device of claim 1 wherein said adjustment path toward a print-off position of said cylinder is limited by a stop, said stop being supported for movement in response to a load on said bearing unit overcoming a specified force.

29. The device of claim 1 further including one bearing unit for each of said cylinder and said adjacent cylinder which are in coordination with one another.

30. The device of claim 1 wherein said bearing unit support is arranged on a frame wall adjacent a cylinder end face.

31. The device of claim 1 wherein said radial bearing extends between first and second ones of said linear bearings in a plane which is perpendicular to said axis of rotation of said cylinder.

32. The device of claim 1 wherein said bearing unit has a length, in said direction of adjustment, which is smaller than a diameter of said cylinder.

33. A device for mounting a cylinder on a side frame of a printing unit comprising:
a radial bearing supporting a journal of said cylinder for rotation about a cylinder axis of rotation;
a bearing block supporting said radial bearing;
linear bearings supporting said bearing block for movement along a direction of adjustment of said cylinder, which direction of adjustment is perpendicular to said cylinder axis of rotation;
a bearing unit including said radial bearing, said bearing block and said linear bearings, said bearing unit forming a complete structural unit; and
a bearing unit support, at least one of said linear bearings being stationarily fixed to said bearing unit support and wherein said side frame has at least a partial overlap with an end surface of said cylinder when said cylinder is supported by said bearing unit in said side frame for movement in said direction of adjustment between a print-on position of said cylinder and a print-off position of said cylinder; and
a stop, said stop limiting an adjustment path in said direction of adjustment toward said print-off position of said cylinder, said stop being supported for movement in response to a load on said bearing unit overcoming specified force.

* * * * *

UNITED STATES PATENT AND TRADEMARK OFFICE
CERTIFICATE OF CORRECTION

PATENT NO. : 7,699,000 B2
APPLICATION NO. : 11/547286
DATED : April 20, 2010
INVENTOR(S) : Schäfer et al.

It is certified that error appears in the above-identified patent and that said Letters Patent is hereby corrected as shown below:

Column 46, in claim 33, line 64, after "overcoming" insert -- a --.

Signed and Sealed this

Seventeenth Day of August, 2010

David J. Kappos
*Director of the United States Patent and Trademark Office*